US009711962B2

(12) United States Patent
Andrea

(10) Patent No.: US 9,711,962 B2
(45) Date of Patent: Jul. 18, 2017

(54) SYSTEM AND METHOD FOR ISOLATED DC TO DC CONVERTER

(76) Inventor: Davide Andrea, Boulder, CO (US)

( * ) Notice: Subject to any disclaimer, the term of this patent is extended or adjusted under 35 U.S.C. 154(b) by 1066 days.

(21) Appl. No.: 13/544,100

(22) Filed: Jul. 9, 2012

(65) Prior Publication Data
US 2014/0009106 A1 Jan. 9, 2014

(51) Int. Cl.
H02J 7/00 (2006.01)
H02H 9/00 (2006.01)

(52) U.S. Cl.
CPC ........... *H02H 9/002* (2013.01); *H02J 7/0018* (2013.01); *Y02T 10/7055* (2013.01)

(58) Field of Classification Search
USPC ................................................ 320/103, 107
See application file for complete search history.

(56) References Cited

U.S. PATENT DOCUMENTS

| | | | |
|---|---|---|---|
| 4,395,675 A | 7/1983 | Toumani | |
| 5,528,125 A | 6/1996 | Marshall et al. | |
| 5,570,276 A * | 10/1996 | Cuk et al. | ........................ 363/16 |
| 5,949,224 A | 9/1999 | Barkaro | |
| 6,002,603 A | 12/1999 | Carver | |
| 6,087,816 A | 7/2000 | Volk | |
| 6,275,016 B1 | 8/2001 | Ivanov | |
| 6,320,358 B2 | 11/2001 | Miller | |
| 6,522,110 B1 | 2/2003 | Ivanov | |
| 6,636,431 B2 | 10/2003 | Seki et al. | |
| 6,788,033 B2 * | 9/2004 | Vinciarelli | ..................... 323/225 |
| 6,812,676 B2 | 11/2004 | Tateishi | |
| 6,831,448 B2 | 12/2004 | Ishii et al. | |
| 6,853,170 B2 | 2/2005 | Miyazaki | |
| 6,977,488 B1 | 12/2005 | Nogawa et al. | |
| 7,075,277 B2 | 7/2006 | Ishii et al. | |
| 7,199,563 B2 | 4/2007 | Ikezawa | |
| 7,342,436 B2 | 3/2008 | Tsuchiya et al. | |
| 7,501,802 B2 | 3/2009 | Nitta et al. | |
| 7,560,911 B2 | 7/2009 | Nishida | |
| 7,570,034 B2 | 8/2009 | Nitta et al. | |
| 7,723,865 B2 | 5/2010 | Kitanaka | |
| 7,956,586 B2 | 6/2011 | Nagai et al. | |
| 8,452,490 B2 * | 5/2013 | Lakirovich et al. | ............. 701/36 |
| 8,853,888 B2 * | 10/2014 | Khaligh | ......................... 307/80 |
| 2002/0030525 A1 * | 3/2002 | Saeki | ......................... G06F 1/10 327/291 |
| 2008/0036419 A1 * | 2/2008 | Cook et al. | .................... 320/104 |
| 2011/0031930 A1 * | 2/2011 | Kajouke | ....................... 320/128 |
| 2012/0223582 A1 | 9/2012 | Andrea | |

* cited by examiner

*Primary Examiner* — Samuel Berhanu
(74) *Attorney, Agent, or Firm* — Daniel W. Roberts; Law Offices of Daniel W. Roberts, LLC

(57) ABSTRACT

Disclosed is a battery and load equalization circuit that prevents the in-rush of current when batteries and/or loads are initially connected in parallel. Various techniques are used including charging, discharging and use of DC to DC converters to equalize charges between batteries and between batteries and capacitive loads.

54 Claims, 49 Drawing Sheets

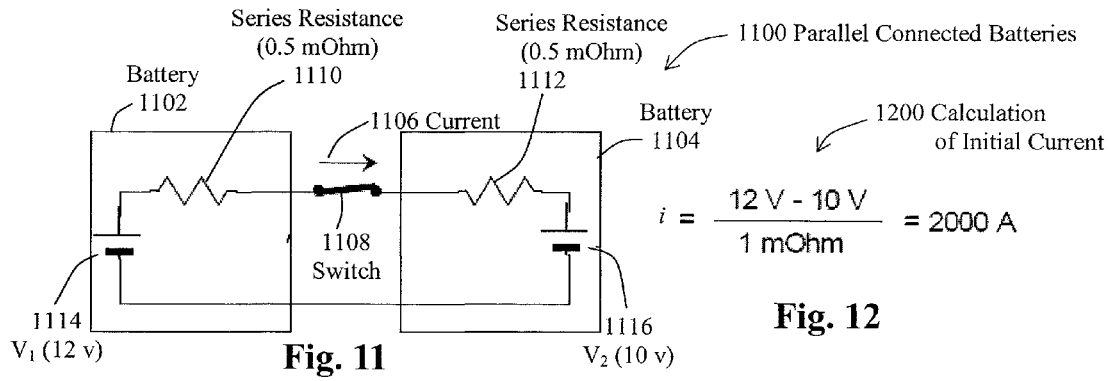
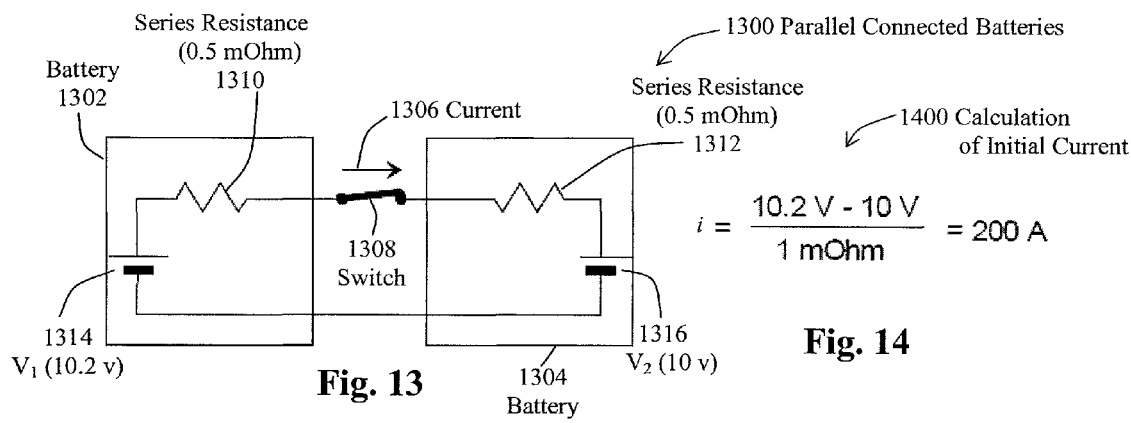
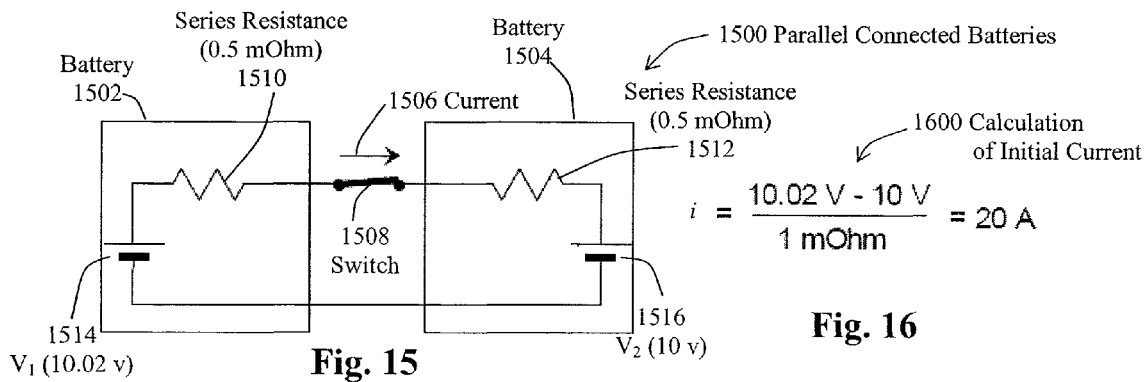

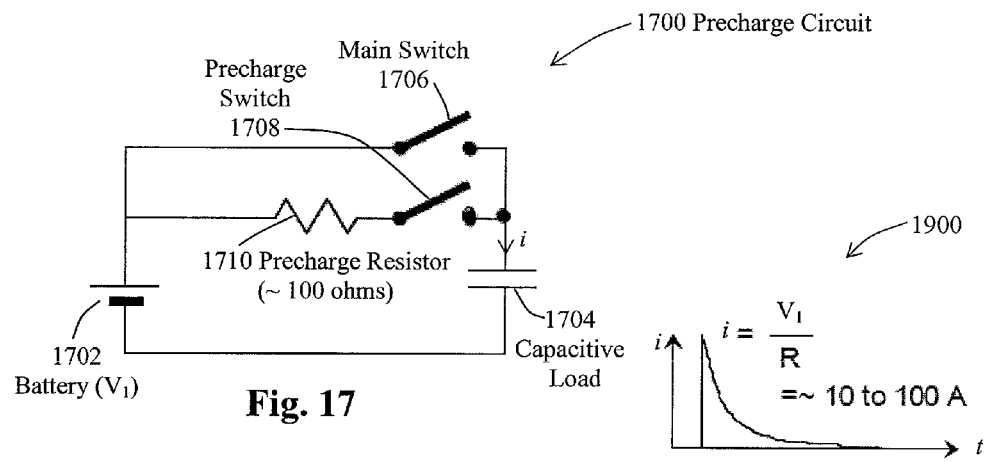
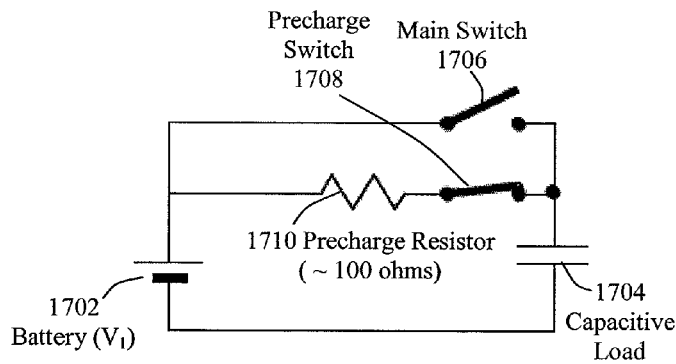
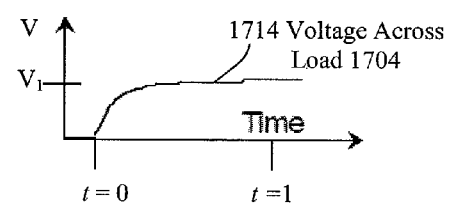
Fig. 20
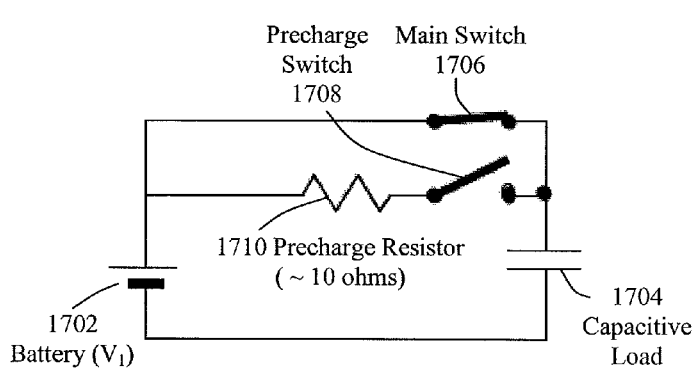
Fig. 21
Fig. 19

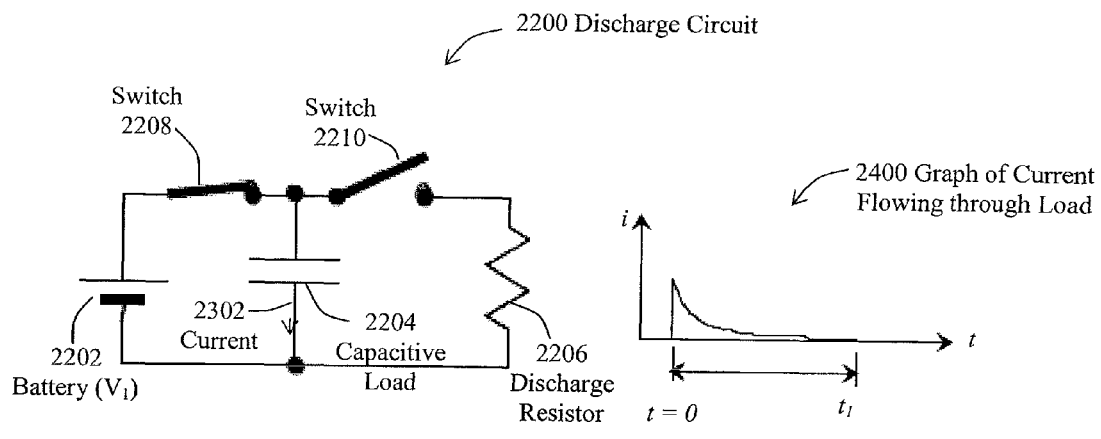
Fig. 22
Fig. 24
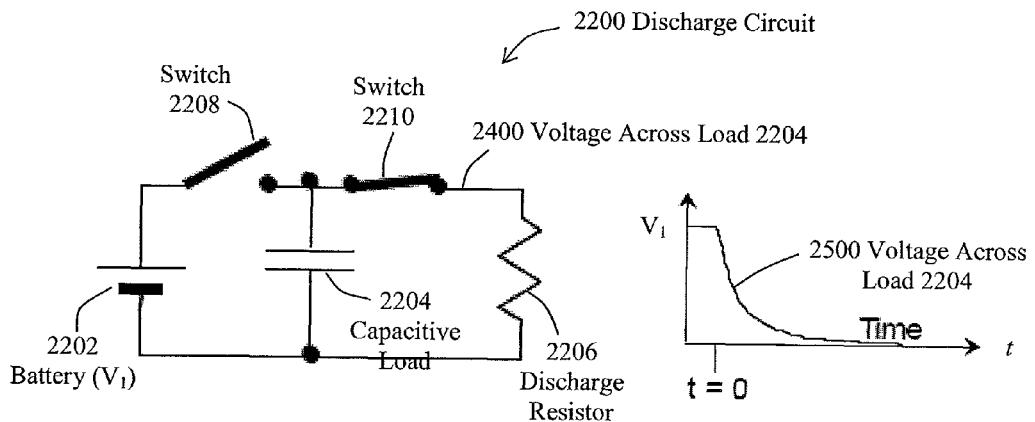
Fig. 23
Fig. 25

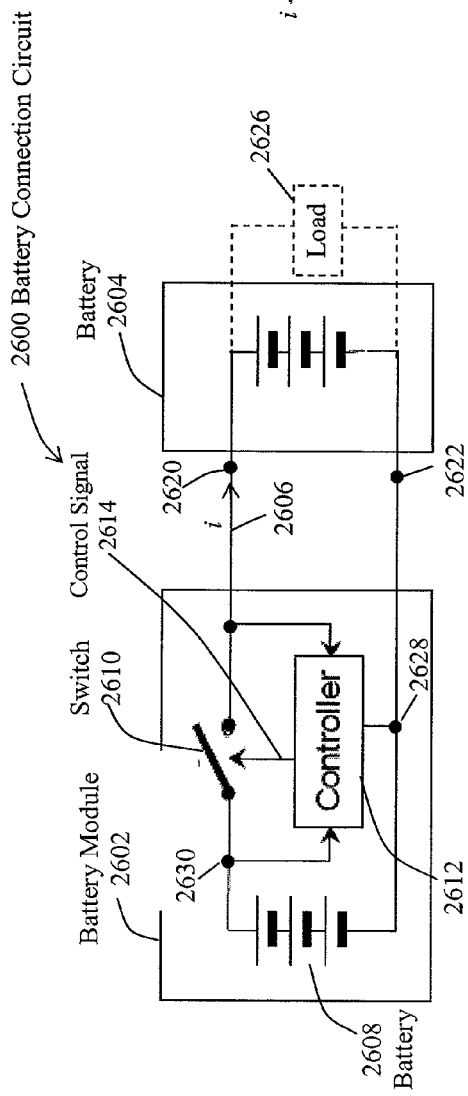
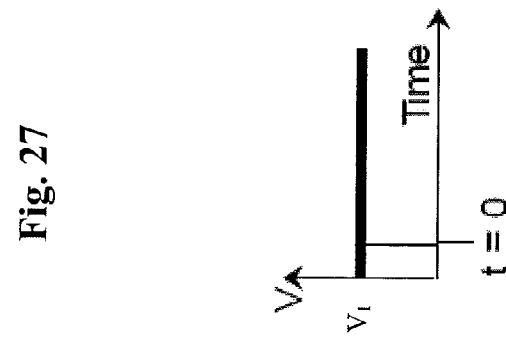
Fig. 27
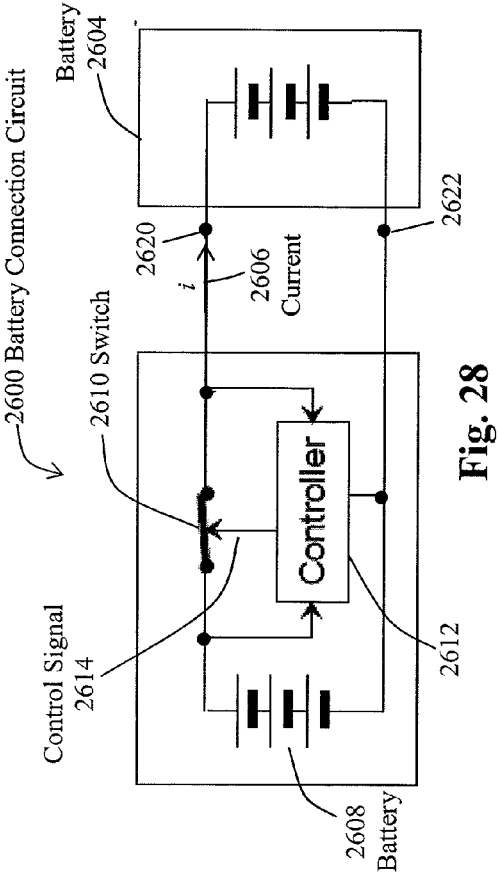
Fig. 26
Fig. 28
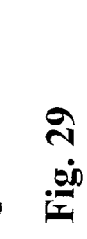
Fig. 29

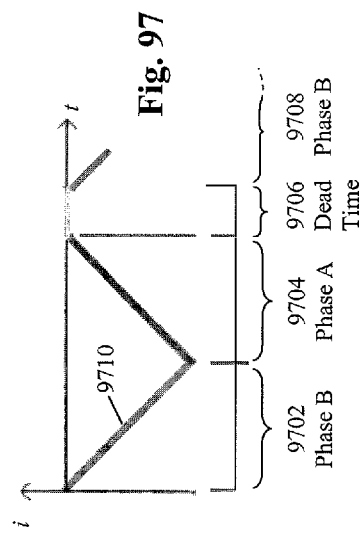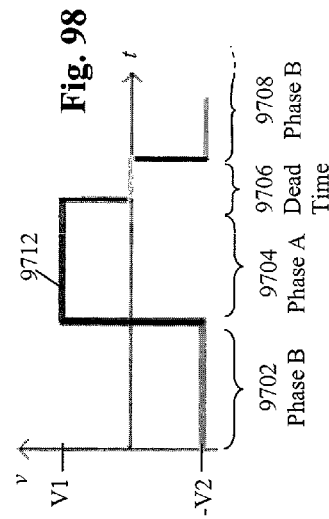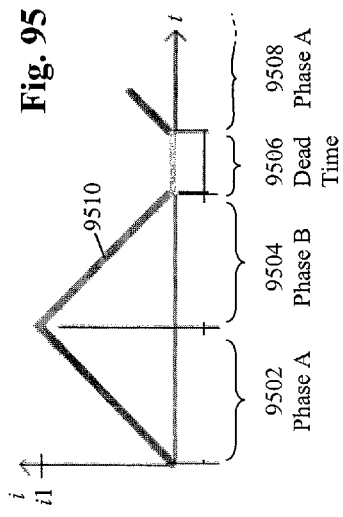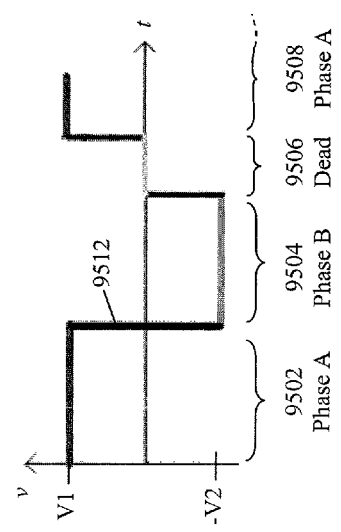

Graph of Inductor Current vs. Time for
Continuous Mode Operation with Phase A
Occurring First 9900

Graph of Inductor Voltage vs. Time for
Continuous Mode Operation with Phase A
Occurring First 10000

SYSTEM AND METHOD FOR ISOLATED DC TO DC CONVERTER

BACKGROUND

Batteries are used as an important source of electrical energy in portable applications and can also function as important stationary electrical energy storage devices. Batteries can provide a source of electrical energy for many purposes. For example, batteries provide electrical energy for handheld devices, electric cars, various types of electronic vehicles, alternative energy storage, etc. Batteries can also be used for storage of electrical energy when sources of electronic energy are not otherwise available.

In order to provide a sufficient supply of electrical energy, cells, as well as batteries, may be connected in parallel and/or in series. Various series/parallel connections can provide a desired current and voltage, for a wide number of applications.

SUMMARY OF THE INVENTION

An embodiment of the present invention may therefore comprise a method of safely connecting a first battery in parallel with a second battery using chargers comprising: detecting a first terminal voltage of terminals of the first battery; detecting a second terminal voltage of terminals of the second battery; charging the first battery to a first voltage if the first terminal voltage of the first battery is less than the second terminal voltage of the second battery; charging the second battery to a second voltage if the second terminal voltage of the second battery is less than the first terminal voltage of the first battery; connecting the terminals of the first battery and the terminals of the second battery in parallel if the first voltage is sufficiently close to the second terminal voltage, or if the second voltage is sufficiently close to the first terminal voltage, so that currents flowing between the first battery and the second battery upon initially connecting the terminals of the first battery to the terminals of the second battery are less than a first maximum current An embodiment of the present invention may further comprise a method of safely connecting a first battery in parallel with a second battery using discharging techniques comprising: detecting a first terminal voltage of terminals of the first battery; detecting a second terminal voltage of terminals of the second battery; actively discharging the second battery to a second voltage if the terminal voltage of the second battery is greater than the terminal voltage of the first battery; actively discharging the first battery to a first voltage if the terminal voltage of the first battery is greater than the terminal voltage of the second battery; connecting terminals of the first battery and the terminals of the second battery in parallel if the second voltage is sufficiently close to the first terminal voltage, or the first voltage is sufficiently close to the second terminal voltage, so that currents created upon initially connecting the first battery and the second battery are less than a first desired maximum current.

An embodiment of the present invention may further comprise a method of safely connecting a first battery in parallel with a second battery using DC to DC converters comprising: detecting a first terminal voltage of terminals at the first battery; detecting a second terminal voltage of terminals of the second battery; connecting an input of a step-down DC to DC converter to terminals of the first battery and an output of the step-down DC to DC converter to terminals of the second battery if the first terminal voltage is greater than the second terminal voltage; connecting the input of the step-down DC to DC converter to the terminals of the second battery and an output of the step-down DC to DC converter to terminals of the first battery if the second terminal voltage is greater than the first terminal voltage.

An embodiment of the present invention may further comprise a method of safely connecting a first battery in parallel with a second battery using DC to DC converters comprising: detecting a first terminal voltage of terminals at the first battery; detecting a second terminal voltage of terminals of the second battery; detecting a first state of charge of the first battery; detecting a second state of charge of the second battery; connecting an input of a step-up DC to DC converter to the first battery and an output of the step-up DC to DC converter to the second battery if the state of charge of the first battery is greater than the state of charge of the second battery and if the first terminal voltage is less than the second terminal voltage; connecting an input of the step-up DC to DC converter to the second battery and an output of the step-up DC to DC converter to the first battery if the state of charge of the second battery is greater than the state of charge of the first battery and if the first terminal voltage is greater than the second terminal voltage.

An embodiment of the present invention may further comprise a method of safely connecting a first battery in parallel with a second battery using a bi-directional DC to DC converter comprising: connecting terminals of the first battery to a first input of the bi-directional DC to DC converter; connecting terminals of a second battery to a second input of the bi-directional DC to DC converter; using the bi-directional DC to DC converter to transfer charge between the first battery and the second battery in the direction that reduces the resulting current at the moment of initial connection of the first terminals to the second terminals; connecting the terminals of the first battery to the terminals of the second battery when the first battery has a first terminal voltage and open circuit voltage that is sufficiently close to a second terminal voltage and open circuit voltage on the second battery so that currents flowing between the first battery and the second battery, when the first battery is initially connected in parallel to the second battery, are less than a maximum current.

An embodiment of the present invention may further comprise a method of safely connecting a battery in parallel with a capacitive load using a DC to DC converter comprising: connecting terminals of the battery to a first input of the DC to DC converter; connecting terminals of the capacitive load to a second input of the DC to DC converter; using the DC to DC converter to transfer charges between the battery and the capacitive load; connecting the terminals of the battery to the terminals of the load when the battery has a first charge that is sufficiently close to a second charge on the capacitive load so that currents flowing between the battery and the capacitive load when the battery is initially connected to the capacitive load are less than a maximum current.

An embodiment of the present invention may further comprise a system for safely connecting a first battery in parallel with a second battery using charging techniques comprising: a controller that detects a first terminal voltage of terminals of the first battery, and a second terminal voltage of terminals of the second battery; a first charger connected to the first battery, which charges the first battery to a first voltage, the first charger activated by the controller if the first terminal voltage is less than the second terminal voltage; a second charger connected to the second battery, which charges the second battery to a second voltage, the second charger activated by the controller if the second terminal voltage is less than the first terminal voltage; a switch that connects the first battery in parallel with the second battery that is activated by the controller if the first voltage is sufficiently close to the second terminal voltage, or if the second voltage is sufficiently close to the first terminal voltage, so that currents flowing between the first battery and the second battery when the switch is initially activated by the controller are less than a first maximum current.

An embodiment of the present invention may further comprise a system for safely connecting a first battery in parallel with a second battery using automated discharging techniques comprising: a controller that detects a first terminal voltage of terminals of the first battery and a second terminal voltage of terminals of a second battery; a first switch that is activated by the controller that connects a first resistive element in parallel with the first battery to actively discharge the first battery to a first voltage if the first terminal voltage is greater than the second terminal voltage; a second switch that is activated by the controller that connects a second resistive element in parallel with the second battery to actively discharge the second battery to a second voltage if the second terminal voltage is greater than the first terminal voltage; a third switch activated by the controller, that connects the first battery in parallel with the second battery if the first voltage, if present, is sufficiently close to the second terminal voltage, or the second voltage, if present, is sufficiently close to the first terminal voltage, so that currents flowing between the first battery and the second battery, when the third switch is initially activated by the controller, are less than a first maximum current.

An embodiment of the present invention may further comprise a system for safely connecting a first battery in parallel with a second battery using DC to DC converters comprising: a controller that detects a first terminal voltage of terminals of a first battery, and a second terminal voltage of terminals of a second battery; a step-down DC to DC converter having an input and an output; at least one switch that connects the input to the terminals of the first battery, and the output to the terminals of the second battery when the first terminal voltage is greater than the second terminal voltage, and the input to the terminals of the second battery and the output to the terminals of the first battery when the second terminal voltage is greater than the first terminal voltage.

An embodiment of the present invention may further comprise a system for safely connecting a first battery in parallel with a second battery comprising: a bi-directional DC to DC converter having a first input and a second input; a controller that generates control signals; a plurality of first electronic switches, responsive to the control signals, that connect terminals of the first battery to a first input of the bi-directional DC to DC converter, and terminals of the second battery to a second input of the bi-directional DC to DC converter, to transfer charge between the first battery and the second battery; at least one second electronic switch that connects the terminals of the first battery in parallel to the terminals of the second battery when the first battery has a first charge that is sufficiently close to a second charge on the second battery so that current flowing between the first battery and the second battery, when the second electronic switch is activated, is less than a maximum current.

An embodiment of the present invention may further comprise a system for safely connecting a battery in parallel with a capacitive load comprising: a DC to DC converter having a first input and a second input; a controller that generates control signals; a plurality of first electronic switches, responsive to the control signals, that connect terminals of the battery to a first input of the DC to DC converter, and terminals of the capacitive load to a second input of the bi-directional DC to DC converter, to transfer charge between the battery and the capacitive load; at least one second electronic switch that connects the terminals of the battery in parallel to the terminals of the capacitive load when the battery has a first charge that is sufficiently close to a second charge on the capacitive load so that current flowing between the battery and the capacitive load, when the second electronic switch is activate, is less than a maximum current.

An embodiment of the present invention may further comprise an isolated, bi-directional DC to DC converter comprising: a first DC voltage source; an inductor; a first pair of switches that connected the inductor to the first DC voltage source in a first polarity direction during a first phase of operation; a second DC voltage source; a second pair of switches that connect the inductor to a second DC voltage source in a second polarity direction, that is opposite to the first polarity direction, during a second phase of operation, so that current flows in the inductor in the first polarity direction while the inductor is connected to the first voltage source, during the first phase of operation, and the current through the inductor is reduced during the second phase of operation.

An embodiment of the present invention may further comprise an isolated, uni-directional DC to DC converter comprising: a DC voltage source; an inductor; a pair of switches that connect the inductor to the DC voltage source during a first phase of operation so that current flows through the inductor in a first direction; a load; a pair of diodes that allow the current to continue to flow through the inductor during a second phase of operation when the first pair of switches are opened and the DC voltage source is isolated from the inductor.

An embodiment of the present invention may further comprise an isolated, uni-directional DC to DC converter comprising: a DC voltage source; an inductor; a first pair of switches that connect the inductor to the DC voltage source during a first phase of operation so that current flows through the inductor in a first direction; a load; a second pair of switches that connect the inductor to the load that allows the current to continue to flow through the inductor in the first direction during a second phase of operation when the first pair of switches are opened and the second pair of switches are substantially simultaneously closed and the DC voltage source is isolated from the inductor.

An embodiment of the present invention may further comprise a method of converting a first DC voltage to a second DC voltage using an isolated, bi-directional DC to DC converter comprising: generating the first DC voltage using a first DC voltage source; applying the first DC voltage to an inductor using a first pair of switches that connect the first DC voltage source to the inductor in a first polarity direction; generating the second DC voltage using a second DC voltage source; applying the second DC voltage to the inductor using a second pair of switches that connect the second DC voltage source to the inductor in a second polarity direction that is opposite to the first polarity direction.

An embodiment of the present invention may further comprise a method of converting a first DC voltage to a second DC voltage using an isolated, uni-directional DC to DC converter comprising: generating the first DC voltage using a DC voltage source; applying the DC voltage source to an inductor using at least a first pair of switches that connect the DC voltage source to the inductor that generates a current in the conductor; opening the at least first pair of switches and substantially simultaneously closing the at least second pair of switches so that the current continues to flow through the inductor into a load.

An embodiment of the present invention may further comprise a method of converting a first DC voltage to a second DC voltage using an isolated, uni-directional DC to DC converter comprising: generating the first DC voltage using a DC voltage source; applying the DC voltage source to an inductor using at least a first pair of switches that connect the DC voltage source to the inductor that generates a current in the inductor; opening the at least first pair of switches so that current flows through the inductor and through a pair of diodes and a load connected to the diodes.

BRIEF DESCRIPTION OF THE DRAWINGS

FIG. 11 is a schematic illustration of an embodiment of two batteries connected in parallel with highly differing voltages FIG. 12 is an equation illustrating the amount of current that initially flows between the two batteries with highly differing voltages are initially connected in parallel.

FIG. 13 is a schematic illustration of an embodiment of two batteries connected in parallel with medium differing voltages.

FIG. 14 is an equation illustrating the amount of current that initially flows between the two batteries with medium differing voltages are initially connected in parallel.

FIG. 15 is a schematic block diagram of an embodiment of two batteries connected in parallel with low differing voltages.

FIG. 16 is an equation illustrating the amount of current flowing when the two batteries with low differing voltages are initially connected in parallel.

FIG. 17 is a schematic illustration of an embodiment of a pre-charge circuit in a first state.

FIG. 18 is a schematic illustration of an embodiment of the pre-charge circuit of FIG. 17 in a second state.

FIG. 19 is a schematic diagram of an embodiment of the circuit of FIG. 17 in a third state.

FIG. 20 is a plot of the current versus time of current flowing in the circuit illustrated in FIG. 18.

FIG. 21 is a plot of the voltage of the capacitive load versus time in the circuit of FIG. 18.

FIG. 22 is a schematic illustration of an embodiment of a post-discharge circuit in a first state.

FIG. 23 is a schematic illustration of an embodiment of the discharge circuit illustrated in FIG. 22 in a second state.

FIG. 24 is a plot of current flowing versus time in the discharge circuit illustrated in FIG. 23.

FIG. 25 is a plot of voltage of the capacitive load versus time in the circuit illustrated in FIG. 23.

FIG. 26 is a schematic illustration of an embodiment of a battery equalization circuit in a first state.

FIG. 27 is an illustration of current flowing in the embodiment of FIG. 26 versus time.

FIG. 28 is a schematic illustration of an embodiment of the battery equalization circuit of FIG. 26 in a second state.

FIG. 29 is a graph of the current flowing in the circuit of FIG. 28 versus time.

FIGS. 30-33 are schematic illustrations of an embodiment of a battery equalization circuit in various states, wherein FIG. 30 illustrates a first battery at a lower voltage than a second battery, FIG. 31 illustrates a charger charging first battery, FIG. 32 illustrates a first battery charged to same voltage as a second battery, charger goes off, and FIG. 33 illustrates a first battery connected to a second battery.

FIGS. 34-37 are schematic illustrations of an embodiment of a battery equalization circuit in various states, wherein FIG. 34 illustrates a first battery at a higher voltage than a second battery, FIG. 35 illustrates a charger charging a second battery, FIG. 36 illustrates a second battery charged to the same voltage as a first battery, charger goes off, and FIG. 37 illustrates a first battery connected to second battery.

FIG. 38 illustrates a voltage of first battery that is higher than a voltage of a second battery, FIG. 39 illustrates a discharge load connected across first battery, to remove charge from the battery, FIG. 40 illustrates a first battery discharged to the same voltage as a second battery, load disconnected, and FIG. 41 illustrates a first battery connected to a second battery.

FIG. 95 is a plot of inductor current versus time for discontinuous mode of operation of the bi-directional DC to DC converter, as the direction of power transfer is from V1 to V2.

FIG. 96 is a plot of the inductor voltage versus time for a discontinuous mode of operation of the bi-directional DC to DC converter, as the direction of power transfer is from V1 to V2.

FIG. 97 is a plot of the inductor current versus time for a discontinuous mode of operation of the bi-directional DC to DC converter, as the direction of power transfer is from V2 to V1.

FIG. 98 is a plot of inductor voltage versus time for a discontinuous mode of operation of the bi-directional DC to DC converter, as the direction of power transfer is from V2 to V1.

DETAILED DESCRIPTION OF THE EMBODIMENTS

Figure 1:
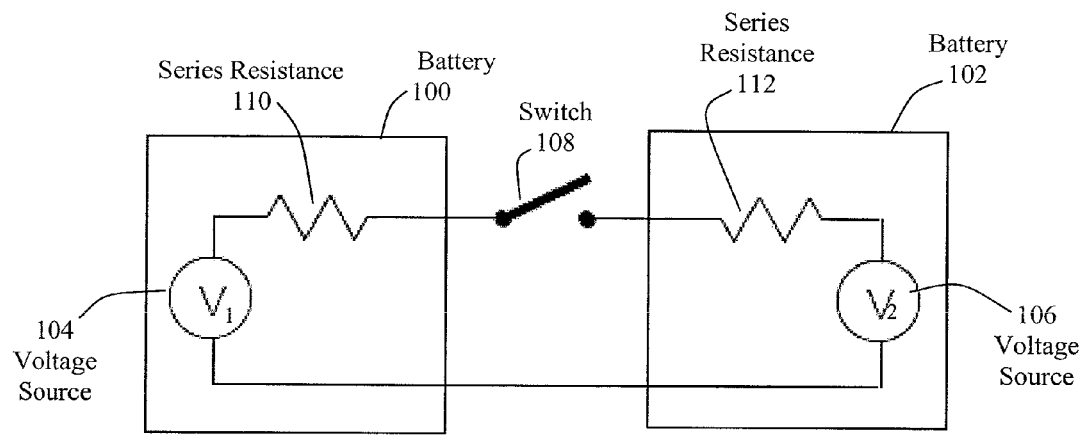
FIG. 1 is a schematic view of an embodiment of two batteries that are wired for parallel connection through a switch.

FIG. 1 is a schematic view of an embodiment of two batteries that are wired for connection in parallel through a switch 108. As shown in FIG. 1, battery 100 can be schematically illustrated as a voltage source 104 having a voltage $V_1$ and a series resistance 110. Similarly, battery 102 is schematically illustrated as a voltage source 106 having a voltage $V_2$ and a series resistance 112. The two batteries 100, 102 can be connected in parallel using switch 108.

Figure 2:
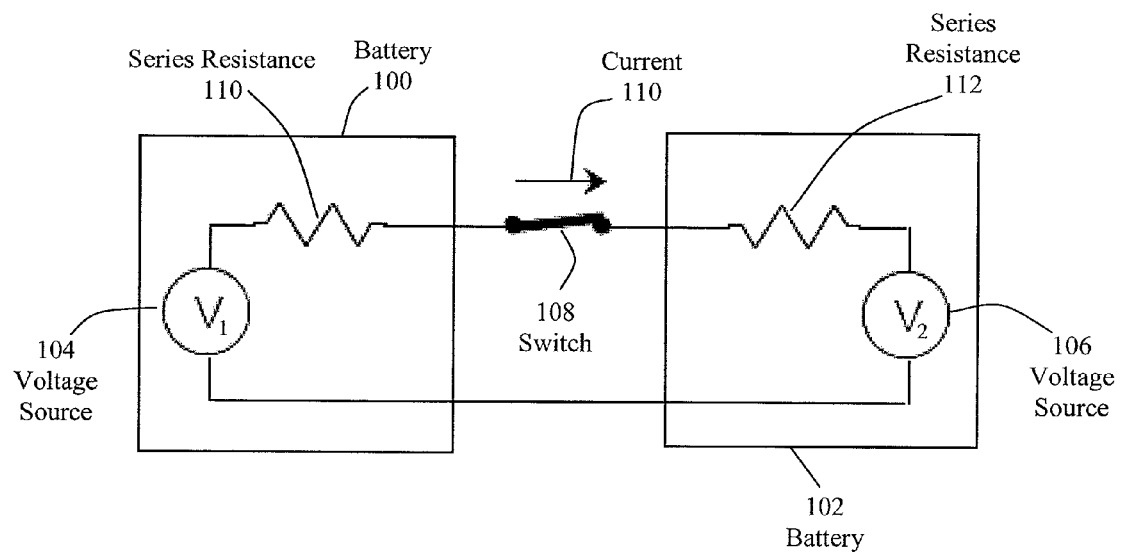
FIG. 2 is a schematic illustration of an embodiment of two batteries that are connected in parallel with a switch.

FIG. 2 is a schematic illustration of the batteries illustrated in FIG. 1, which are connected in parallel. As illustrated in FIG. 2, battery 100 includes a voltage source 104 and an internal series resistance 110. Battery 102 includes a voltage source 106 and an internal series resistance 112. When the switch 108 is connected, current 110 flows between the two batteries if the terminal voltages of the batteries are different. As illustrated in FIG. 2, the terminal voltage of battery 100 is greater than the terminal voltage of battery 102 so the current 110 flows in the direction of the arrow from battery 100 to battery 102. The difference in the terminal voltages as well as the magnitude of the internal resistances of the batteries control the magnitude of the current 110 that flows between the parallel connected batteries 100, 102.

Figure 3:
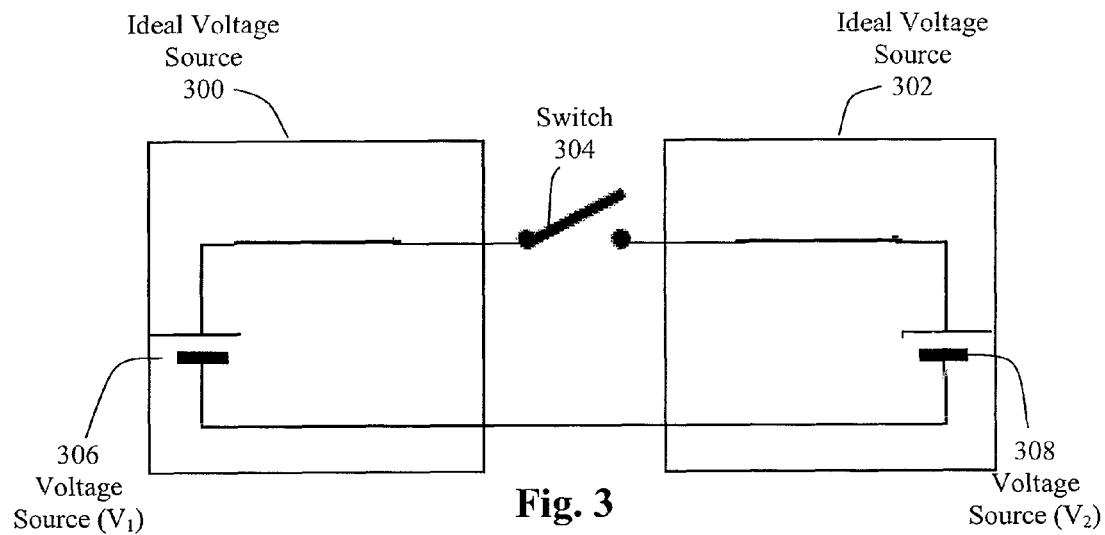
FIG. 3 is a schematic illustration of an embodiment of two ideal voltage sources that are wired in parallel for connection with a switch.

FIG. 3 is a schematic illustration of an embodiment of two ideal voltage sources 300, 302 that are wired in parallel for connection with a switch 304. As illustrated in FIG. 3, the ideal voltage source 300 includes a voltage source 306 that produces a voltage $V_1$ without any series resistance. Ideal voltage source 302 includes a voltage source 308 that produces a voltage $V_2$ without any series resistance. Switch 304 is used to connect the ideal voltage source 300 in parallel with the ideal voltage source 302.

Figure 4:
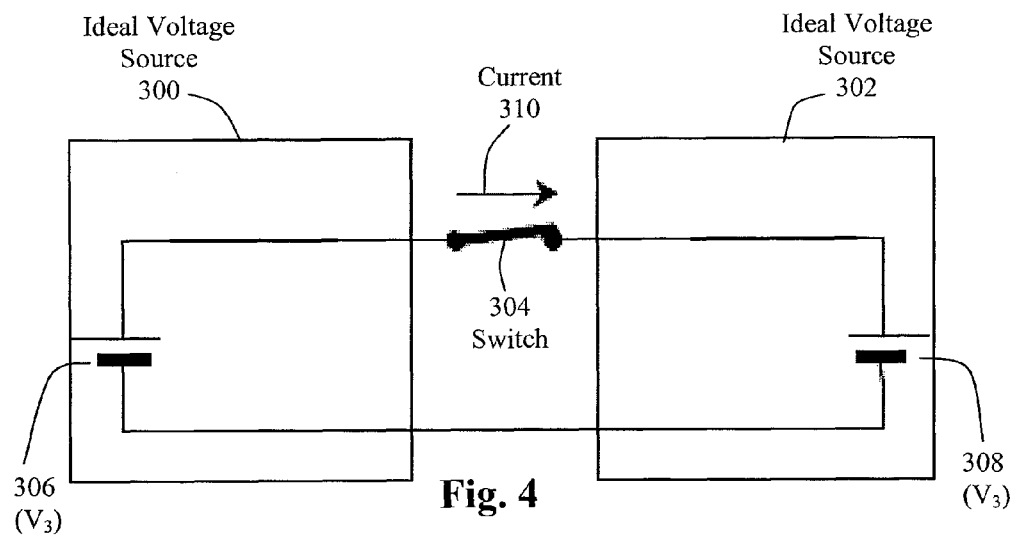
FIG. 4 is a schematic illustration of an embodiment of the two ideal voltage sources of FIG. 3 that are connected in parallel with a switch.

FIG. 4 is a schematic block diagram of the embodiment of FIG. 3 with the switch 304 closed. As shown in FIG. 4, the ideal voltage source 300 is connected in parallel through switch 304 to the ideal voltage source 302. Current 310 flows in the direction of the arrow when $V_1$ is greater than $V_2$. Since voltage source 300 is an ideal voltage source and voltage source 302 is an ideal voltage source, instantaneous current 310, upon closing switch 304, is infinite.

Figure 5:
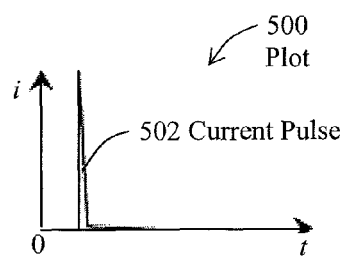
FIG. 5 is a graph of an embodiment of a current pulse produced when connecting two ideal batteries.

FIG. 5 is a graph of the current 310 versus time. The plot 500 shows an infinite pulse 502 of current 310 that occurs at t=0 when the switch 304 is closed.

Figure 6:
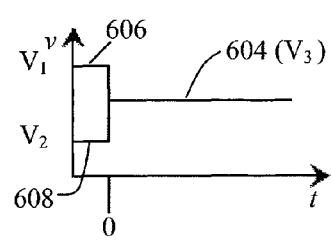
FIG. 6 is a graph of the voltages that are produced when connecting two ideal batteries in parallel.

FIG. 6 is a plot of voltage versus time. As shown in FIG. 6, the plot 606 shows the individual voltages 606, 608 of the ideal voltage sources 300 ($V_1$) and 302 ($V_2$), which combine at t=0 to create the average of $V_1$ and $V_2$, which is shown as voltage 604 ($V_3$). It is physically impossible for the voltages 606 and 608 of ideal voltage sources 306 and 308 to change instantaneously, and hence the intensity of current pulse 502 is infinite.

Figure 7:
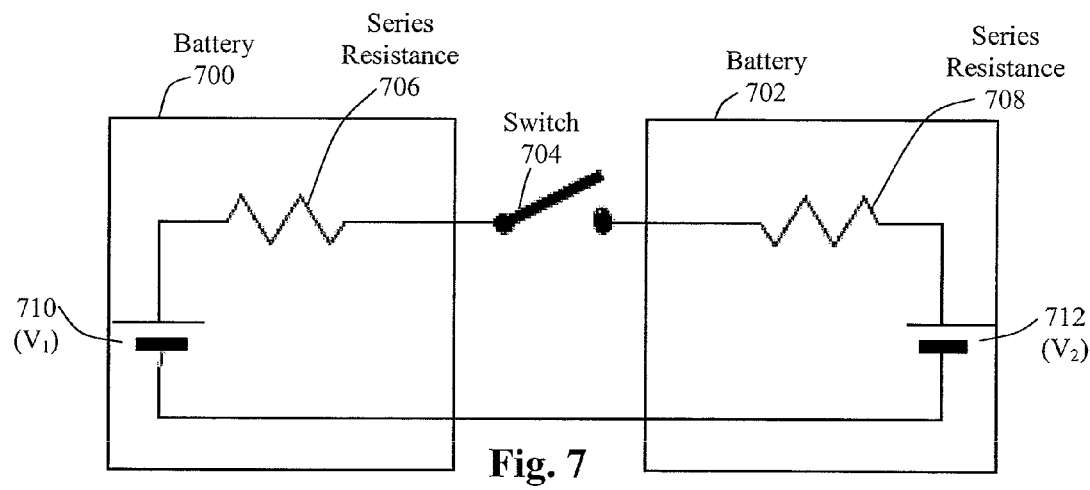
FIG. 7 is a schematic illustration of an embodiment of two real world batteries wired for connection parallel.

FIG. 7 is a schematic illustration of an embodiment of two batteries that are wired for connection in parallel by switch 704. As illustrated in FIG. 7, voltage source 710 having a voltage $V_1$ is connected in series with series resistance 706 in battery 700. Battery 702 includes a voltage source 712 having a voltage $V_2$ that is connected in series with series resistance 708. Switch 704 is in an open position until time t=0.

Figure 8:
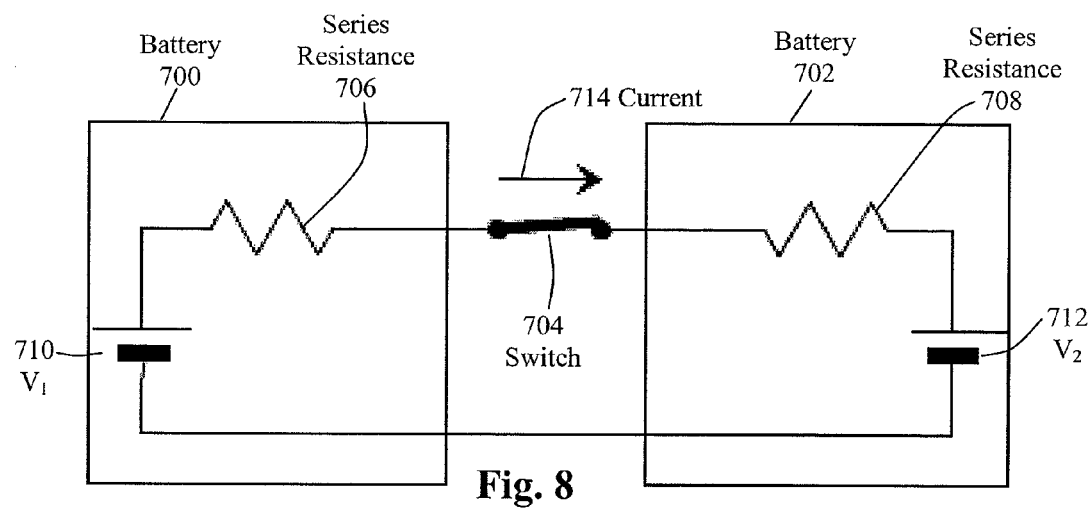
FIG. 8 is a schematic block diagram of an embodiment of the two real world batteries of FIG. 7 that are connected in parallel with a switch.

FIG. 8 is a schematic illustration of the embodiment of FIG. 7 with switch 704 closed. As illustrated in FIG. 8, battery 700, which includes the voltage source 710 having voltage $V_1$ and series resistance 706, is connected in parallel using switch 704 with battery 702, which has a voltage source 712, having a voltage $V_2$, that is connected to series resistance 706. When switch 704 is closed, current 714 flows from battery 700 to battery 702 assuming $V_1$ is greater than $V_2$.

Figure 9:
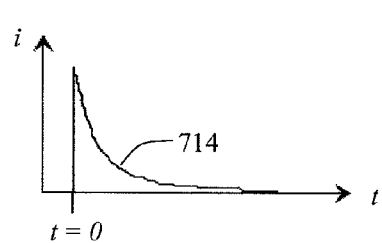
FIG. 9 is a plot of the current flowing between two real world batteries versus time.

FIG. 9 is a graph of current versus time for the current 714 flowing between battery 700 and battery 702 in FIG. 8. As shown in FIG. 9, the current 714 increases instantaneously at time t=0, when switch 704 is closed, and gradually decays to 0 current as batteries 700, 702 equalize charges. The peak value of the current in the plot illustrated in FIG. 9 is proportional to the difference in the terminal voltages of batteries 700 and 708, and inversely proportional to the magnitude of the series resistance 706, 708, which limit the current flowing between batteries 700, 702. The decay time constant of the current 714 illustrated in FIG. 9 is proportional to the sum of the capacities of batteries 700 and 702, assuming they are the same, and inversely proportional to the sum of the series resistances 706, 708.

Figure 10:
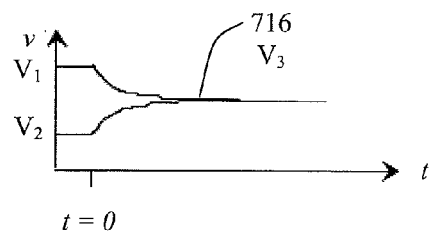
FIG. 10 is a plot of the internal, open circuit voltages of each battery.

FIG. 10 is a plot of the open circuit voltages of battery 710 and battery 712 versus time. Prior to the switch 704 being closed at t=0, the voltages $V_1$ and $V_2$ of batteries 710, 712, respectively, are illustrated in the graph of FIG. 10. At t=0, the voltages gradually equalize to create a third voltage ($V_3$) 716, which is the average of $V_1$ and $V_2$, assuming that battery 700 and 708 have the same capacity. The gradual averaging of the voltages occurs over time that is proportional to the sum of the capacities of batteries 700 and 702, assuming they are the same, and inversely proportional to the sum of the series resistances 706, 708. Since batteries have a non-zero series resistance, which limits the current to a finite value when two devices are first connected, the current decays asymptotically towards 0, as illustrated in FIG. 9, until enough charge has been transferred between the batteries to equalize the voltage, as illustrated in FIG. 10 The level of the current resulting from the initial interconnection of two batteries in parallel may be on the order of 0.1 C to 100 C (where C is the value of the capacitance of the battery), depending on the chemistry and the state of charge levels of the two batteries. A current of 1 C means that such current, if sustained, would discharge a full battery in 1 hour. Similarly, a current of 0.1 C means that such current, if sustained, would discharge a full battery in 10 hours. Similarly, a current of 100 C means that such current, if sustained, would discharge a full battery in 36 seconds, which is $\frac{1}{100}^{th}$ of an hour. Batteries can typically handle currents of up to 1 C, although a charging current of 1 C may be a problem for some cells. Charging currents of greater than 1 C are often too much current for charging a battery. Batteries that have a steep slope in their voltage versus state of charge curve, and a very low internal resistance and are close to being full, present an extreme case for charging currents, since when a cell is completely full, the internal charging resistance of the cell increases, thereby reducing the resulting current.

This extreme case exists for lithium ion batteries using "high power" cells. High power cells have a resistance that is particularly low (on the order of 25 mOhm*Ah) and the slope of the voltage versus state of charge curve for these cells is somewhat steep, especially when the cells are nearly full (on the order of 250 mV/1% SOC). As a consequence, when two such batteries, one at 100 percent SOC and the other at 90 percent SOC, are connected together in parallel, the initial current will be on the order of 100 C. The initial current of 100 C quickly drops to a lower value, but the initial current can be damaging, especially to the battery being charged. Lithium ion cells are normally rated to handle as much as 30 C of discharging current and therefore a mostly charged cell may be able to handle being connected in parallel with a lesser charged cell. However, lithium ion cells should only be charged at 0.5 C, or at most, 4 C. Therefore, cells will be damaged if charged at 100 C.

Lithium ion cells may be particularly sensitive to abuse, and they react by exploding and bursting in flames. Accordingly, the most care must be exercised when connecting such batteries in parallel. Lithium ion batteries should be connected directly in parallel only when the voltages on these batteries are equal or nearly equal so that the resulting current is minimized and damage does not occur to the batteries or cells.

In fact, applications that use any batteries with low series resistance require methods of safely connecting these batteries in parallel to avoid damage that may occur from excessive currents on initial connection. The peak surge current when two batteries are connected in parallel is equal to the difference in voltage divided by the total series resistance in the circuit, which is mostly the internal resistance of the batteries. To reduce that peak, either the numerator, which is the difference in the voltages of the batteries, should be minimized, or the denominator, which is the total series resistance, should be maximized. Newer battery technologies are characterized by low internal series resistance which is a desirable feature. Hence, attempting to reduce the peak current by increasing the series resistance is not a viable solution since increasing the series resistance will result in a significant amount of energy being dissipated as heat during normal operation. As such, minimizing the difference in battery voltages presents the best technique for minimizing initial peak currents when batteries are initially connected in parallel.

FIG. 11 is a schematic illustration of an embodiment of two parallel connected batteries 1100. As illustrated in FIG. 11, battery 1102 includes a voltage source 1114 having a voltage ($V_1$) that is equal to 12 volts. The series resistance 1110 of battery 1102 is 0.5 mOhm. Battery 1104 has a voltage source 1116 having a voltage $V_2$ that is equal to 10 volts. The series resistance 1112 is the same as series resistance 1110 of battery 1102, which is 0.5 mOhm.

FIG. 12 is a calculation 1200 of the initial current 1106 created when batteries 1102, 1104 are connected in parallel, as illustrated in FIG. 11. As shown in FIG. 12, the initial current is the difference in the voltages, i.e., 12 volts minus 10 volts (2.0 volts), which is divided by the total of the series resistances, which is 1 mOhm. This results in an initial current of 2,000 amps.

FIG. 13 is a schematic illustration of an embodiment of two parallel connected batteries 1300. Battery 1302 is connected in parallel with battery 1304 by switch 1308. Voltage source 1314 of battery 1302 provides a voltage of 10.2 volts. The series resistance 1310 of battery 1302 is 0.5 mOhm. Battery 1304 includes a voltage source 1316, which provides a voltage $V_2$ equal to 10 volts. Series resistance 1312 of battery 1304 is 0.5 mOhm. When switch 1308 is closed, current 1306 flows between batteries 1302, 1304.

FIG. 14 is an equation illustrating a calculation 1400 of the initial current 1306 that flows between the two batteries 1302, 1304 when switch 1308 is initially closed. As illustrated in FIG. 14, the current (i) 1306 is equal to the difference in voltages, which is 10.2 volts minus 10 volts (0.2 volts) divided by the total resistance of the two batteries, which is 1 mOhm. The initial current is calculated as 200 amps. Hence, the change of voltage from a difference of 2 volts to a difference of 0.2 volts reduces the initial current by an order of magnitude from 2000 amps to 200 amps.

FIG. 15 is a schematic illustration of an embodiment of two parallel connected batteries 1500. As illustrated in FIG. 15, battery 1502 includes a voltage source that has a voltage $V_1$ equal to 10.02 volts. The series resistance 1510 of the battery 1502 is 0.5 mOhm. Battery 1504 has a voltage source 1516 that has a voltage $V_2$ equal to 10 volts. The series resistance 1512 of battery 1504 is 0.5 mOhm. Switch 1508 connects battery 1502 in parallel with battery 1504 so that a current 1506 flows between the batteries.

FIG. 16 is a calculation 1600 of the initial current 1506 that flows between battery 1502 and battery 1504 when initially connected. The current (i) 1506 is equal to the difference in voltages 10.02 minus 10 volts, which is 0.02 volts, divided by the total series resistance of batteries 1502 and 1504, which is 1 mOhm. This produces an initial current of 20 amps. The difference in voltages is reduced by an order of magnitude, which reduces the initial current by an order of magnitude to 20 amps from 200 amps, as illustrated in FIG. 14.

Accordingly, FIGS. 11-16 illustrate the manner in which the initial current can be greatly reduced by connecting batteries that have output voltages that are very close. FIGS. 11-16 also provide a perspective that a difference between the batteries of only 0.02 volts can still result in an initial current of 20 amps.

These same problems are also encountered when a battery is connected to a load that has a large capacitance. The initial in-rush of current to charge up the capacitor of the load to the battery voltage can result in damage to the battery, the load, and/or interconnections between the battery and the load.

As illustrated in FIG. 17-21, precharging of a load can be used to equalize the charge on the load and the battery, which can limit the initial in-rush of current when the capacitive load and the battery are initially connected. As illustrated in FIG. 17, battery 1702 has a voltage $V_1$. A precharge resistor 1710 is used, which may have a resistance of 100 ohms. Precharge switch 1708 is used to connect the battery 1702 to a capacitive load 1704 to charge the load 1704 to a charge level that is substantially equal to the charge level $V_1$ of battery 1702.

As shown in FIG. 18, pre-charge switch 1708 is closed, and current flows from the battery 1702 to charge the load 1704. The precharge switch remains closed until the battery 1702 and load 1704 are equalized.

As illustrated in FIG. 19, once the capacitive load 1704 is charged to the voltage $V_1$, the main switch 1706 is closed and the pre-charge switch 1708 is opened. Current can then flow from the battery 1702 directly to the load 1704, such as during operation of the load 1704. The precharge resistor 1710 is eliminated from the circuit since the pre-charge switch 1708 is open.

FIG. 20 illustrates a graph 1900 that illustrates the current by flowing from the battery 1702 through the load 1704 when the pre-charge switch 1708 is initially connected. As illustrated in FIG. 20, the initial current has a spike, which gradually decays. The initial current is equal to $V_1$ over R, which may range from approximately 10 amps to 100 amps.

FIG. 21 is a graph of the voltage across the load 1704 versus time. As shown in FIG. 21, the voltage plot 1704 of the voltage across the load 1704 increases rapidly until it reaches the battery voltage $V_1$ at approximately t=1.

The use of a resistor, such as precharge resistor 1710, as illustrated in FIGS. 17-21, for precharging has the disadvantage of dissipating energy, which is undesirable in situations in which battery charge is a valuable commodity. An additional surge may occur when the main switch is connected to the load if the voltages are not sufficiently equalized.

Post discharging of loads may also be necessary for safety reasons and other reasons. Post discharging resistors can be used for this process, such as illustrated in FIGS. 22-25. FIG. 22 illustrates a post discharge circuit 2200. As illustrated in FIG. 22, battery 2202 has a voltage $V_1$. Battery 2202 is connected to switch 2208 so that current 2302 is supplied to load 2204. Switch 2210 is open, which isolates the discharge resistor 2206.

FIG. 23 is an illustration of the discharge circuit 2200 during the post discharge mode. As illustrated in FIG. 23, switch 2208 is open and switch 2210 is closed. Discharge resistor 2206 discharges the current 2400 on the load 2204 through dissipation in discharge resistor 2206 while switch 2210 is closed. Battery 2202 is disconnected from the circuit by switch 2208.

FIG. 24 is a graph 2400 of the current flowing through the discharge resistor 2206. As shown in FIG. 24, at t=0 the current has an initial spike when switch 2210 is closed and decays to 0 over time proportional to the size of the discharge resistor 2206 and to the capacity of load 2204.

FIG. 25 is a graph of the voltage across the load 2400 versus time. At time t=0, the voltage is equal to $V_1$. The voltage across the load 2204 slowly decays as the current 2400 flows through the discharge resistor 2206. Again, the charge on the capacitive load is wasted as dissipated heat.

FIG. 26 is a schematic illustration of an embodiment a battery connection circuit 2600. Battery module 2602 includes a battery 2208 and a controller 2612. Controller 2612 controls the operation of switch 2610 and detects the terminal voltage of battery 2608 on nodes 2630, 2628 and a second battery 2604 on nodes 2620, 2628. Battery 2604 is connected to battery module 2602 by terminals 2620, 2622. Controller 2612 may also be connected to the battery 2604 to detect any current flowing from the battery 2604 to load 2626. Detection of current may occur over a communication link from a module mounted on the battery 2604 or from a separate circuit (not shown) connected to the battery 2604.

As shown in FIG. 26, switch 2610 is open. Hence, current 2606 does not flow between battery 2608 and battery 2604. Controller 2612 generates a control signal 2614, which activates the switch 2610. Controller 2612 activates the switch 2610 when it is determined that the terminal voltages of battery 2608 and battery 2604 are sufficiently close that an initial rush of current between battery 2608 and battery 2604 will not damage either of the batteries, terminals 2620, 2622 or switch 2610. Controller 2612 may also detect current flowing from battery 2604 to a load 2626, as indicated above. If current is flowing from the battery 2604, the open circuit voltage may be different from the terminal voltage of the battery 2604 since the load 2626 may draw down the terminal voltage of battery 2604, due to the internal series resistance of battery 2604. If the switch 2610 is closed when the battery 2604 is connected to a load 2626 and a substantial amount of current is flowing between the battery 2604 and the load 2626, a surge in current may occur between battery 2604 and battery 2608 if the load 2626 is disconnected or the current between battery 2604 and the load 2626 changes. As such, controller 2612 includes logic that may prevent generation of control signal 2614 to close the switch 2610 if the current from the battery 2604 to a load 2626 is high.

FIG. 27 is a graph of the current 2606 versus time. Since the switch 2610 is in an open condition, the current 2606 is zero until t=0. When t>0, there is no current since battery 2608 has the same exact terminal voltage as the terminal voltage of battery 2604.

FIG. 28 is an illustration of the battery connection circuit 2600 of FIG. 26 with the switch 2610 in a closed position. As shown in FIG. 28, at time t=0 switch 2610 closes. Controller 2612 detects the terminal voltage of battery 2604 and battery 2608 to determine if the switch 2610 can be safely closed without causing a large in-rush of current that may damage the batteries. Having done so, even after switch 2610 closes at time t=0, there is no significant current, as shown in FIG. 28.

FIG. 29 is a graph showing the voltage at terminals 2620, 2622. At time t=0, switch 2610 is closed, which applies the voltage ($V_1$) of battery 2608 to the terminals 2620, 2622, which is the same as the terminal voltage of battery 2604. As controller 2612 ensured that the voltage of battery module 2602 was close to the voltage of battery 2604 before closing switch 2610, the voltage across terminals 2620 and 2622 remains the same after switch 2610 is closed.

Figure 30:
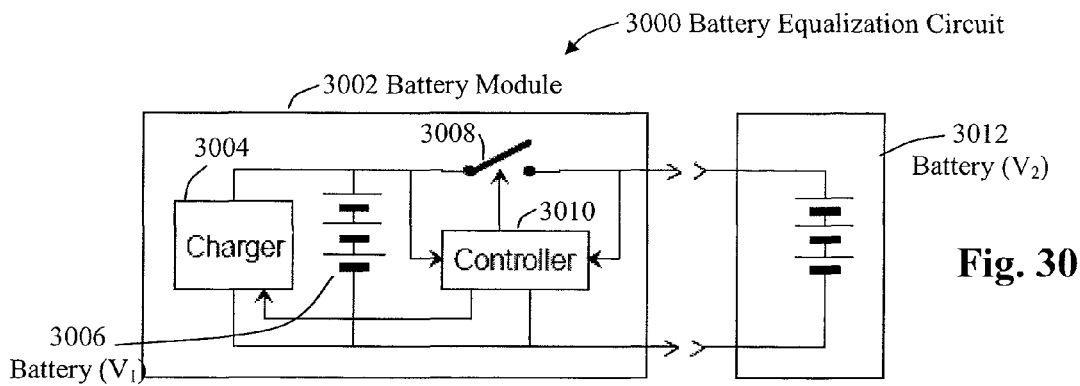

FIGS. 30-33 disclose a charging battery equalization circuit 3000 in different states of operation. As illustrated in FIG. 30, a battery module 3002 is wired for connection to battery 3012 having a voltage ($V_2$). Battery module 3002 includes a battery 3006 having a voltage ($V_1$). A charger 3004 is connected to battery 3006 and is controlled by a controller 3010. Controller 3010 is connected to the terminals of battery 3012 to detect the terminal voltage of battery 3012. In addition, controller 3010 is connected to the terminals of battery 3006 to detect the terminal voltage of battery 3006. Controller 3010 also controls the operation of switch 3008.

Figure 31:
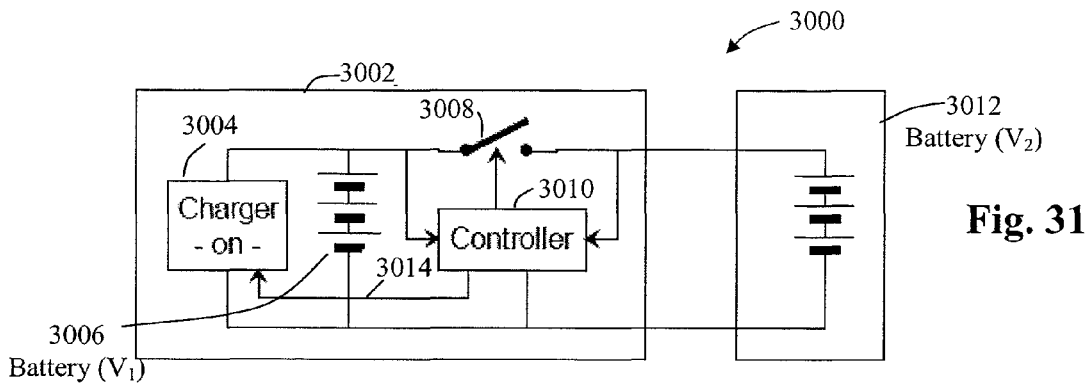

In FIG. 31, the battery module 3002 is connected to battery 3012. Controller 3010 detects that the terminal voltage ($V_2$) is greater than the battery voltage ($V_1$) of battery 3006. Controller 3010 generates a control signal 3014 to activate charger 3004 to charge battery 3006. Switch 3008 remains in the open position while battery 3006 is being charged.

Figure 32:
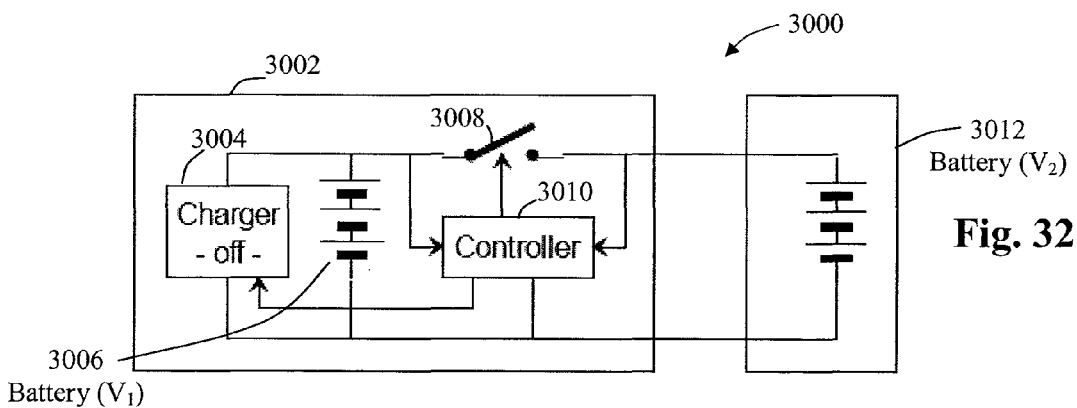

In FIG. 32, controller 3010 detects that the terminal voltage of battery 3006 is charged to same voltage level as the terminal voltage of battery 3012. In other words, battery 3006 is charged until $V_1$ equals $V_2$. Controller 3010 then turns off the charger 3004. Switch 3008 remains in the open position.

Figure 33:
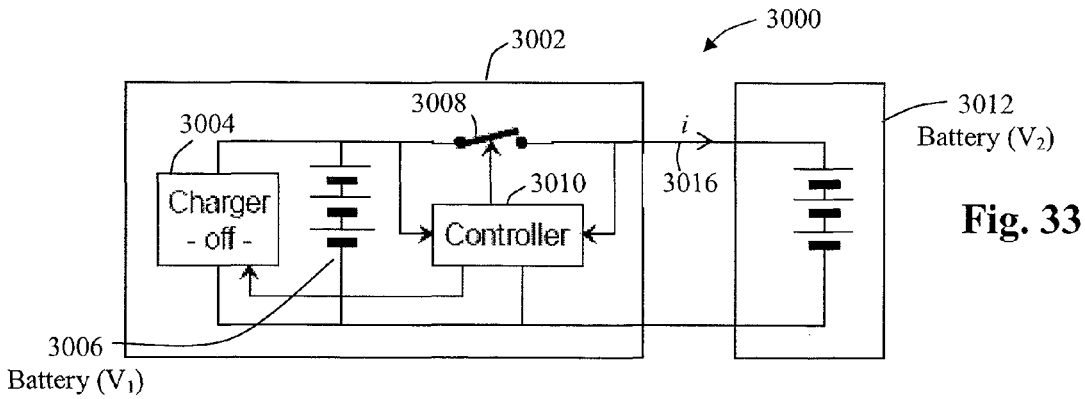

In FIG. 33, controller 3010 closes the switch 3008 after detecting that the voltage ($V_1$) in battery 3006 is substantially equal to the voltage ($V_2$) in battery 3012. Charger 3004 remains in the off position. Current 3016 that flows initially between the battery module 3002 and battery 3012 is essentially zero.

FIGS. 34-37 illustrate a battery equalization circuit 3400 in different states of operation. As illustrated in FIGS. 34-37, a charger 3414 is used to charge battery 3412, which has a voltage ($V_2$) that is less than the voltage ($V_1$) on battery 3404.

Figure 34:
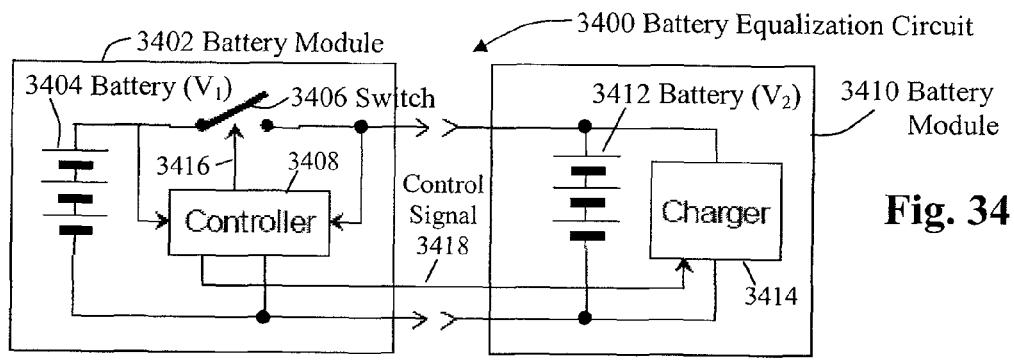

As illustrated in FIG. 34, battery module 3402 is wired for connection with battery module 3410. Battery module 3402 includes a battery 3404 that has a terminal voltage ($V_1$). Controller 3408 generates a control signal 3416 to control switch 3406. Controller 3408 also generates a control signal 3418 that controls the operation of charger 3414 to charge battery 3412 in battery module 3410.

Figure 35:
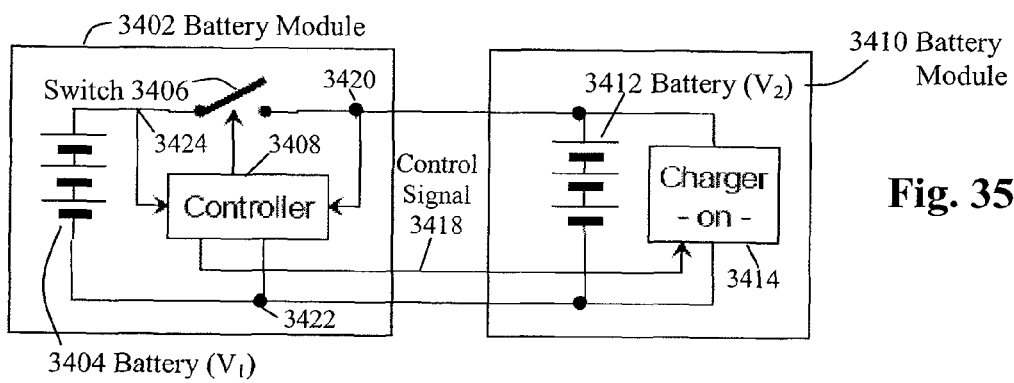

As illustrated in FIG. 35, battery module 3410 is connected to battery module 3402, but no current is flowing between battery 3404 and battery 3412 since switch 3406 is in the open position. Controller 3408 detects the terminal voltage of battery 3412 at nodes 3420, 3422. Similarly, controller 3408 detects the terminal voltage of battery 3404 at nodes 3424, 3422. The value of the measurement of the voltage of battery 3412 can also be provided to controller 3408 over a communication link from a controller in battery module 3410 (not shown). Controller 3408 detects that the battery 3412 has a terminal voltage ($V_2$) that is less than the terminal voltage ($V_1$) of battery 3404. Controller 3408 then generates control signal 3418 to turn on charger 3414 to charge battery 3412.

Figure 36:
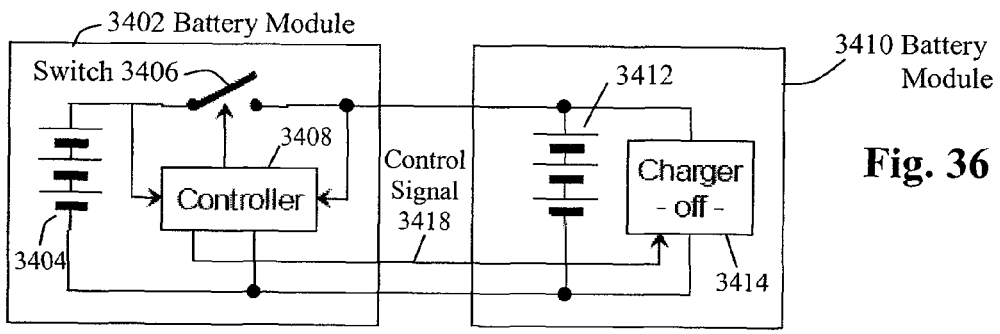

As illustrated in FIG. 36, controller 3408 detects that battery 3412 has been charged to a voltage which is substantially equal to the voltage of battery 3404, and generates a control signal 3418 to turn off the charger 3414. In other words, controller 3408 detects that $V_1$ is substantially equal to $V_2$. Switch 3406 of battery module 3402 remains in an open position so that no current is flowing between battery module 3402 and battery module 3410.

Figure 37:
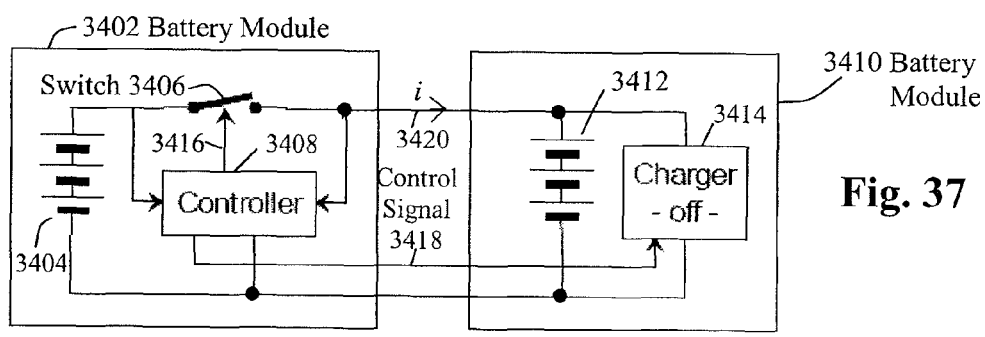

As illustrated in FIG. 37, the controller generates the control signal 3416 to close switch 3406, once the controller 3408 has detected that the voltage ($V_1$) of battery 3404 is substantially equal to the voltage ($V_2$) of battery 3412. Control signal 3418 causes the charger 3414 to remain in an off condition. A low level current (i) 3420 then may flow between the battery module 3402 and battery module 3410 to further equalize the charges between batteries 3404, 3412. Current 3420 should remain at a sufficiently low level so the damage is not caused to batteries 3404, 3412 since battery 3412 has been charged so that $V_2$ is substantially equal to $V_1$.

Of course, chargers can be placed in both battery modules, which would constitute a combination of the circuits illustrated in FIGS. 30-33 and FIGS. 34-37.

FIGS. 38-41 illustrate a discharging equalizer circuit 3800. If there is no external source of power to charge the batteries, the battery modules may include a load resistor to dissipate energy and lower the voltage of the battery that is at a higher voltage in order to equalize the voltages between the batteries prior to connection.

Figure 38:
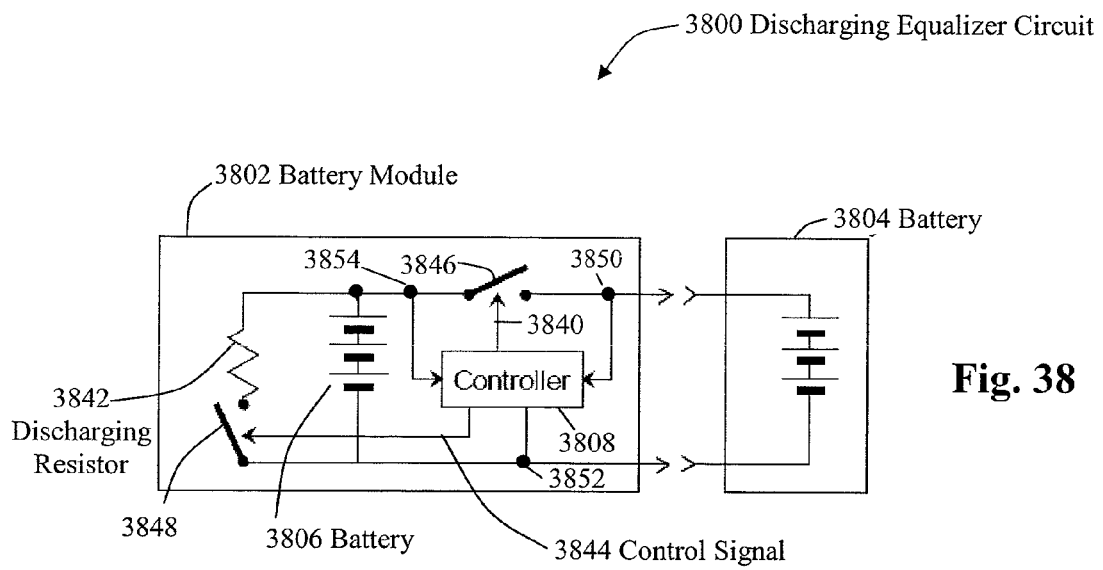
FIGS. 38-41 are schematic illustrations of an embodiment of a discharging equalization circuit in various states where

As illustrated in FIG. 38, the discharging equalizer circuit 3800 includes a battery module 3802 that is wired for connection with a battery 3804. Battery module 3802 includes a battery 3806 that has a terminal voltage ($V_1$). Discharging resistor 3842 is wired to be connected in parallel with battery 3806 upon activation of switch 3848. Controller 3808 generates a control signal 3844 that activates switch 3848 to connect the discharging resistor 3842 in parallel with battery 3806. Controller 3808 also generates a control signal 3840 to activate switch 3846. Battery 3804 has a voltage ($V_2$) that is greater than $V_1$ in the example illustrated in FIGS. 38-39.

Figure 39:
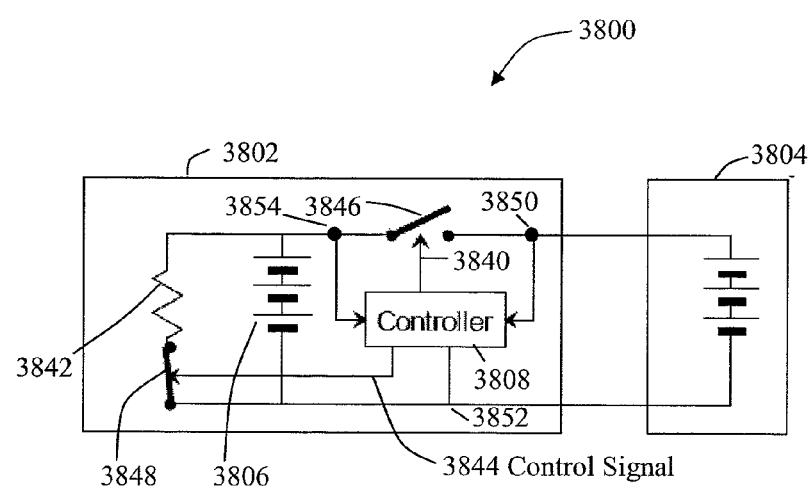

As shown in FIG. 39, controller 3808 has determined that the battery 3806 has a voltage that is greater than the voltage of battery 3804 by detecting the terminal voltage of battery 3804 on nodes 3850, 3852 and battery 3806 on nodes 3854, 3852. Battery voltages can also be reported through a communication link from a controller on battery 3804 (not shown). Switch 3848 is activated by a control signal 3844 from controller 3808, which connects the discharging resistor 3842 in parallel with the battery 3806. The discharge resistor causes the battery 3806 to discharge by dissipating energy in the discharging resistor 3842.

Figure 40:
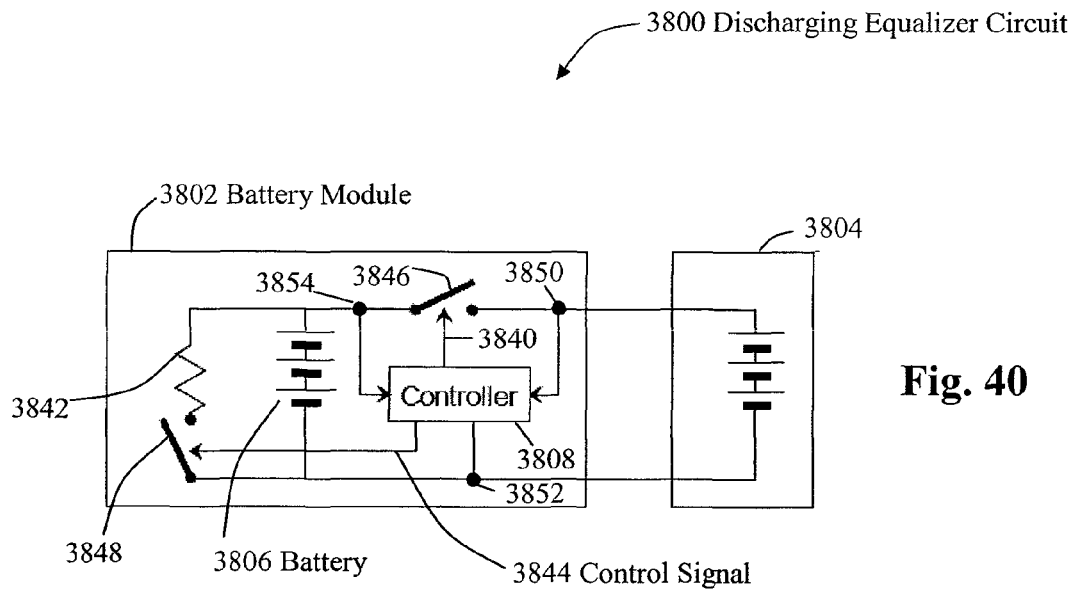

In FIG. 40, the controller 3808 detects the voltage on the battery 3806 on nodes 3854, 3852 and voltage on battery 3804 on nodes 3850, 3852, or through a communications link. Once the voltage on battery 3806 is substantially equal to the charge of battery 3804, the controller 3808 deactivates control signal 3844 to open switch 3848, as illustrated in FIG. 40.

Figure 41:
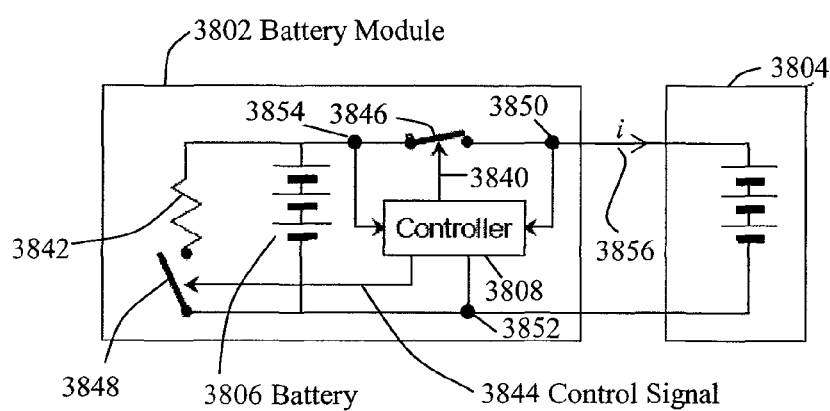

As illustrated in FIG. 41, controller closes the switch 3846 to connect battery 3806 in parallel with battery 3804 after switch 3848 has been opened, and the voltages on batteries 3806, 3804 are substantially equal so that an initial in-rush of current does not occur.

Figure 42:
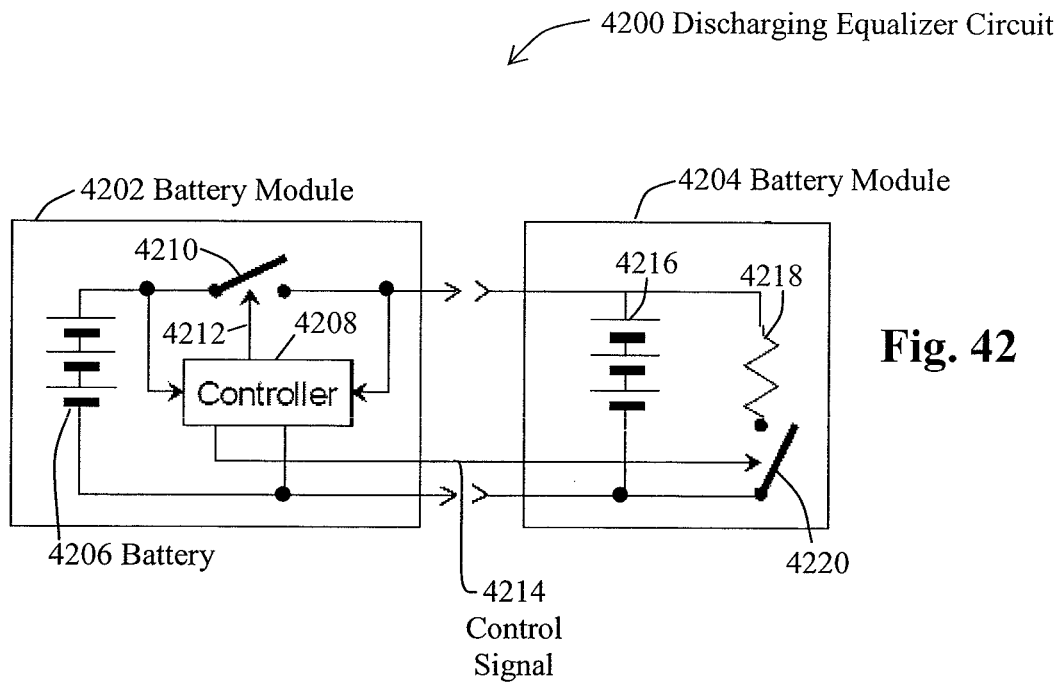
FIGS. 42-45 are schematic illustrations of an embodiment of a discharging equalization circuit in various states.

FIGS. 42-45 illustrate a discharging circuit 4200, which discharges battery module 4204. As illustrated in FIG. 42, battery 4206 has a voltage that is lower than battery 4216 of battery module 4204. Battery module 4202 is wired for connection in parallel with the battery module 4204. Controller 4208 generates a control signal 4214 that operates switch 4220. Switch 4220 connects discharge resistor 4218 in parallel with battery 4216 to discharge battery 4216. Controller 4208 also generates a control signal 4212 to activate switch 4210, which connects battery module 4202 in parallel with battery module 4204 when the voltages on batteries 4206, 4216 are substantially equal so that a large in-rush of current does not occur.

Figure 43:
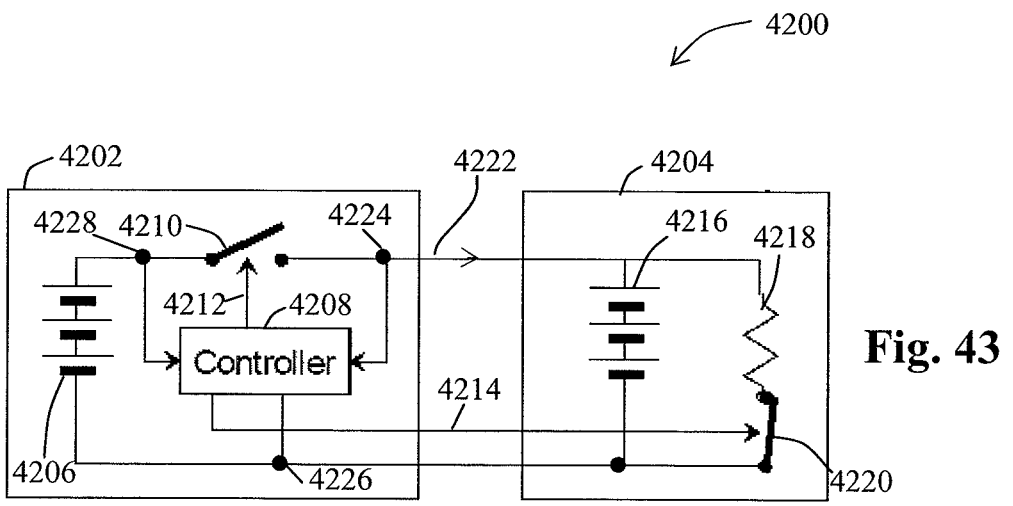

FIG. 43 is another illustration of the discharging equalization circuit 4200. As shown in FIG. 43, battery module 4202 is connected to battery module 4204. However, current does not flow between battery module 4202 and battery module 4204 since switch 4210 is in the open position. Controller 4208 detects the terminal voltages of battery 4216 on nodes 4224, 4226. Similarly, controller 4208 detects the terminal voltages of battery 4206 on nodes 4228, 4226. Since the controller 4208 detects that the voltage on battery 4216 is greater than the voltage of battery 4206, controller 4208 activates control line 4214 to close switch 4220. Switch 4220 connects discharging resistor 4218 in parallel with battery 4216 to discharge battery 4216.

Figure 44:
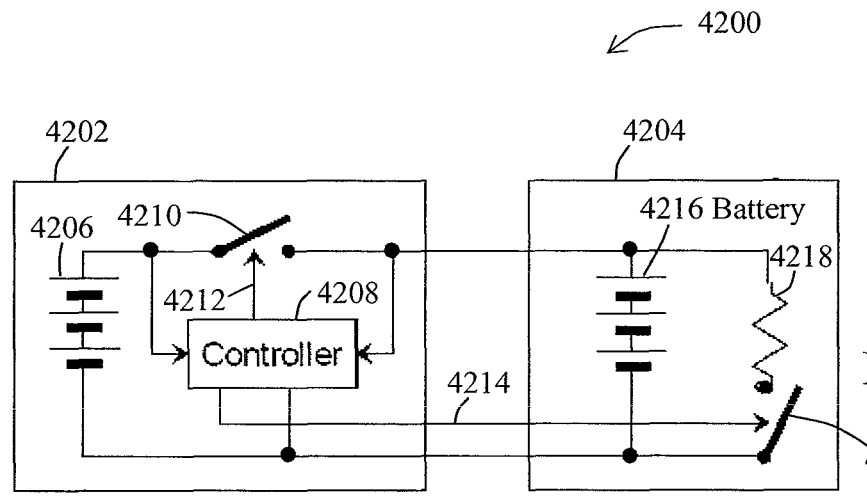

FIG. 44 is a schematic illustration of the discharging equalization circuit 4200 with switch 4220 in an open position. Controller 4208 generates a control signal 4214 that opens switch 4220 once the terminal voltage of battery 4216 is substantially equal to the terminal voltage of battery 4206.

Figure 45:
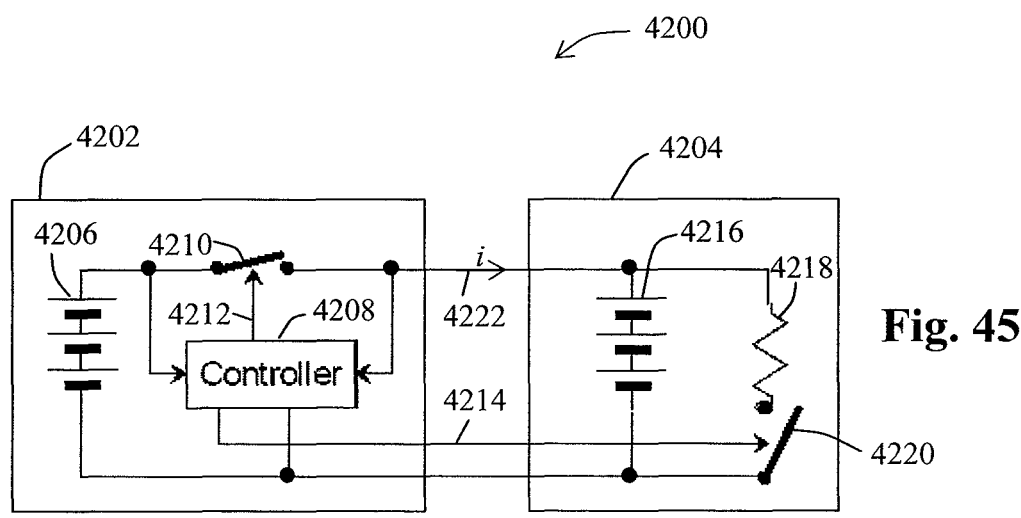

As illustrated in FIG. 45, controller 4208 then activates switch 4210 to connect battery module 4202 in parallel with battery module 4204. Current 4222 is sufficiently low that damage is not caused to batteries 4206, 4216.

Although FIGS. 38-41 illustrate the discharging of one of the batteries, and FIGS. 42-45 illustrate the discharging of the other battery, these circuits can be combined to allow discharge of either set of batteries by a controller.

Figure 46A:
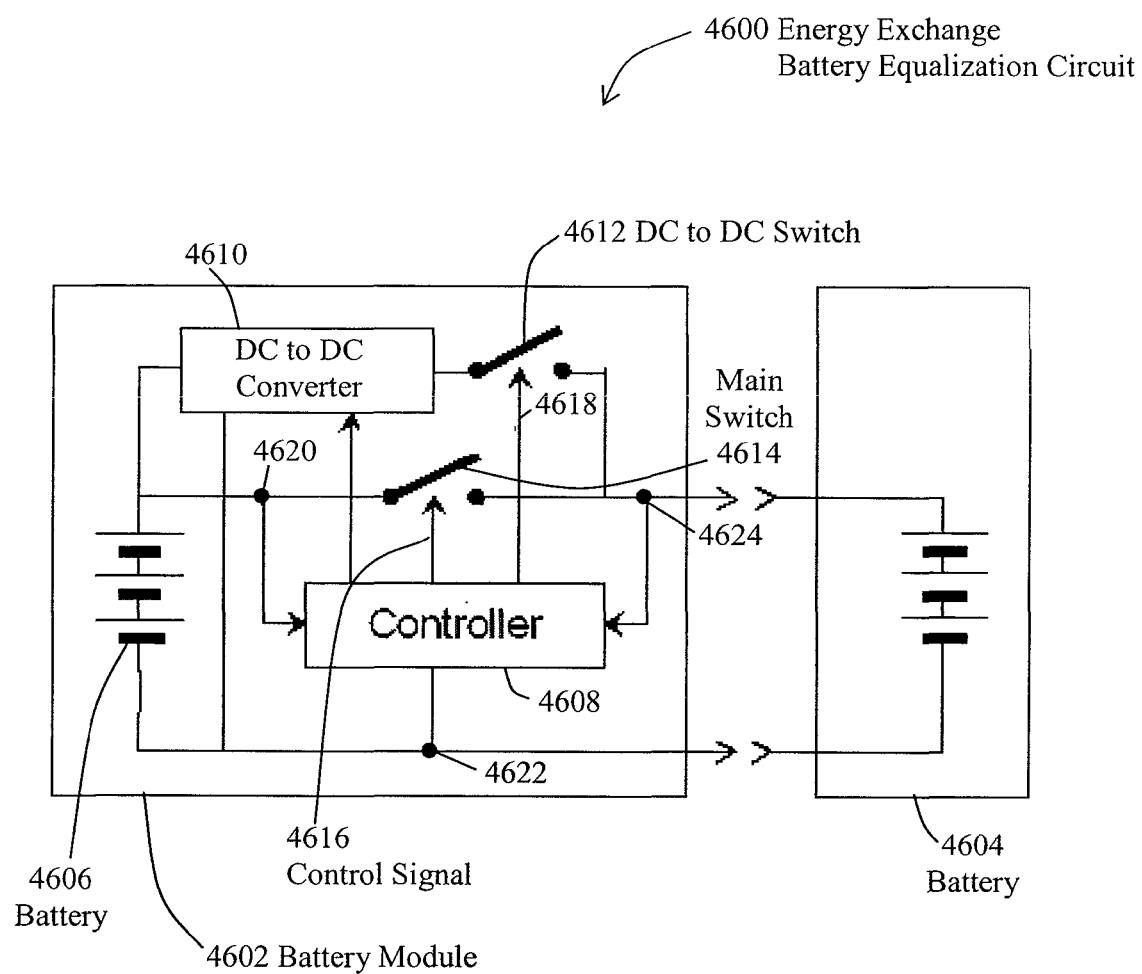
FIG. 46A is a schematic block diagram of an embodiment of an energy exchange equalization circuit between two batteries.

FIG. 46A is a schematic block diagram of an energy exchange battery equalization circuit 4600. The circuits illustrated in FIGS. 38-45 disclose energy dissipation circuits, which dissipate energy from one of the batteries to equalize the charge on the batteries so that the initial in-rush of current does not damage the batteries. However, dissipation of energy from the batteries is inefficient. The energy exchange battery equalization circuit 4600 does not require charging, which requires an external energy source, or dissipation of charge, which results in wasted energy. The energy exchange battery equalization circuit 4600 operates by exchanging charge between the batteries prior to connection of the batteries in parallel so that the terminal voltages of the batteries, when connected in parallel, are substantially equal so that a large amount of current is not created, which may cause damage to the batteries. As illustrated in FIG. 46A, controller 4608 detects the terminal voltage of battery 4606 at nodes 4220, 4222. Similarly, controller 4608 detects the terminal voltage of battery 4604 at nodes 4624, 4622. All of this is performed while the main switch 4616 is open. The DC to DC converter 4610 is disposed in the battery module 4602. The DC to DC converter 4610 is connected between battery 4606, 4604 upon closing of the DC to DC switch 4612 in response to a control signal 4618. When the controller 4608 detects a difference in the terminal voltages of batteries 4606, 4604, controller 4608 generates a control signal 4618 that connects the DC to DC converter 4610 to batteries 4606, 4604. The DC to DC converter 4610 may comprise a bi-directional DC to DC converter that is capable of transferring charge in either direction between batteries 4606, 4604. In addition, the DC to DC converter 4610 may comprise a pair of DC to DC converters including a step-up converter and a step-down converter that can be connected in the proper orientation in response to the detected voltages and states of charge of the batteries 4606, 4604 by controller 4608. The DC to DC converter 4610 transfers charge between the batteries 4606, 4604 until the voltages or states of charge are substantially equal. At that point, controller 4608 generates a control signal 4616 that closes the main switch 4614 to connect 4606 in parallel with battery 4604. A substantial in-rush of current does not occur as long as the voltages of batteries 4606, 4604 are substantially equalized by the DC to DC converter 4610.

Figure 46B:
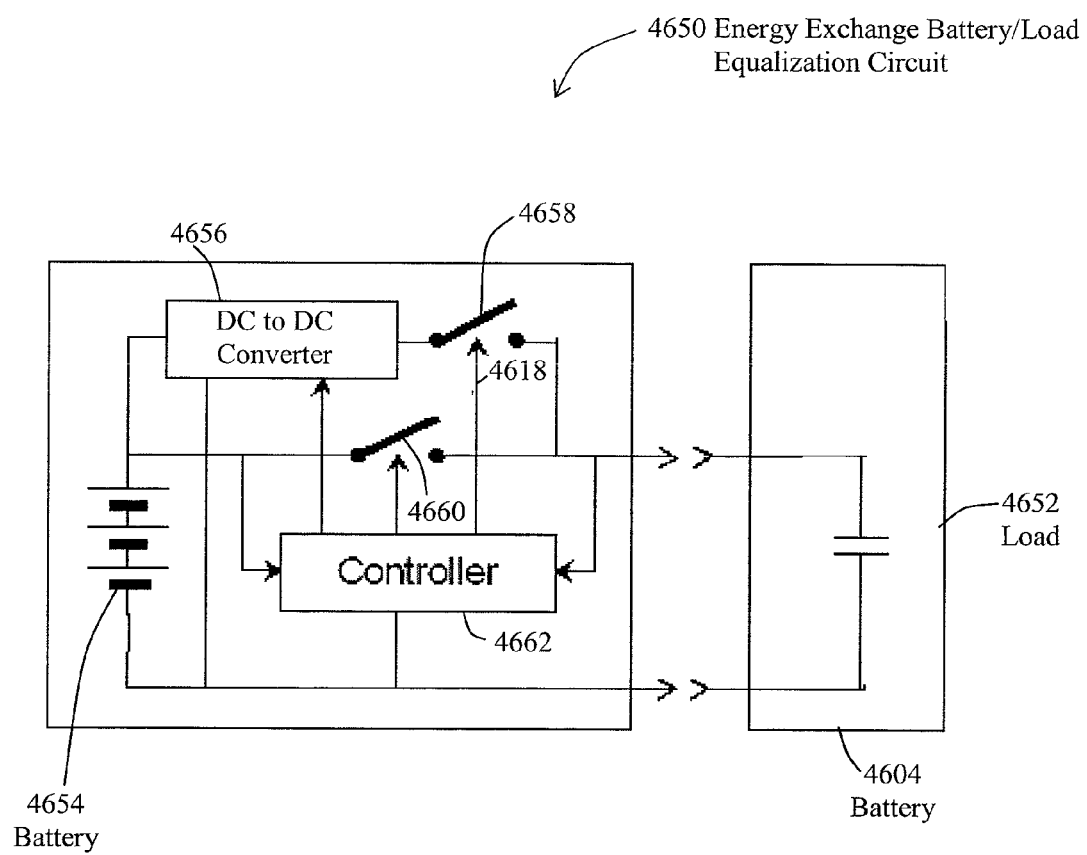
FIG. 46B is a schematic block diagram of another embodiment of an energy exchange equalization circuit between a battery and a capacitive load.

FIG. 46B discloses an energy exchange battery/load equalization circuit 4650. The energy exchange battery/load equalization circuit 4650 is similar to the energy exchange battery equalization circuit 4600, illustrated in FIG. 46A. The difference between the circuits is that the charge on a capacitive load 4652 is equalized with the charge on battery 4654 prior to connecting the circuits to prevent damage to battery 4654 and/or load 4652. Load 4652 may include a large capacitive load such as may be present at the input of a motor controller circuit. For example, motor controller circuits are used in electric cars and other electric vehicles to control the application of current to the motors of the vehicles. Controller 4662 can detect the terminal voltages of the load 4652 and the battery 4654 to determine when the terminal voltages become substantially equal. Controller 4662 activates switch 4658 to allow the DC to DC converter 4656 to charge the load 4652 to the voltage of the battery 4654. Once the load 4652 has a voltage that is substantially the same as the voltage of the battery 4654, the switch 4658 is opened by controller 4662, and the main switch 4660 is closed. After switch 4660 is opened, the DC to DC converter 4656 can also be used to discharge the charge on load 4652 and apply that charge to the battery 4654 to further conserve energy. Discharging the load 4652 is also done to remove voltage from load 4652, for safety purposes.

Figure 47:
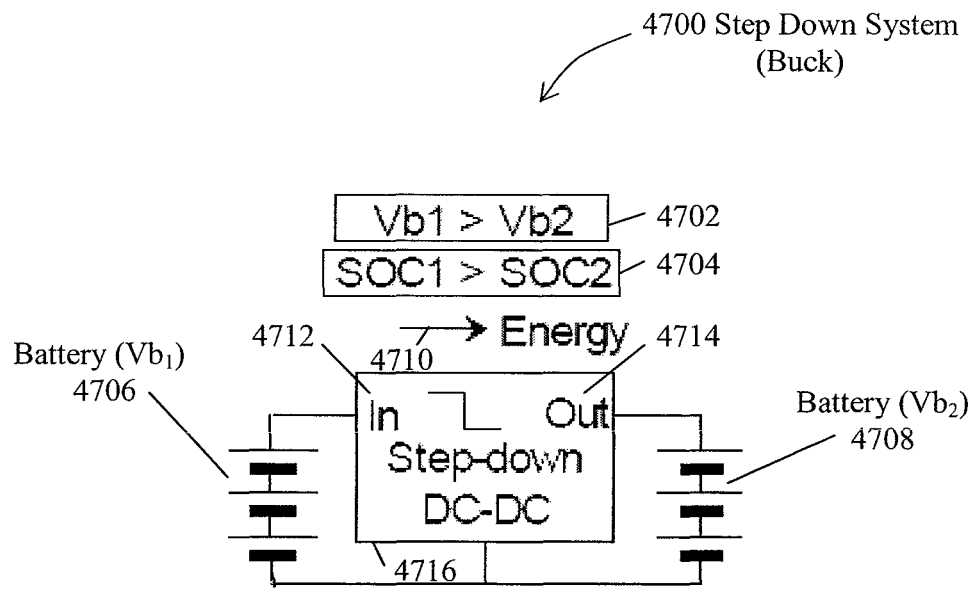
FIG. 47 is a schematic illustration of an embodiment of an energy exchange equalization circuit in the case that the state of charge of a first battery is greater that the second battery, using a step-down DC-DC converter.

FIG. 47 illustrates the manner in which a step-down converter system 4700 can be used to transfer charge between a first battery 4706 and a second battery 4708. As illustrated at block 4702, the voltage $Vb_1$ of battery 4706 is greater than the voltage $Vb_2$ of battery 4708. A step-down DC to DC converter 4716 has an input 4712 that is connected to battery 4706. The output of the step-down DC to DC converter 4716 is connected to battery 4708. As indicated at block 4704, the state of charge SOC1 of battery 4706 is greater than the state of charge SOC2 of battery 4708. In this manner, energy can be transferred from battery 4706 to battery 4708 in the direction of the arrow 4710.

Figure 48:
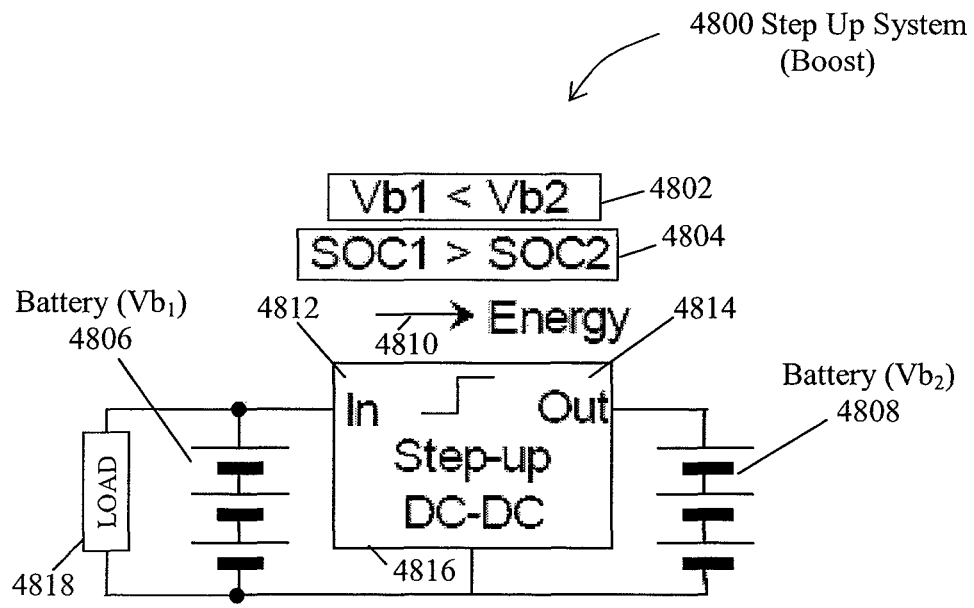
FIG. 48 is a schematic illustration of an embodiment of an energy exchange equalization circuit in the case that the state of charge of a first battery is greater that the second battery, using a step-up DC-DC converter.

As illustrated in FIG. 48, a step-up converter 4716 is connected between battery 4806 and battery 4808. As shown in FIG. 48, battery 4806 is connected to the input 4812 of the step-up DC to DC converter, while the output 4814 of the step-up DC to DC converter is connected to battery 4808. As indicated by block 4802, battery 4806 has a terminal voltage $Vb_1$ that is less than the terminal voltage $Vb_2$ of battery 4808. However, the state of charge of battery 4806 is greater than the state of charge of battery 4808 as indicated by block 4804. Battery 4806 is connected to a load 4818 that causes the terminal voltage of battery 4806 to be lower than the terminal voltage ($Vb_2$) of battery 4808. In that regard, if load 4818 were disconnected from the battery 4806, battery 4806 would have a higher terminal voltage than battery 4808. However, since the battery 4806 is connected to the load 4818 and has a lower terminal voltage ($Vb_1$) than the terminal voltage ($Vb_2$) of battery 4808, a step-up DC to DC converter 4816 must be utilized so that energy can be transferred from battery 4806 (with a higher state of charge, SOC1) to battery 4808 (with a lower state of charge, SOC2), in the direction shown by the arrow 4810.

Figure 49:
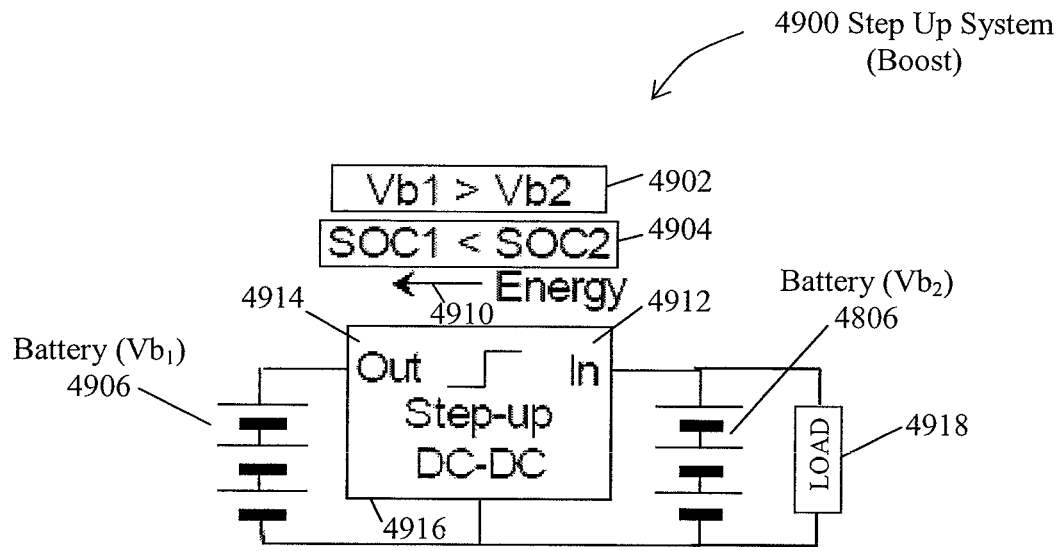
FIG. 49 is a schematic illustration of an embodiment an energy exchange equalization circuit in the case that the state of charge of a first battery is lower that the second battery, using of a step-up DC-DC converter.

FIG. 49 is a schematic illustration of a step-up converter system 4900. As illustrated in FIG. 49, the input 4912 of the step-up DC to DC converter 4916 is connected to battery 4906. Battery 4906 is also connected to load 4918. The output 4914 of the step-up DC to DC converter 4916 is connected to battery 4906 having a terminal voltage ($Vb_1$) that is greater than the terminal voltage ($Vb_2$) of battery

4908. The state of charge of the battery 4806 is greater than the state of charge of battery 4906, as indicated at block 4904, even though the terminal voltage of the battery 4806 ($Vb_2$) is less than the terminal voltage ($Vb_1$) of battery 4906. This is a result of the fact that battery 4806 is connected to load 4918, which reduces the terminal voltage $Vb_2$ of battery 4908. Accordingly, step-up DC to DC converter 4916 is used to transfer energy from the battery 4806, that has a higher state of charge, to battery 4906, which has a lower state of charge, which causes energy to flow in the direction of the arrow 4910.

Figure 50:
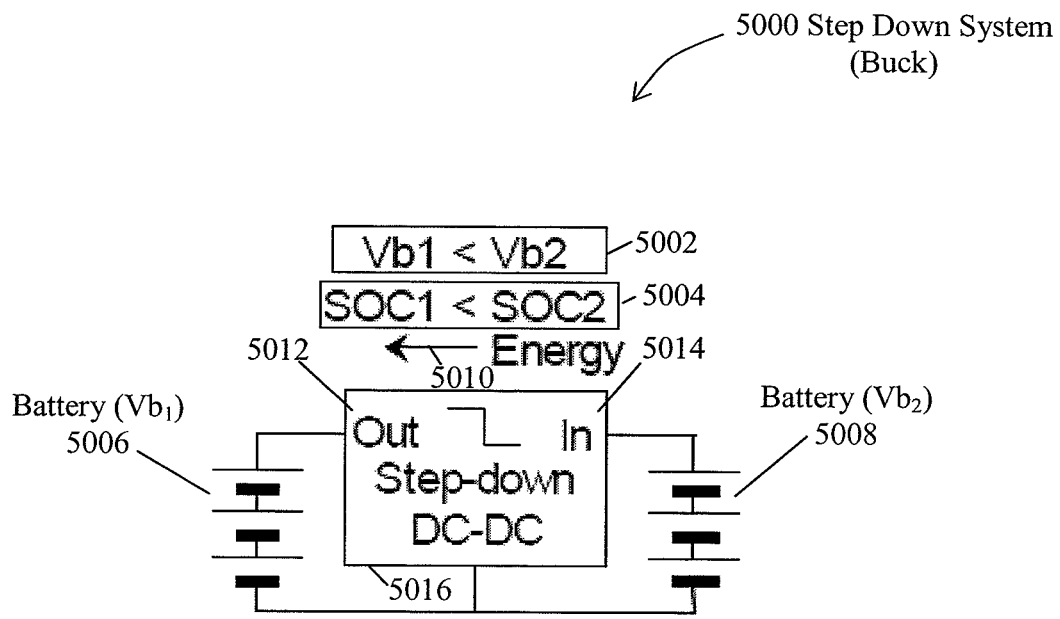
FIG. 50 is a schematic illustration of an embodiment of an energy exchange equalization circuit in the case that the state of charge of a first battery is lower that the second battery, using a step-down DC-DC converter.

FIG. 50 is a schematic illustration of a step-down converter system 5000. As illustrated in FIG. 50, battery 5008, having a terminal voltage $Vb_2$, is connected to the input 5014 of a step-down DC to DC converter 5016. Battery 5006, having a terminal voltage $Vb_1$, is connected to the output 5012 of the step-down DC to DC converter 5016. As illustrated in block 5002, battery 5008 has a terminal voltage ($Vb_2$) that is greater than the terminal voltage ($Vb_1$) of battery 5006. In addition, the state of charge of battery 5008 is greater than the state of charge of battery 5006. Accordingly, energy flows in the direction of the arrow 5010.

Figure 51:
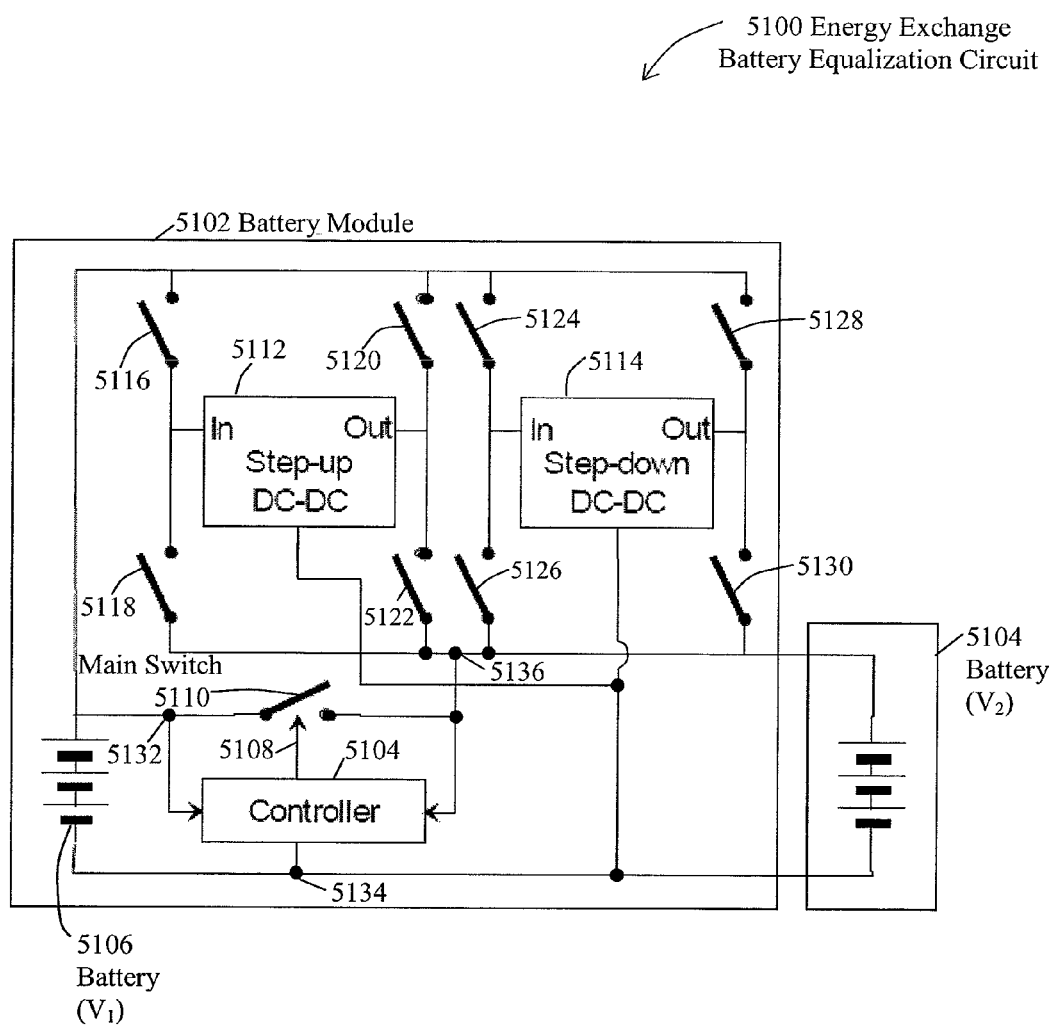
FIG. 51 is a schematic illustration of an embodiment of an energy exchange battery equalization circuit using a step-up DC-DC converter, a step-down DC-DC converter, and a multitude of switches.

FIG. 51 is a schematic illustration of an energy exchange battery equalization circuit 5100. As illustrated in FIG. 51, battery 5106 has a voltage ($V_1$) and is disposed in the battery module 5102. Battery 5104 has a terminal voltage ($V_2$) and is connected to the battery module 5102. Until the main switch 5110 is closed in response to a control signal 5108 from controller 5104, no current flows between batteries 5106, 5104. Controller 5104 detects the terminal voltage of battery 5106 at nodes 5132, 5134. Similarly, controller 5104 detects the terminal voltage of battery 5104 at nodes 5136, 5134. A communication link from modules mounted on the batteries 5104, 5106 can also supply this information. Controller 5104 may also receive signals indicating the amount of current flowing from batteries 5106, 5104 and can calculate the state of charge of the batteries 5106, 5104. In response to these signals, controller 5104 can generate control signals to operate switches 5116, 5118, 5120, 5122 to connect the input and the output of the step-up DC to DC converter 5112, or activate switches 5124, 5126, 5128, 5130 to connect the input and the output of step-down DC to DC converter 5114. In this manner, energy can be transferred between the batteries 5106, 5104 in accordance with the detected voltages, and states of charge of batteries 5106, 5104, in response to control signals from controller 5104. Once the voltages or states of charge are equalized, the controller 5104 can activate the main switch 5110 to connect the batteries 5106, 5104 in parallel. If the battery voltage versus the state of charge is not monotonic, or if the battery resistance is undetermined, the controller 5104 can use the state of charge information instead of a calculated open circuit voltage to determine the direction in which the DC to DC converter should transfer energy. The open circuit voltage of a loaded battery can be estimated by the voltage, resistance and current of the battery. As indicated above, after a sufficient amount of energy is transferred by the selected DC to DC converter, the main switch 5110 is closed and the DC to DC converts 5112, 5114 are isolated from the circuit. The controller 5104 monitors a communication link between the battery module 5102 and the battery 5104. If the battery module 5102 becomes disconnected from battery 5104, controller 5104 opens the main switch 5110 and the system returns to the initial condition for safety reasons.

Figure 52:
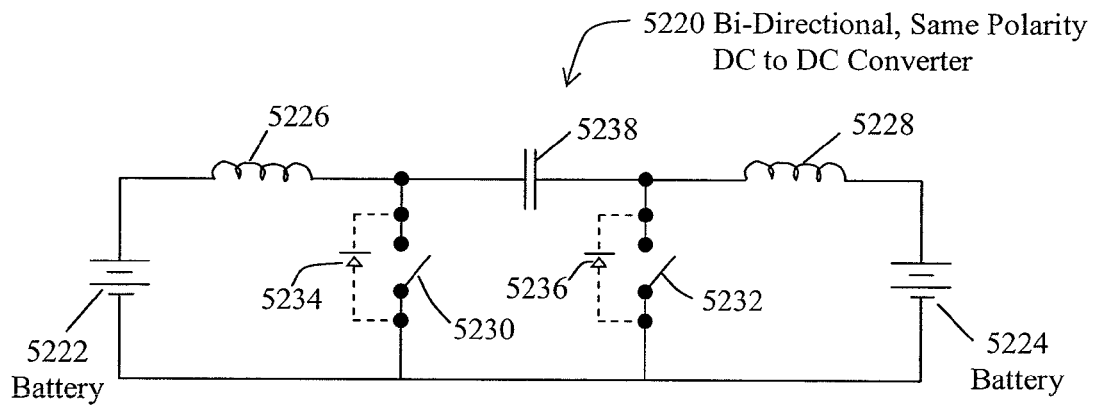
FIG. 52 is a schematic diagram of an embodiment of a bi-directional, same polarity DC to DC converter.

FIG. 52 illustrates a bi-directional, non-isolated, Ćuk DC to DC converter 5220 that is capable of transferring charge between batteries 5222, 5224. Switches 5230, 5232 are alternately closed which alternately connects the capacitor 5238 in parallel across the batteries 5222, 5224. In this manner, voltages are temporarily stored by capacitor 5238. Conductors 5226, 5228 limit the amount of current that flows through the capacitor 5238 when the switches 5230, 5232 are alternatively closed. The charges stored on the capacitor 5238 are transferred between the batteries 5222, 5224 to equalize the charges on batteries 5222, 5224. Switches 5230, 5232 are constructed from MOS technology and include diodes 5234, 5236, respectively, that temporarily allow current to flow through the switches 5230, 5232 if the opening and closing of switches 5230, 5232 are not accurately synchronized. The pulse width of the pulses that operate the switches 5230, 5232 determines the flow of energy between batteries 5222, 5224. The bi-directional DC to DC converter 5220 is a variation of a Ćuk converter, which uses two active switches rather a single active switch.

Figure 53:
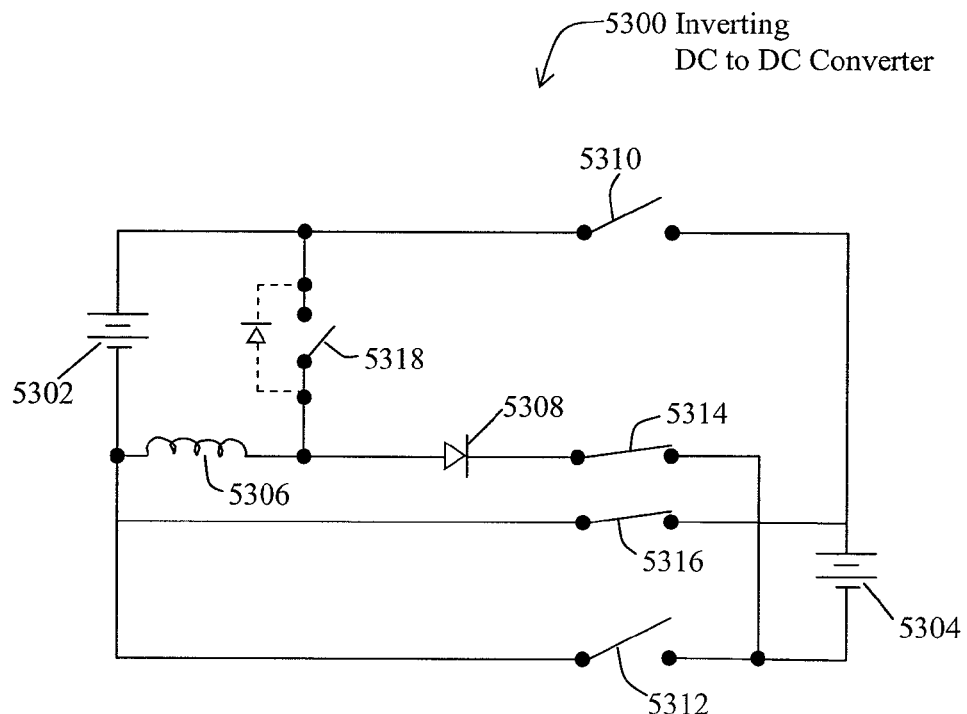
FIG. 53 is a schematic diagram of an embodiment of an inverting DC to DC converter in a first state.
Figure 54:
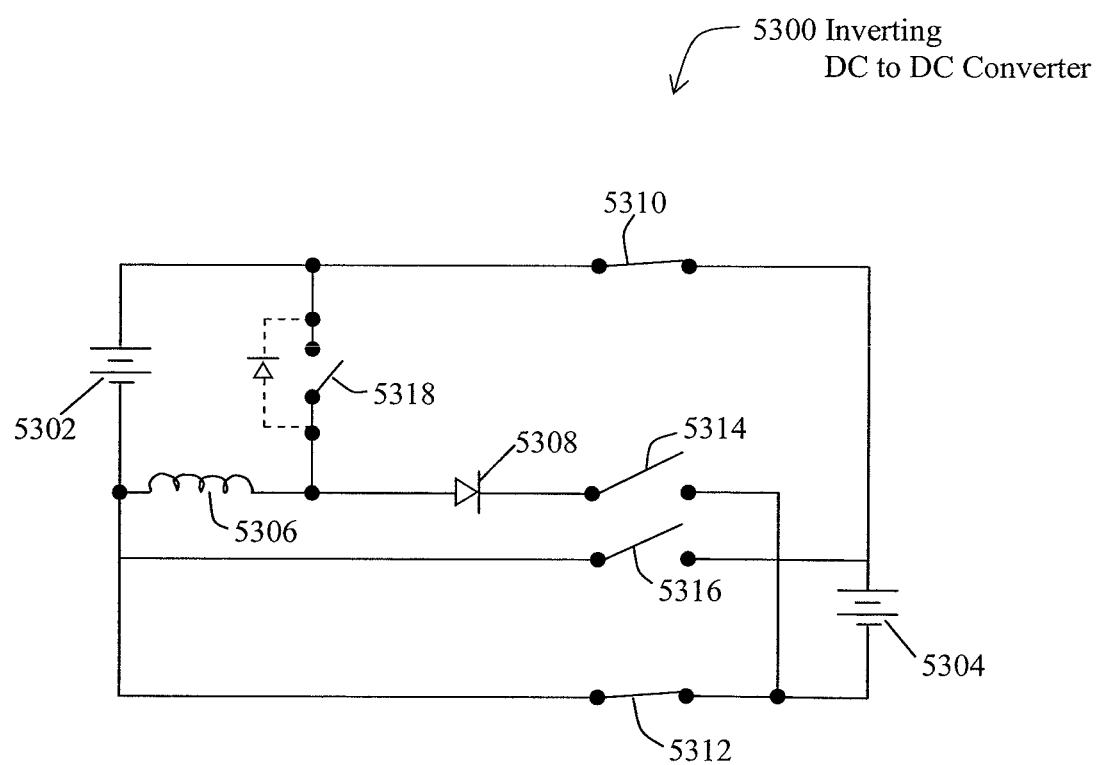
FIG. 54 is a schematic diagram of an embodiment with the inverting DC to DC converter of FIG. 53 disabled, and the batteries connected directly in parallel.

FIGS. 53 and 54 illustrate an inverting DC to DC converter 5300. Initially, switches 5314, 5316 are closed, which connects the inverting DC to DC converter in a reverse polarity direction so that the batteries 5302, 5304 are connected with the proper polarity. Switch 5318 opens and closes at a high frequency, so that energy is stored from battery 5303 in inductor 5306, and then transferred through diode 5308 to battery 5304. Once the batteries 5302, 5304 are equalized, switches 5314, 5316 are opened and then switches 5310, 5312 are closed as illustrated in FIG. 54.

Non-isolated DC to DC converters, such as disclosed above, typically use an inductor, which provides a simpler circuit that is less expensive and allows essentially all of the input current to flow to the output. However, non-isolated DC to DC converters do not isolate the input from the output, which results in noise and other interference, that may be present on the input, to be transmitted to the output. Additionally, in simpler topology non-isolated DC to DC converters, the output voltage is constrained by the input voltage as explained in more detail below.

On the other hand, isolated DC to DC converters isolate noise between the input and output or a first port and a second port, and the output voltage is not constrained by the polarity or level of the input voltage. However, isolated DC to DC converters employ a transformer, which is expensive and less efficient than simply using an inductor, such as employed in a non-isolated DC to DC converter.

Classic, non-isolated DC to DC converters are three-terminal devices. The output voltage of a non-isolated DC to DC converter can be either higher than the input voltage, in which case a step-up converter is used, or lower than the input voltage, in which case a step-down converter may be used, or may be the opposite polarity of the input voltage, in which case an inverting non-isolated DC to DC converter would be used.

Figure 55:
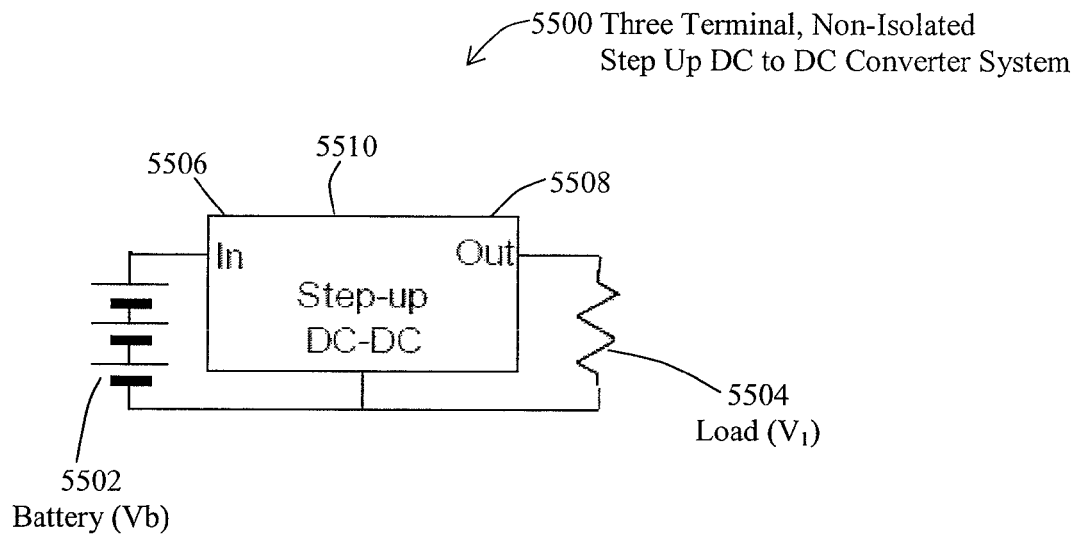
FIG. 55 is a schematic diagram of an embodiment of a three-terminal, non-isolated, step-up DC to DC converter system.

FIGS. 55-66 disclose various implementations of non-isolated DC to DC converters. For example, FIG. 55 discloses a three-terminal, non-isolated step-up DC to DC converter system 5500. As illustrated in FIG. 55, battery 5502 has a voltage (Vb) and is connected to input 5506 of the step-up DC to DC converter 5510. Load 5504 has a voltage ($V_1$) and is connected to the output 5508 of the step-up DC to DC converter 5510. The voltage (Vb) of battery 5502 is less than the voltage ($V_1$) across the load 5504. As such, a step-up DC to DC converter 5510 is used to transfer energy from the battery 5502 to the load 5504.

Figure 56:
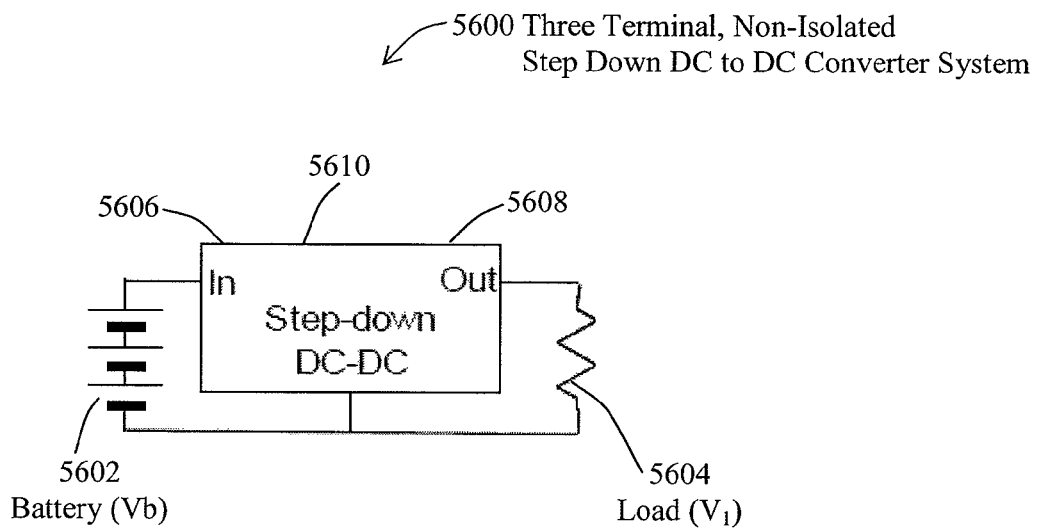
FIG. 56 is a schematic diagram of a three-terminal, non-isolated step-down DC to DC converter system.

FIG. 56 discloses a three-terminal non-isolated step-down DC to DC converter system 5600. As illustrated in FIG. 56, battery 5602 has a voltage ($V_2$) and is connected to the input 5606 of the step-down DC to DC converter 5610. Load 5604 is connected to the output 5608 of the step-down DC to DC converter 5610. The voltage ($V_1$) across load 5604 is less than the voltage (Vb) across battery 5602. Accordingly, a step-down converter 5610 is used to transfer energy from the battery 5602 to the load 5604.

Figure 57:
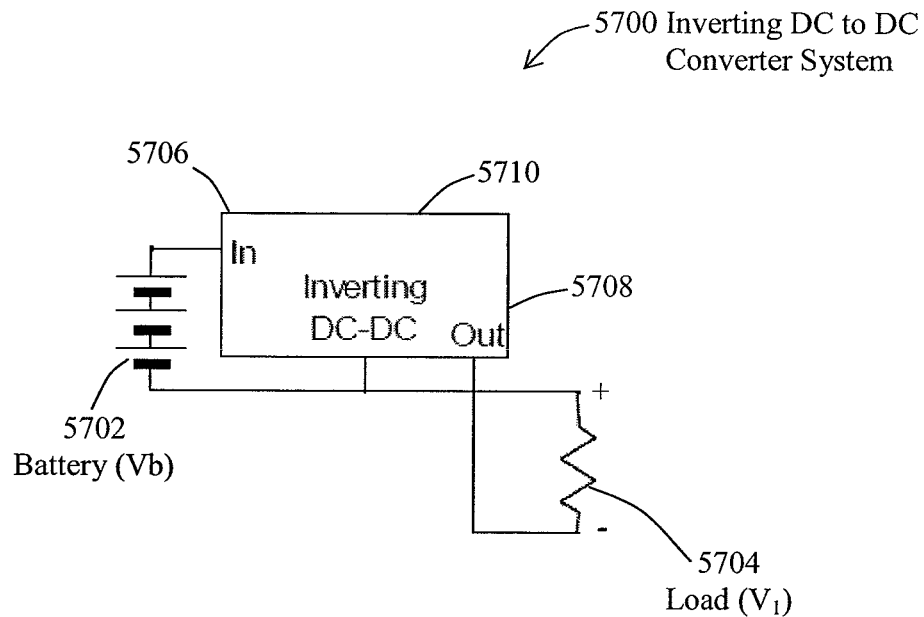
FIG. 57 is a schematic diagram of a three-terminal, non-isolated, inverting DC to DC converter system.

FIG. 57 discloses an inverting DC to DC converter system 5700. As illustrated in FIG. 57, battery 5702 is connected to the input 5706 of the inverting DC to DC converter 5710. Load 5704 is connected to the output 5708 of the inverting DC to DC converter 5710. Since the inverting DC to DC converter 5710 inverts the voltage, the load 5704 is connected in opposite polarity to the battery 5702.

Figure 58:
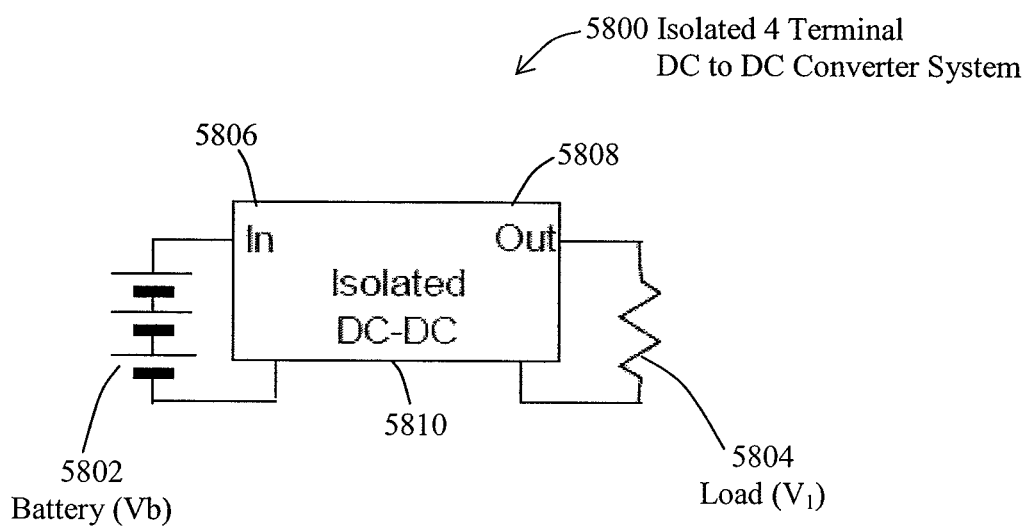
FIG. 58 is a schematic diagram of an isolated, four-terminal DC to DC converter system.

FIG. 58 illustrates an isolated four-terminal DC to DC converter system 5800. As illustrated in FIG. 58, battery 5802 has a voltage ($Vb_1$) and is connected to the input 5806 of the isolated DC to DC converter 5810. Load 5804 has a voltage ($V_1$) across its terminals and is connected to an output 5808 of the isolated DC to DC converter 5810. The isolated DC to DC converter 5810 can be operated such that Vb can be less than $V_1$, Vb can be equal to $V_1$ and Vb can be greater than $V_1$. In addition, the polarities of the input and output voltages can be inverted.

Figure 59:
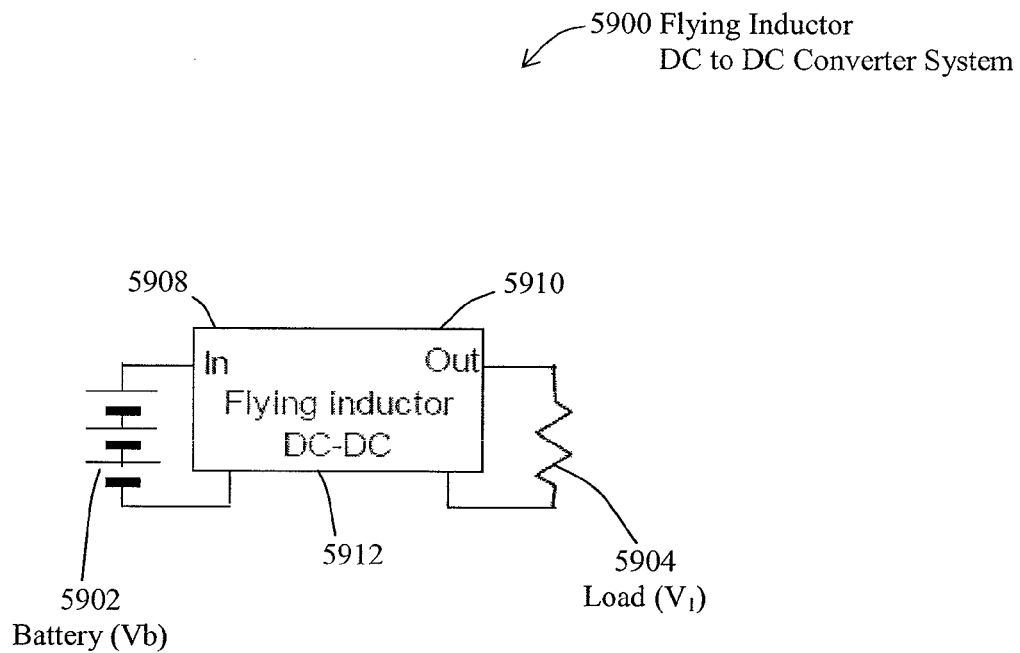
FIG. 59 is a schematic diagram of an embodiment of a four terminal, flying inductor, DC to DC converter system that is a transformer-less, DC-DC converter with limited isolation.

FIG. 59 is a schematic illustration of a flying inductor DC to DC converter system 5900. As shown in FIG. 59, battery 5902 has a voltage (Vb) and is connected to the input 5908 of the flying inductor DC to DC converter 5912. Load 5904 has a voltage $V_1$ across its terminals and is connected to the output 5910 of the flying inductor DC to DC converter 5912. In a manner similar to the isolated DC to DC converter, Vb can be greater than $V_1$, Vb can be less than $V_1$, Vb can be equal to $V_1$ and the polarity of $V_1$ can be inverted with respect to Vb.

The flying inductor DC to DC converters share many of the advantages of the isolated DC to DC converters as well as many of the advantages of the non-isolated DC to DC converters. Just like the isolated DC to DC converters, the flying inductor DC to DC converter essentially isolates noise from being transmitted between the input and the output of the flying inductor DC to DC converter. Additionally, the flying inductor DC to DC converter provides a degree of electrical isolation between its input and output. Finally, the output voltage level and polarity of the flying inductor DC to DC converter is not constrained by the input voltage level and polarity of the input voltage.

In a manner similar to the non-isolated DC to DC converters, the flying inductor topology does not require the use of an expensive and bulky transformer and has the ability to transfer essentially all of the input current to the output. Accordingly, the flying inductor DC to DC converter has advantages of both the isolated and non-isolated converters and can be effectively used as a DC to DC converter and in systems for equalizing charges on batteries or between batteries and capacitive loads.

Further, the flying inductor DC to DC converter system can be reduced to a three-terminal system from a four-terminal system by connecting one of the input terminals to one of the output terminals. In that regard, the negative input terminals can be connected together, the positive terminals can be connected together, a negative input terminal can be connected to a positive output terminal, or a positive input terminal can be connected to a negative output terminal. FIGS. 60-63 illustrate these various typologies.

Figure 60:
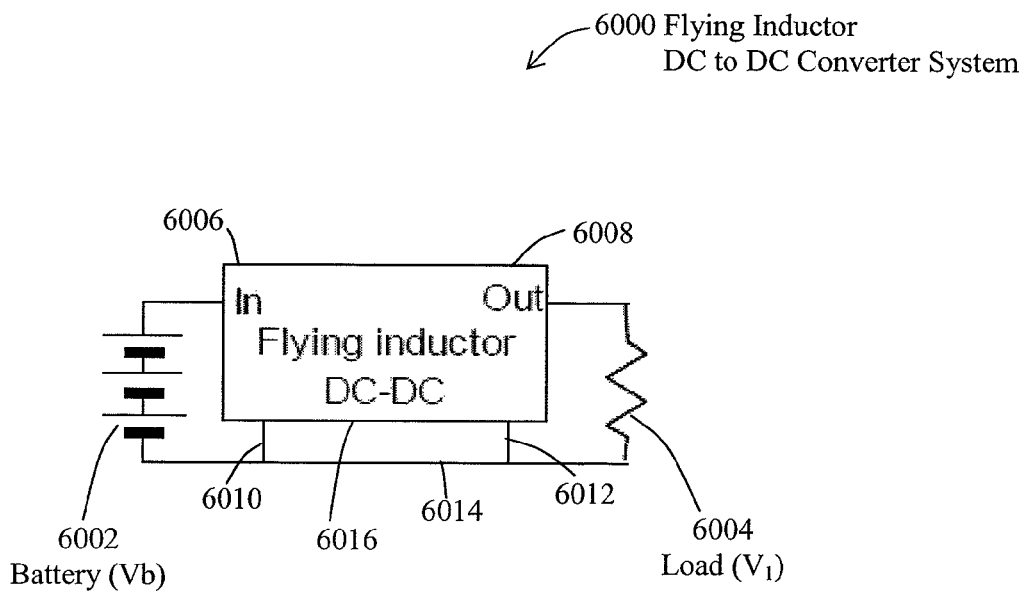
FIG. 60 is a schematic illustration of a flying inductor DC to DC converter system that has the negative input terminals connected together.

FIG. 60 is a schematic illustration of the flying inductor DC to DC converter system 6000 that has the negative input terminals connected together. As illustrated in FIG. 60, battery 6002 has a voltage Vb. Battery 6002 is connected through the input 6006 that includes a positive terminal and negative terminal 6010. Battery 6002 supplies a voltage Vb to the flying inductor DC to DC converter 6000. Load 6004 is connected to output 6008, which has a positive terminal and a negative terminal 6012. Conductor 6014 connects the negative terminals 6010, 6012 of the flying inductor together. The negative terminal of the battery 6002 and the negative terminal of the load 6004 are also connected to the negative terminals of the flying inductor. The voltage across load 6004 is equal to $V_1$. The topology illustrated in FIG. 60 allows the voltage Vb to be less than, greater than, or equal to the voltage $V_1$. In other words, the flying inductor DC to DC converter 6016 can operate as a step-up or step-down converter. In that regard, it is similar to a non-isolated Ćuk converter, but simpler in operation.

Figure 61:
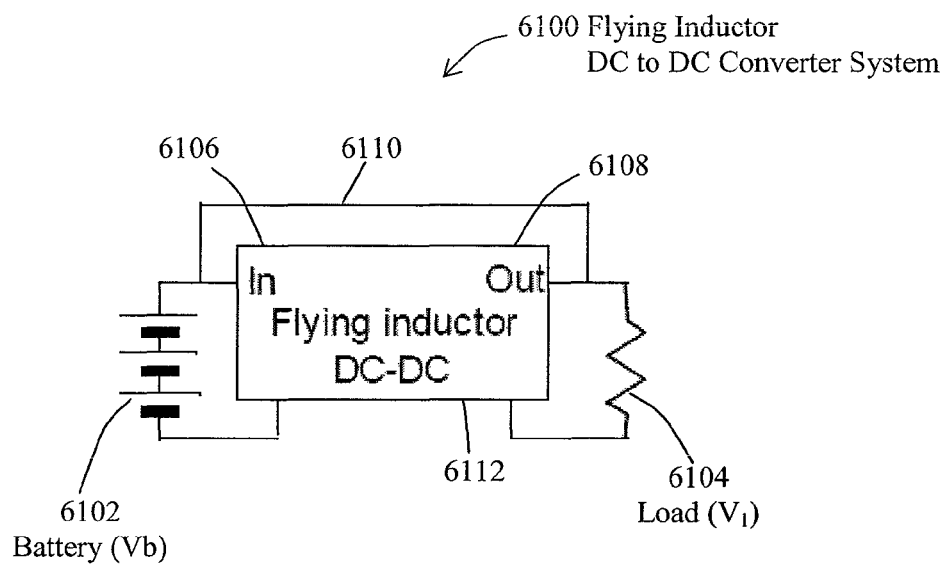
FIG. 61 is a schematic illustration of a flying inductor DC to DC converter system that has the positive input terminals connected together.

FIG. 61 is a schematic illustration of the flying inductor DC to DC converter system 6100 that has the positive terminals connected together. As illustrated in FIG. 61, battery 6102 is connected to the input 6106 of the flying inductor DC to DC converter 6100. Battery 6102 supplies a voltage Vb to the flying inductor DC to DC converter 6100. Load 6104 is connected to the output 6108 of the flying inductor DC to DC converter 6100. Load 6104 has a voltage $V_1$ across its terminals. Conductor 6110 connects the positive terminals of the input to the positive terminal of the output of the flying inductor DC to DC converter 6100. Accordingly, the flying inductor DC to DC converter 6100 is a three-terminal device similar to the three-terminal device illustrated in FIG. 60, but with input and out voltages that are negative with respect to common conductor 6110. Accordingly, the flying inductor DC to DC converter 6112 can operate as a step-up converter or a step-down converter and is also similar to the non-isolated Ćuk converter.

Figure 62:
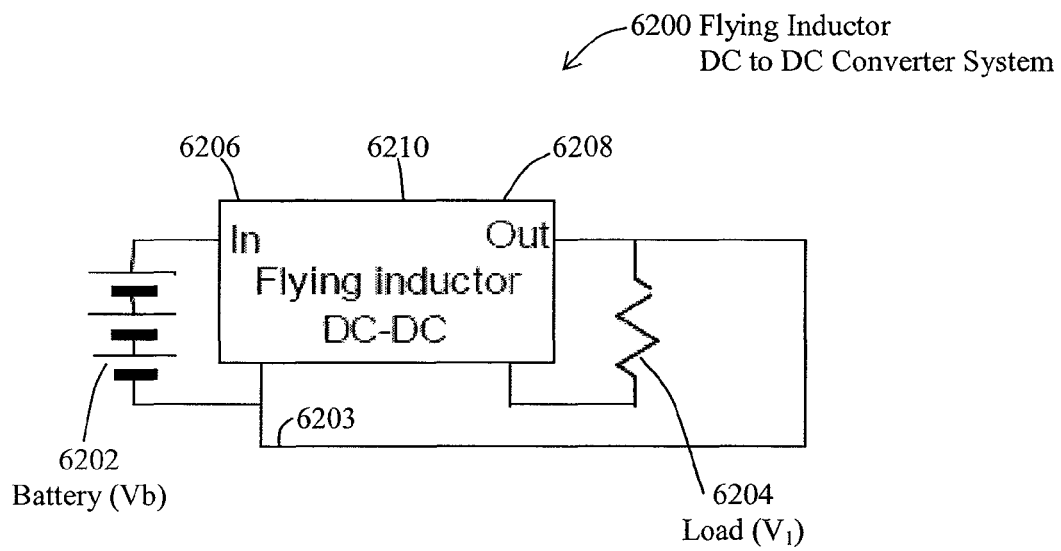
FIG. 62 is a schematic illustration of a flying inductor DC to DC converter system that has the negative input terminal connected to the positive output terminal

FIG. 62 is a schematic illustration of a flying inductor DC to DC converter system 6200 that has the negative input terminals connected to the positive output terminal. As illustrated in FIG. 62, battery Vb is connected to the input 6206 of the flying inductor DC to DC converter 6200. Battery 6202 supplies a voltage Vb to the flying inductor DC to DC converter 6200. Load 6204 is connected to the output 6208 of the flying inductor DC to DC converter 6210. The negative terminal of the input 6206 is connected to the positive terminal of the output 6208 by conductor 6203, to render this as a three-terminal device. By connecting these terminals together, the system 6200 becomes an inverting converter, such as disclosed herein.

Figure 63:
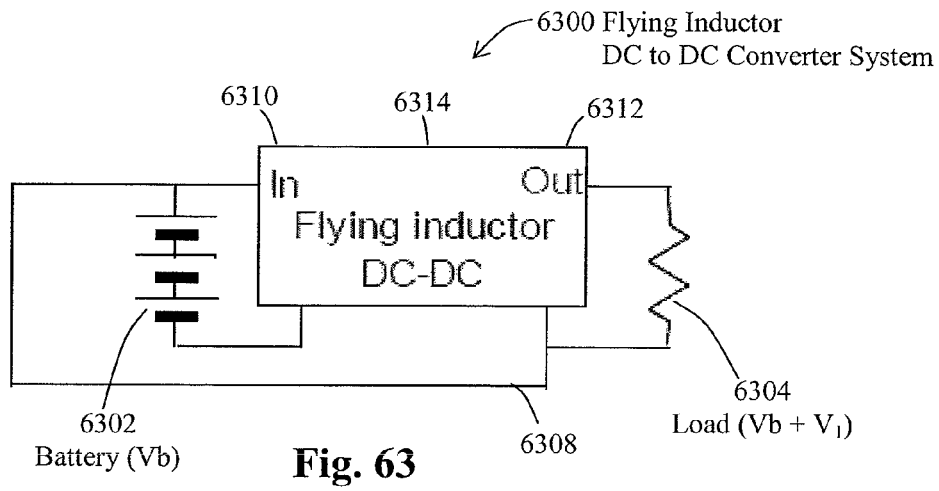
FIG. 63 is a schematic illustration of a flying inductor DC to DC converter system that has the positive input terminal connected to the negative output terminal

FIG. 63 is a schematic illustration of a flying inductor DC to DC converter 6300 that has the positive input terminals connected to the negative output terminal. As illustrated in FIG. 63, battery 6302 is connected to the input 6310 of the flying inductor DC to DC converter 6314. Battery 6302 supplies a voltage Vb to the flying inductor DC to DC converter 6300. Load 6304 is connected to the output 6312 of the flying inductor DC to DC converter 6300. Load 6304 has a voltage Vb plus $V_1$ across its terminals since conductor 6308 connects the positive terminal of the battery 6302 to the negative terminal of the load 6304. By connecting the positive terminal of the input to the negative terminal of the output causes the system illustrated in FIG. 63 to simply be an inverting converter, as is the one in FIG. 62, though the polarity is opposite.

Figure 64:
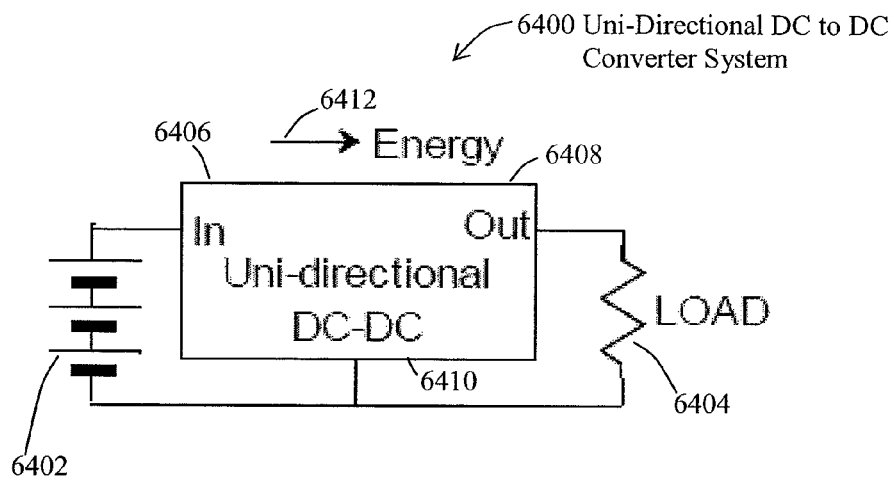
FIG. 64 illustrates a unidirectional DC to DC converter.

FIG. 64 illustrates a unidirectional DC to DC converter 6400. As illustrated in FIG. 64, energy flows in the direction from the input to the output as illustrated by arrow 6412. Battery 6402 applies a voltage to the input of the unidirectional DC to DC converter 6400 that is equal to Vb. The load 6404 is connected to the output 6408 of the unidirectional DC to DC converter 6410. The negative terminals of the battery 6402, the load 6404 and the unidirectional DC to DC converter 6410 are connected together. The unidirectional DC to DC converter 6410 can only transfer energy from the input 6406 to the output 6408 in the direction of the arrow 6412.

Figure 65:
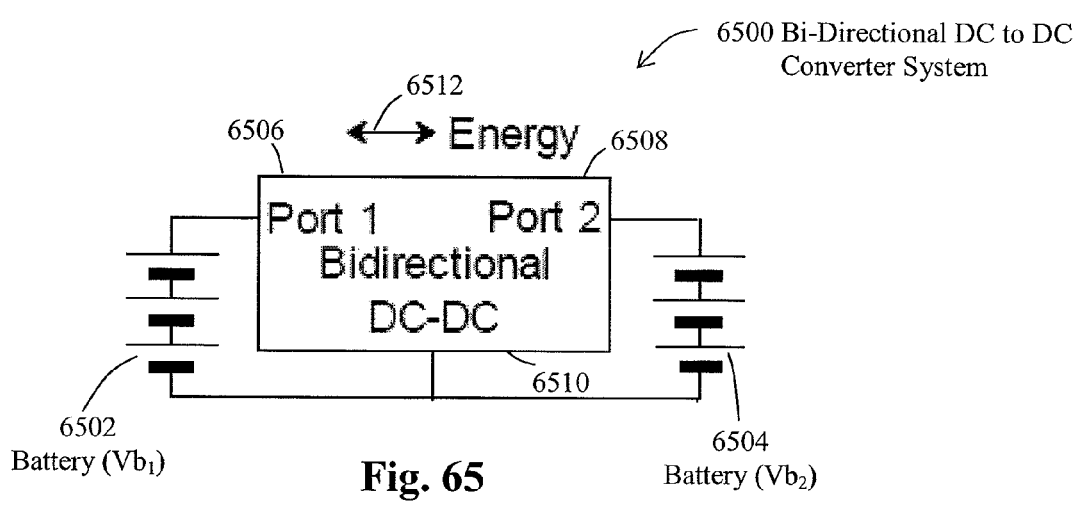
FIG. 65 is a schematic illustration of a bi-directional DC to DC converter system.

FIG. 65 is a schematic illustration of a bi-directional DC to DC converter system 6500. As illustrated in FIG. 65, battery 6502 is connected to the first port of the bi-directional DC to DC converter 6510 and applies a voltage (Vb) to the first port 6506. Battery 6504 is connected to a second port 6508 of the bi-directional DC to DC converter 6510 and applies a voltage $Vb_2$ to the second port 6508. The bi-directional DC to DC converter 6510 is capable of transferring energy in either direction between battery 6502 and battery 6504 as illustrated by arrow 6512. Bi-directional DC to DC converters may operate to transfer energy in either direction. Bi-directional DC to DC converters use active switches in place of rectifier diodes.

The flying inductor DC to DC converter may also be designed to operate bi-directionally. However, the flying inductor topology suffers from several limitations. First, the flying inductor topology is inherently less efficient than a simple, non-isolated DC to DC converter because the current path includes two switches rather than one switch in the non-isolated DC to DC converter. Further, the flying inductor DC to DC converter does not offer true galvanic isolation. For example, the maximum voltage difference between any input terminal and any output terminal is determined by the relative value of the input and output voltages, as long as the breakdown voltages of the components used in the flying inductor DC to DC converter are sufficiently high.

Figure 66:
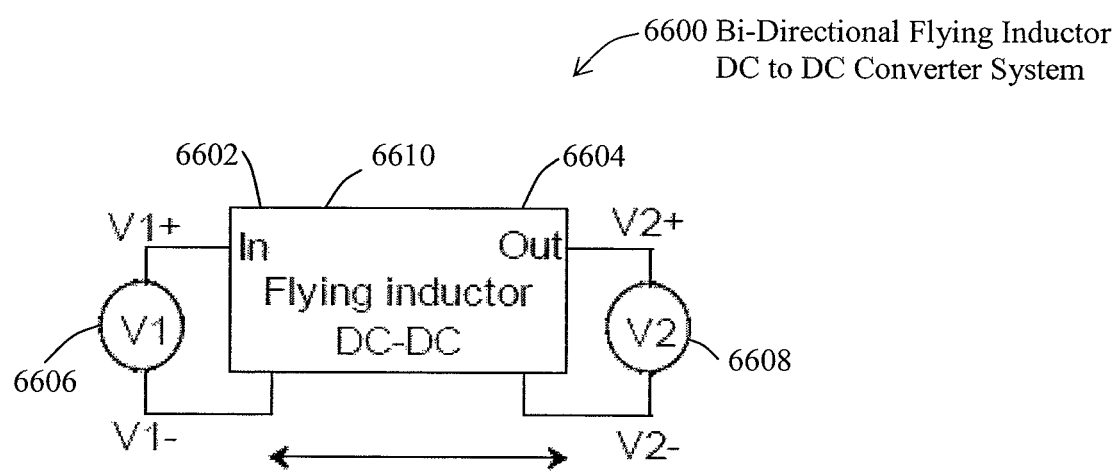
FIG. 66 illustrates the differential voltages in a bi-directional flying inductor DC to DC converter system.

FIG. 66 illustrates a bi-directional flying inductor DC to DC converter system 6600. As illustrated in FIG. 66, a first voltage source 6606 has a voltage $V_1$ that is connected to the input 6602 of the bi-directional flying inductor DC to DC converter 6610. Voltage source 6608 has a voltage ($V_2$) and is connected to the output 6604 of the bi-directional flying inductor DC to DC converter 6610. The voltage constraints of the bi-directional flying inductor DC to DC converter 6610 are that the output voltage $V_2$ minus input voltage $V_1$ can only range between minus $V_2$ and plus $V_1$.

Figure 67A:
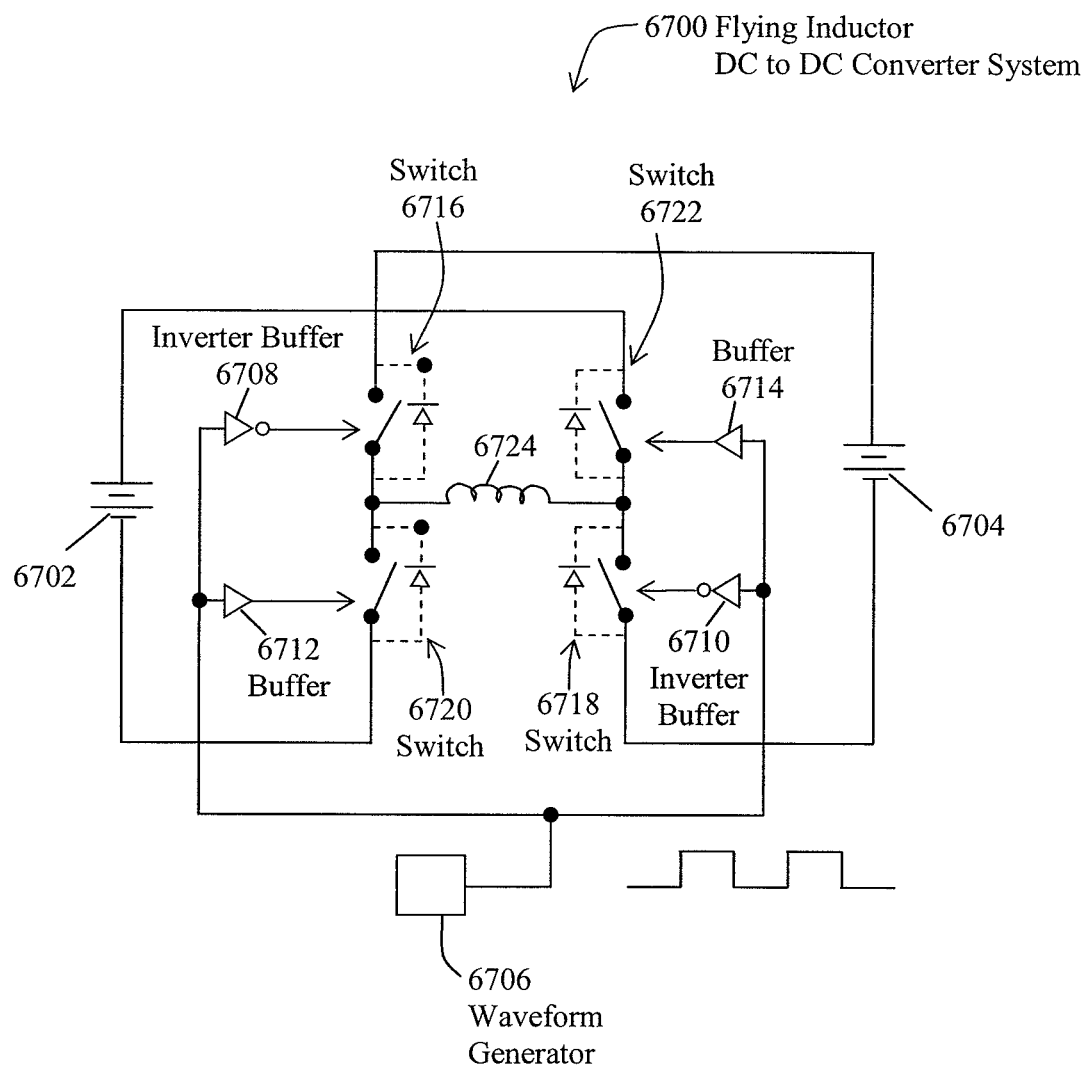
FIG. 67A is a schematic diagram of an embodiment of a flying inductor DC to DC converter system.

FIG. 67A is a schematic diagram of an embodiment of a bi-directional flying inductor DC to DC converter system 6700, which is unable to include a dead time. As illustrated in FIG. 67, the flying inductor DC to DC converter 6700 transfers charge in either direction between battery 6702 and battery 6704. Switches 6716, 6718 are driven by inverting buffers 6708, 6710, respectively. Switches 6720, 6722 are driven by non-inverting buffers 6712, 6714, respectively. When the waveform from pulse waveform generator 6706 is low, switches 6716, 6718 are closed and switches 6720, 6722 are open. This is defined as Phase A. When the waveform from pulse waveform generator 6706 goes low, switches 6716, 6718 are open and switches 6720, 6722 are closed. This is defined as Phase B. As such, when switches 6716, 6718 are open, switches 6720, 6722 are closed, and vice versa. The opening and closing of the switches is substantially simultaneous, as a result of the topology of the circuit of the flying inductor DC to DC converter 6700. Inductor 6724 is therefore alternately connected between battery 6702, and battery 6704. Current in the inductor 6724 increases, decreases, and changes direction, depending upon the pulse width of the pulse waveform generator 6706. In this fashion, the direction and amount of energy transferred between batteries 6702, 6704 can be controlled by controlling the timing of the pulse of waveform generator 6706. Each of the switches 6720, 6722, 6516, 6518 may be implemented with a MOSFET (Metal Oxide Semiconductor Field Effect Transistor) that includes a reverse rectifier diode. The reverse rectifier diodes allow for slight variations in the simultaneity of the opening and closing of the switches. MOSFETs and IBGTs include intrinsic reverse rectifier diodes as part of their structure. Discrete rectifier diodes may be added in parallel with each switch to improve performance of the intrinsic rectifier diodes, or for switches that do not include an intrinsic rectifier diode.

Figure 67B:
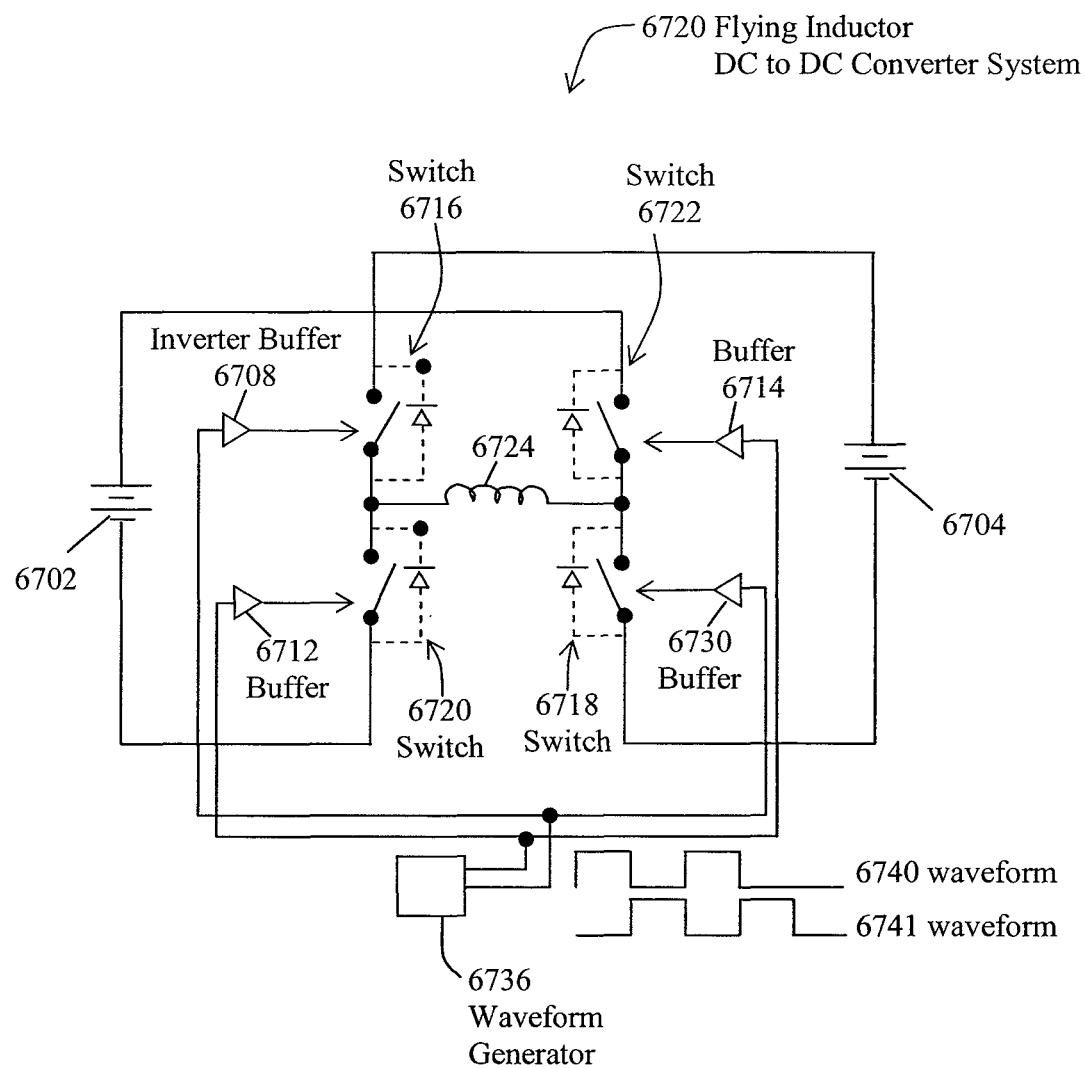
FIG. 67B is a schematic diagram of another embodiment of a flying inductor DC to DC converter system.

FIG. 67B is a schematic diagram of another embodiment of a bi-directional flying inductor DC to DC converter system 6720, which is able to include a dead time. As illustrated in FIG. 67B, the flying inductor DC to DC converter 6720 transfers charge in either direction between battery 6702 and battery 6704. Switches 6716, 6718 are driven by buffers 6728, 6730, respectively. When the waveform 6740 from pulse waveform generator 6736 is high, switches 6716, 6718 are closed. When the waveform 6740 from pulse waveform generator 6736 is low, switches 6716, 6718 are open. Switches 6720, 6722 are driven by buffers 6712, 6714 respectively. When the waveform 6741 from pulse waveform generator 6736 is high, switches 6720, 6722 are closed. When the waveform 6741 is low, switches 6720, 6722 are open. As such, switches 6716, 67518 close and open together. Similarly, switches 6720, 6722 alternately close and open together. When waveforms 6740 and 6741 are both low, switches 6712, 6722, 6728 and 6730 are all open. This is the Dead Time. Waveforms 6740 and 6741 are never both high. In other words, at no time are switches 6712, 6722, 6728 and 6730 all closed. Inductor 6724 is therefore alternately connected between battery 6702, and battery 6704 or not connected to either battery 6702 or battery 6704. Current in the inductor 6724 increases, decreases, and changes direction, depending upon the timing of the pulse waveforms 6740, 6741 from generator 6736. In this fashion, waveform generator 6736 can control the direction and amount of energy transferred between batteries 6702, 6704.

Figures 68, 69, 70:
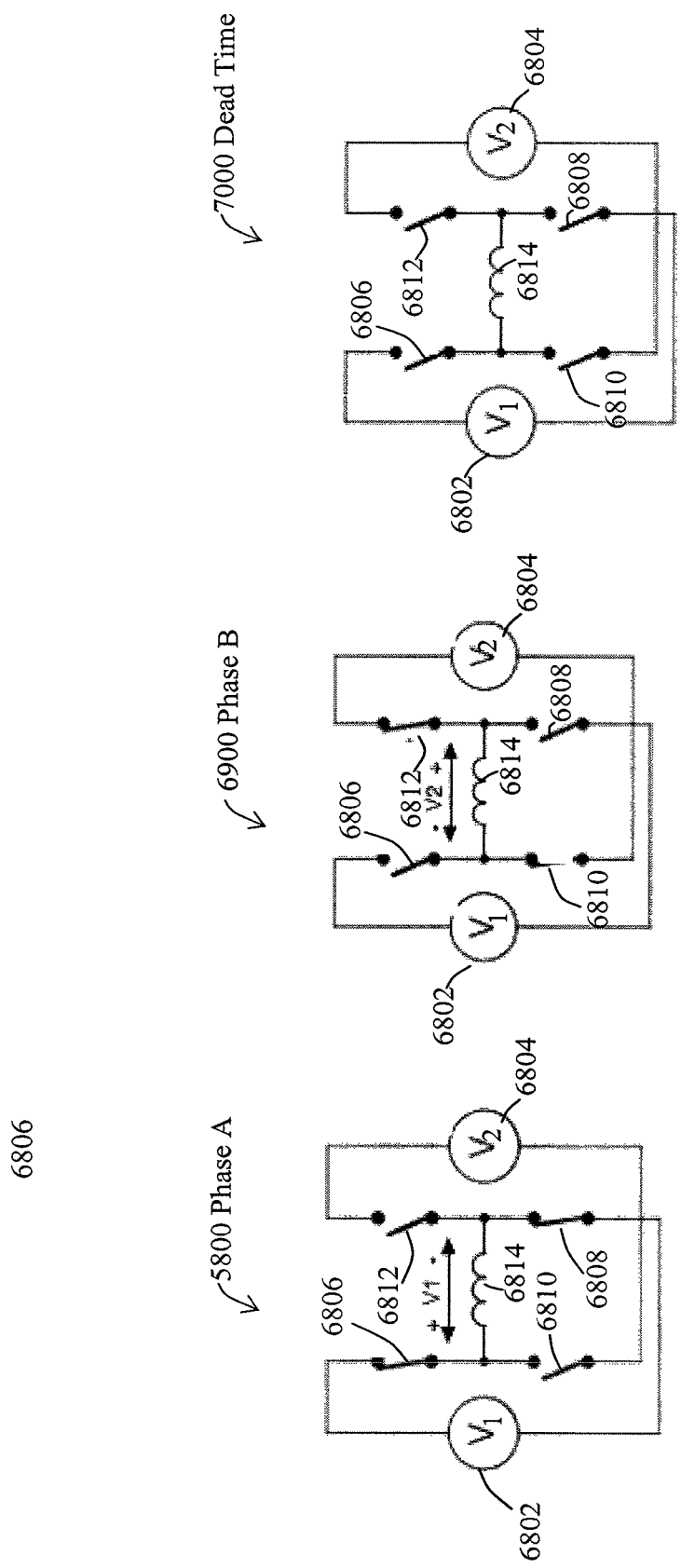
FIG. 68 is a schematic diagram of the flying inductor DC to DC converter in phase-A.
FIG. 69 is a schematic diagram of the flying inductor DC to DC converter in phase-B.
FIG. 70 is a schematic diagram of the flying inductor DC to DC converter in a dead time phase.

FIGS. 68-70 illustrate the three operating phases of the bi-directional flying inductor DC to DC converter of FIG. 67B. FIG. 68 illustrates the phase-A 6800 operating mode of the flying inductor DC to DC converter. In phase-A, switches 6806, 6808 are in a closed position and switches 6810, 6812 are in an open position. During phase-A, the voltage source $V_1$ is applied across inductor 6814, with the polarity illustrated in FIG. 68. Voltage source $V_2$ 6804 is isolated from the inductor.

FIG. 69 illustrates the operation of the flying inductor DC to DC converter in phase-B 6900. As illustrated in FIG. 69, switches 6810, 6812 are in a closed position, while switches 6806, 6808 are in an open position. Voltage source $V_2$ is applied to inductor 6814 with the polarity illustrated in FIG. 69. Voltage source $V_1$ 6802 is isolated from inductor 6814.

FIG. 70 is a schematic illustration of the flying inductor DC to DC converter in a dead time phase 7000. As illustrated in FIG. 70, switches 6806, 6808, 6810, 6812 are all in an open position. Inductor 6814 is isolated from both voltage sources 6082, 6804.

The switches illustrated in FIGS. 68-70 may be implemented as active switches, such as transistors, such as MOSFETs, IBGTs, BJTs, or thyristors, such as SCRs, GTOs, TRIACs. In some cases, isolation of the voltage sources is not complete because of the structure of these switches, such as MOSFETs and IBGTs, as explained in more detail below.

Figure 71:
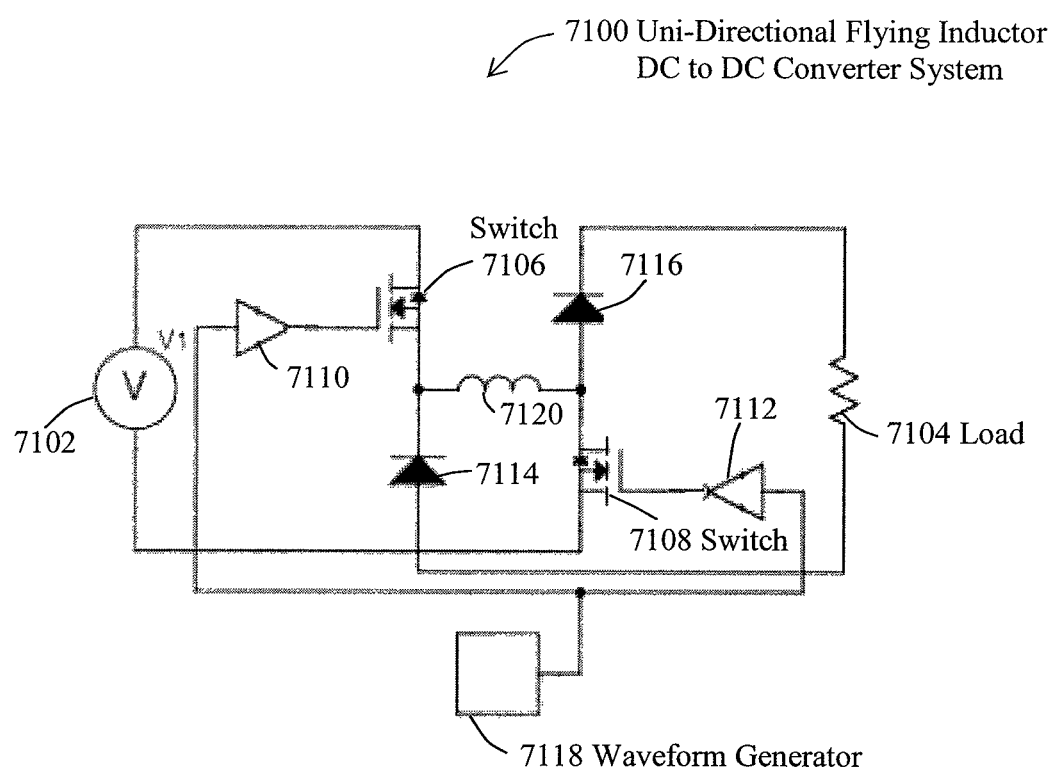
FIG. 71 is a schematic diagram of a uni-directional flying inductor DC to DC converter.

FIG. 71 is a schematic diagram of a uni-directional flying inductor DC to DC converter system 7100. As illustrated in FIG. 71, a voltage source 7102 supplies a voltage ($V_1$) to the uni-directional flying inductor DC to DC converter 7100. The uni-directional flying inductor DC to DC converter 7100 has two active switches 7106, 7108, and two rectifier diodes 7114, 7116. Switch 7106 is operated by non-inverting buffer 7110. Switch 7108 is operated by inverting buffer 7112. Waveform generator 7118 generates a variable duty cycle square wave waveform that operates buffers 7110, 7112. Accordingly, when the waveform from waveform generator 7118 goes low, during phase A, switches 7106, 7108 are closed. When waveform generator 7118 goes high, during phase B, switches 7106, 7108 are open. Switches 7106, 7108, when closed, allow current to flow from the voltage source 7102 through the inductor 7120 in a direction from left to right, as illustrated in FIG. 71. When switches 7106, 7108 are open, diodes 7114, 7116 allow current to flow through the inductor 7120 from left to right through load 7104. The current decays linearly over time when the current is applied to the resistive load 7104. If the energy in inductor 7120 is depleted, current ceases to flow, during the dead time. In this manner, energy is transferred from the voltage source 7102 to the load 7104 in the uni-directional flying inductor DC to DC converter 7100, illustrated in FIG. 71.

Figure 72:
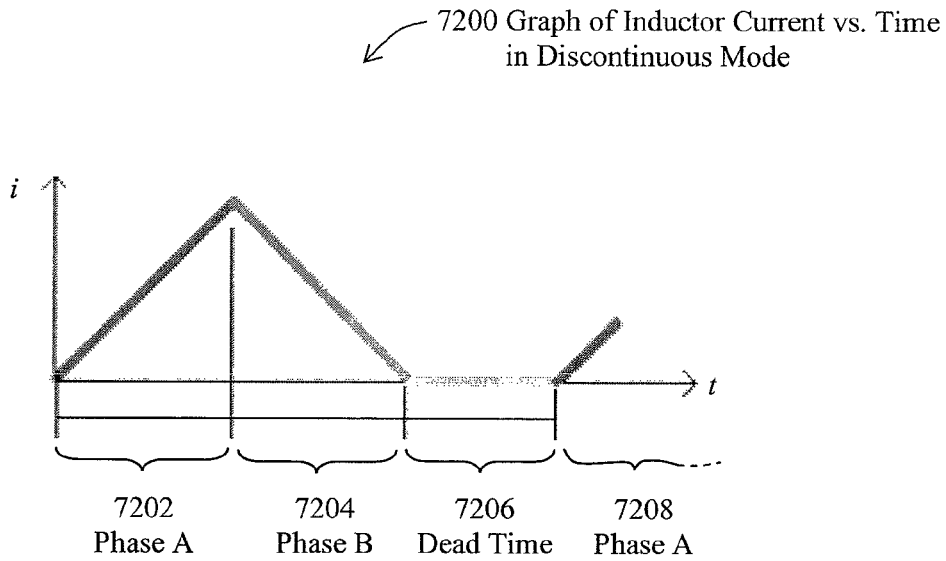
FIG. 72 is a plot of inductor current versus time of the uni-directional flying inductor DC to DC converter illustrated in FIG. 71 that is operating in a discontinuous mode.

FIG. 72 is a graph of inductor current versus time of the uni-directional flying inductor DC to DC converter illustrated in FIG. 71 that is operating in a discontinuous mode. As illustrated in FIG. 72, in the first time period, designated as phase-A 7202, the inductor current increases in a direction from left to right (positive direction), as illustrated in FIG. 71, because the voltage $V_1$ is supplied across inductor 7120. When switches 7106, 7108 are opened at the end of the time period phase-A 7202, diodes 7114, 7116 conduct the current through the inductor 7120 through the load 7104. The inductor current decays to zero through the time period phase-B 7104, until the current reaches zero. During dead time 7206, the output of waveform generator 7118 remains low, so switches 7106, 7108 remain open. At the end of the period of dead time 7106, waveform generator 7118 generates a pulse so that switches 7106, 7108 are closed, which begins phase-A again.

Figure 73:
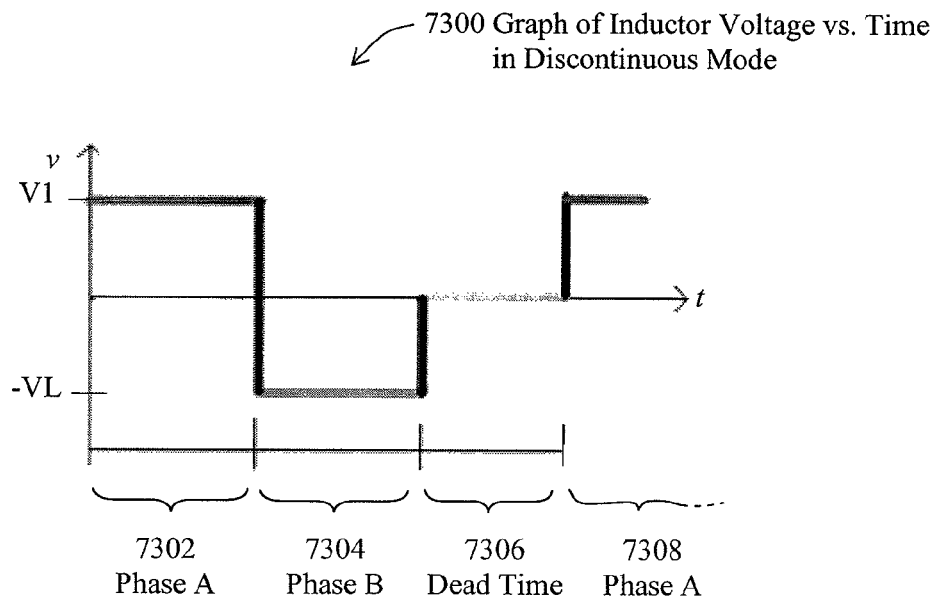
FIG. 73 is a plot of inductor voltage versus time for the uni-directional DC to DC converter of FIG. 71.

FIG. 73 is a graph of inductor voltage versus time for the uni-directional DC to DC converter, which is operating in the discontinuous mode, such as illustrated in FIG. 72. As illustrated in FIG. 73, during phase-A 7302, the voltage across inductor 7120 is equal to $V_1$. The voltage ($V_1$) of voltage source 7102 is applied across the inductor 7120, as a result of switches 7110, 7112 being closed. During phase-B 7304, the voltage across inductor 7120 is equal to the negative of voltage of load 7104, $-V_L$, since switches 7106, 7108 are open and the voltage across load 7104 is applied across the inductor 7120 in a direction opposite (negative polarity) to the voltage applied by the voltage source 7102. During the period of the dead time 7306, zero voltage is applied across the inductor 7120. The process then begins again with phase-A 7308.

Figure 74:
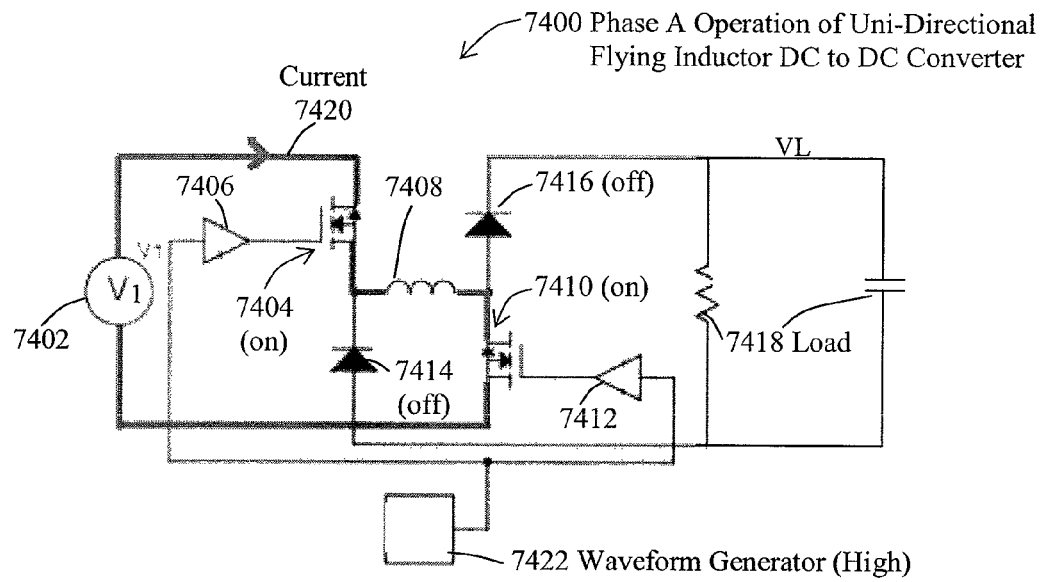
FIG. 74 is a schematic illustration of the phase-A operation of a uni-directional flying inductor DC to DC converter.

FIG. 74 is a schematic illustration of the phase-A operation 7400 of the uni-directional flying inductor DC to DC converter. As illustrated in FIG. 74, switches 7404, 7406 are on and diodes 7414, 7416 are off. Waveform generator 7422 is high, which causes buffers 7406, 7412 to generate an output to close switches 7404, 7410, so that current 7420 flows through switch 7404, inductor 7408 and switch 7410. As diodes 7414 and 7416 are not conducting, load 7418 is substantially isolated from the voltage source 7402.

Figure 75A:
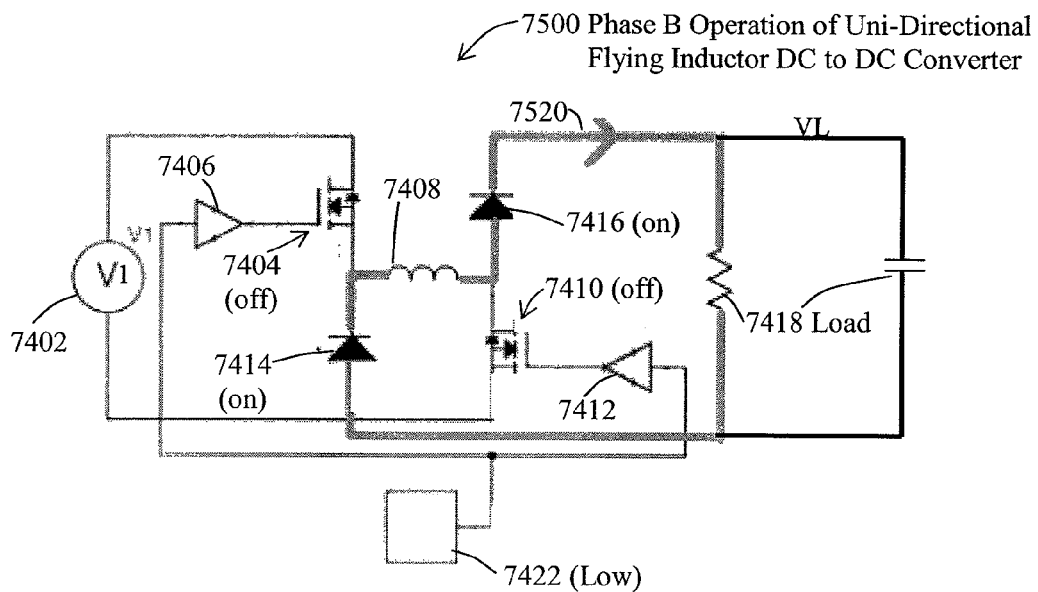
FIG. 75A is a schematic illustration of the phase-B operation of a uni-directional flying inductor DC to DC converter.

FIG. 75A is a schematic illustration of the phase-B operation 7500 of the uni-directional flying inductor DC to DC converter. The output 7422 of waveform generator 7422 is low, which, through buffers 7406 and 7410, drives switches 7404 and 7410 respectively in an open condition. As such, the voltage 7402 of voltage source is isolated from inductor 7408. Simultaneously, the current 7520 in inductor 7408, which was generated during phase-A operation and which cannot be interrupted, creates a voltage across inductor 7408 of the opposite polarity from phase A of FIG. 74, until its amplitude is sufficiently high to forward-bias rectifier diodes 7414 and 7416. As such, inductor 7408 is connected to load 7418, and current 7520 flows into load 7418. The current flowing through load 7418, in the manner illustrated in FIG. 75, decays due to dissipation from the resistive load 7418. Phase B ends when the current 7520 in inductor 7408 has decreased to 0, at which point the entire energy in the inductor 7408 has been transferred to load 7418.

The switches 7404, 7410 of FIG. 75 are assumed to open essentially simultaneously at the transition between phase-A and phase-B. However, there can be a short period between the end of phase-A and the beginning of phase-B during which only one of switches 7404, 7410 remains closed.

Figure 75B:
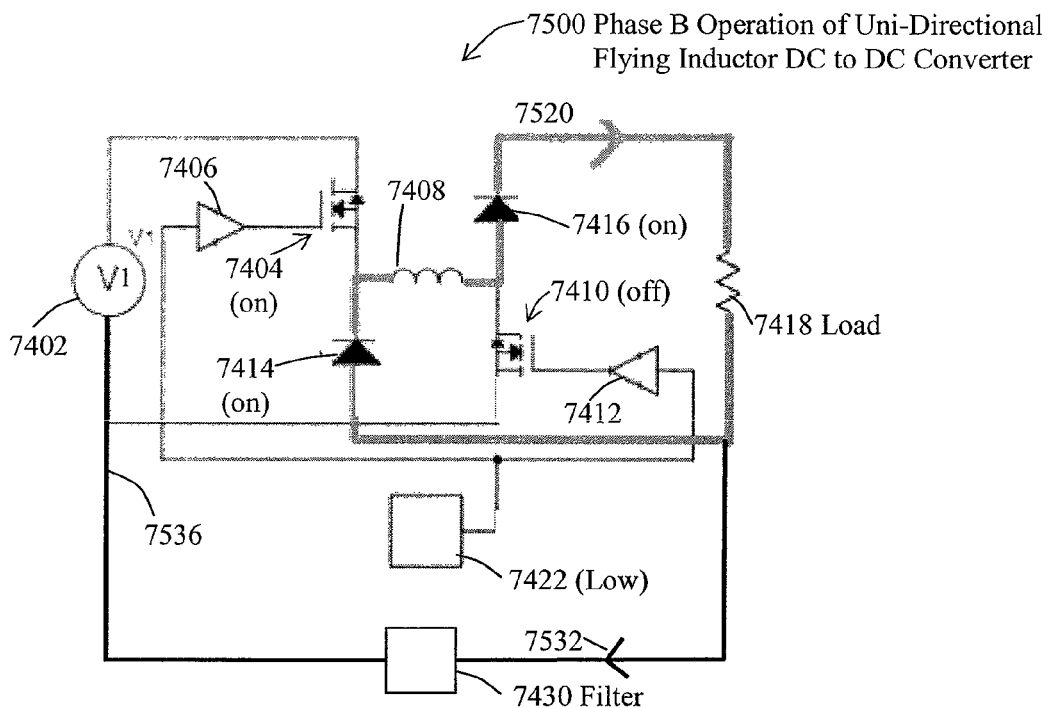
FIGS. 75B, 75C illustrate the current flow into an external circuit that results from the loss of isolation due to mismatch in the opening and closing times of switches 7404, 7410.
Figure 75C:
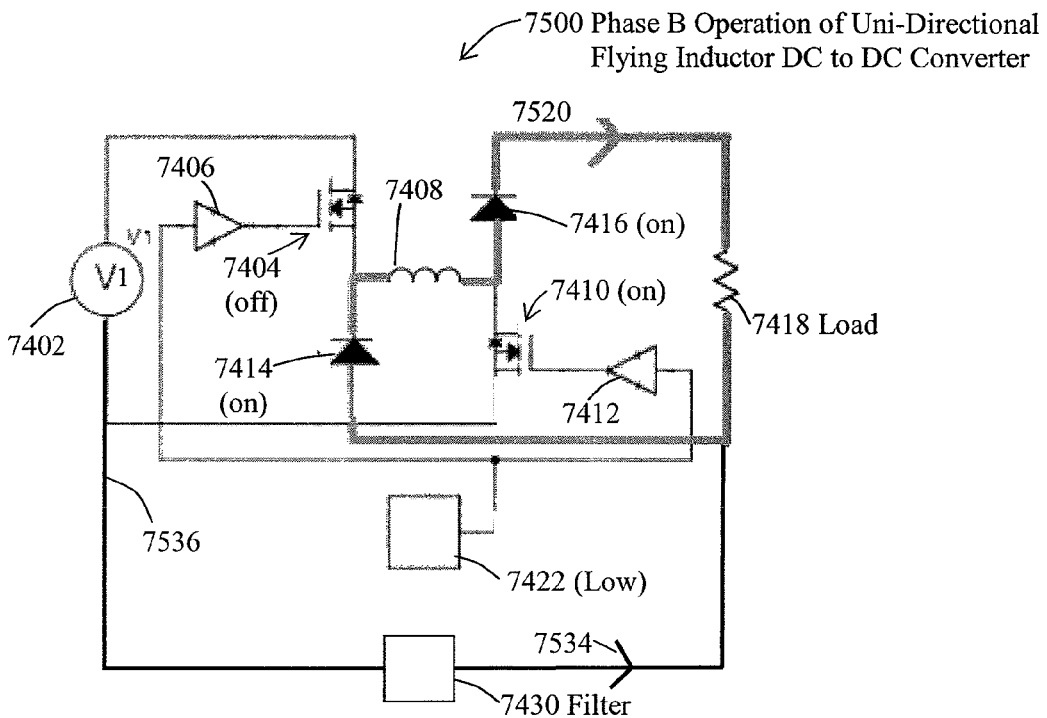

FIGS. 75B, 75C illustrate the current flow into an external circuit that results from the loss of isolation due to mismatch in the opening and closing times of switches 7404, 7410. Specifically, if switch 7404 were to open first, the current 7420 of FIG. 74 would be interrupted, but the current 7520 would start immediately, because the current through inductor 7408 cannot be interrupted. This would connect the inductor 7408 to load 7418 through forward biased diode rectifiers 7414, 7416, as illustrated in FIG. 75A. However, switch 7410 would be still closed, connecting the negative terminal of voltage source 7402 to the positive terminal of load 7418. Similarly, if switch 7410 were to open first, the current 7420 of FIG. 74 would be interrupted, but the current 7520 would start immediately, because the current through inductor 7408 cannot be interrupted. This would connect the inductor 7408 to load 7418 through forward biased diode rectifiers 7414, 7416, as illustrated in FIG. 75A. However, switch 7404 would is still closed, connecting the positive terminal of voltage source 7402 to the negative terminal of load 7418. Either one of these conditions result in a temporary loss of isolation between voltage source 7402 and load 7418.

As illustrated in FIG. 75B, an impulse of current 7532 flows in the clockwise direction through an external circuit 7536 during the time that switch 7404, is closed and switch 7410 is open.

Conversely, as illustrated in FIG. 75C, an impulse 7534 of current flows in the counter-clockwise direction through the external circuit 7536 during the time that switch 7410, is closed and switch 7404 is open. The current of these pulses can be limited through the use of low pass filter 7530. If these current impulses are symmetrical, there is no net DC flow in the external circuit. However, an asymmetrical mismatch between the opening and closing times of switches 7404 and 7410 results in a net flow of DC current through the external circuit. To minimize this loss of isolation, the opening and closing moments of switches 7404 and 7410 must be synchronized to a great extent. At the minimum, the asymmetry in the times must be minimized, so that only AC flows in the external circuit which can be minimized through the use of filter 7530.

Figure 76:
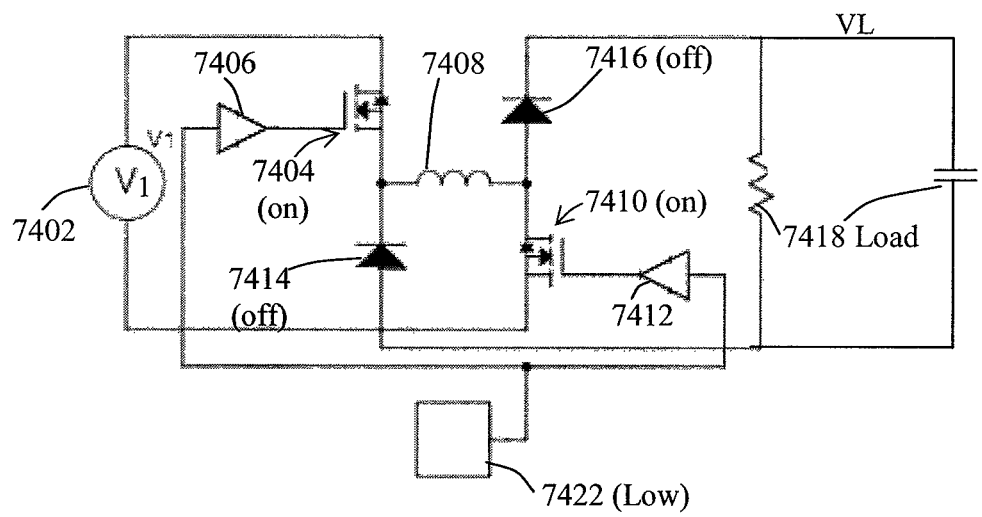
FIG. 76 is a schematic illustration of the dead time operation of a uni-directional flying inductor DC to DC converter.

FIG. 76 is a schematic illustration of the dead time operation 7600 of a uni-directional flying inductor DC to DC converter. As illustrated in FIG. 76, switches 7404, 7410 are open, since buffers 7406, 7412 are off, as a result of the waveform generator 7422 being in a low condition. After the current in inductor 7408 decays to zero, no current is flowing through inductor 7408. The voltage source 7402 is therefore substantially isolated from the load 7418 during the dead time.

Figure 77:
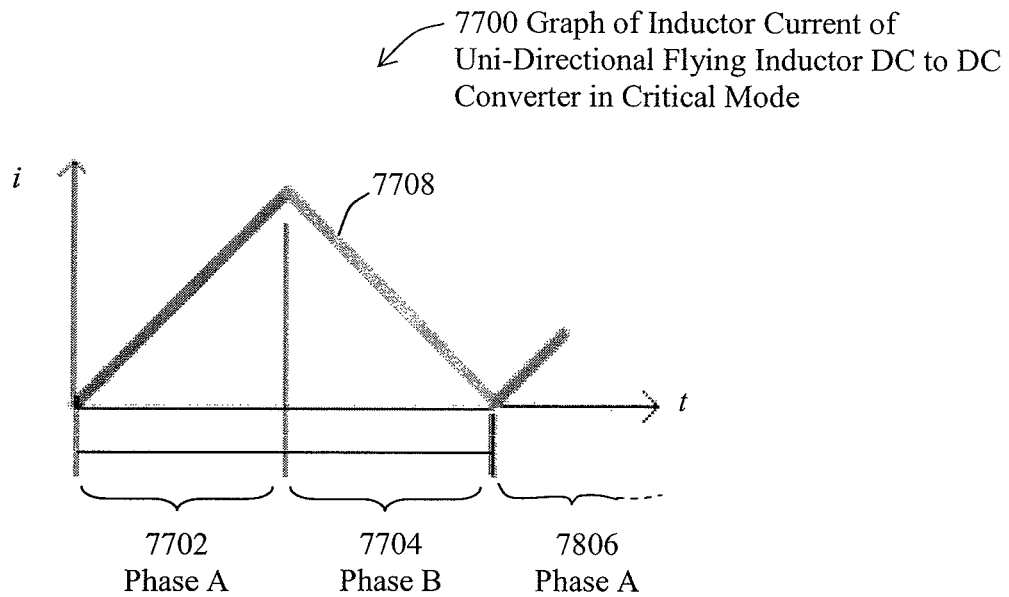
FIG. 77 is a plot of inductor current versus time of a uni-directional flying inductor DC to DC converter that is operating in critical mode.

FIG. 77 is a graph 7700 of inductor current of the uni-directional flying inductor DC to DC converter 7100 that is operating in critical mode. As illustrated in FIG. 77, during phase-A 7702, inductor current gradually builds, since the voltage $V_1$ is applied across the inductor 7408. During phase-B 7704, the switches 7404, 7410 are opened and the current 7424 (FIG. 75), through the inductor 7408, decays as a result of dissipation and the resistive load 7418. As soon as the current 7424 decays to zero, switches 7404, 7410 are closed, as a result of the waveform generator 7422 going high, and another phase-A 7706 is initiated and the current again starts to build in the inductor 7408.

Figure 78:
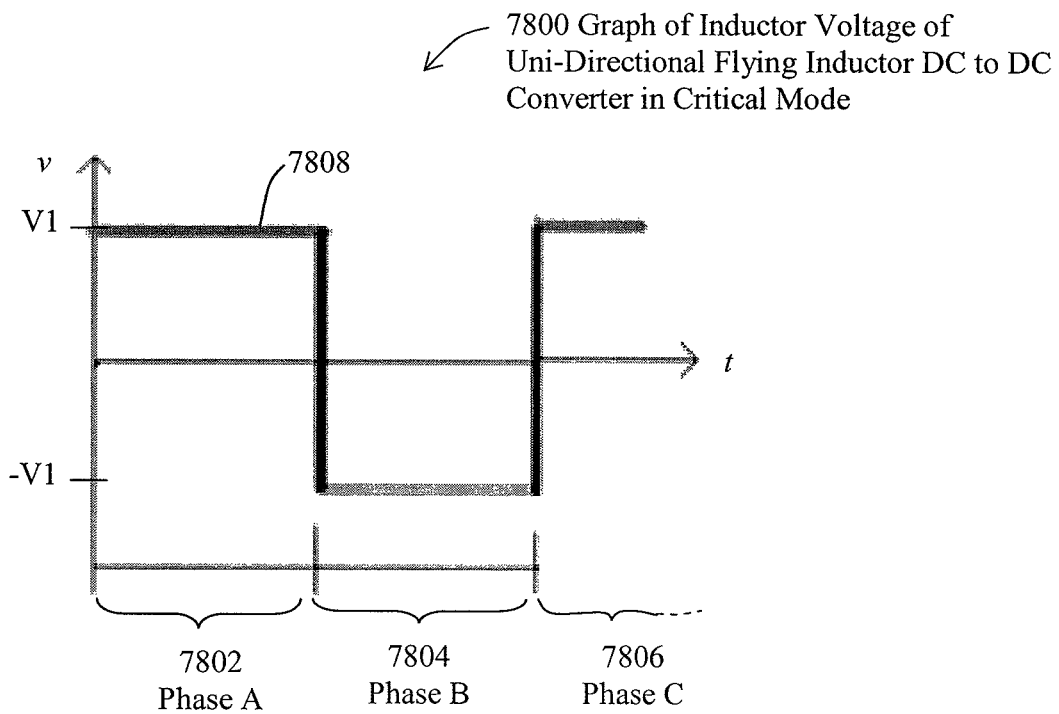
FIG. 78 is a plot of inductor voltage versus time of a uni-directional flying inductor DC to DC converter operating in critical mode.

FIG. 78 is a graph 7800 of inductor voltage of a uni-directional flying inductor DC to DC converter 7100 operating in critical mode. As illustrated in FIG. 78, the voltage waveform 7808 has a voltage equal to $V_1$ during phase-A 7802. During phase-B 7804, the voltage waveform 7808 has a voltage equal to the negative of the load voltage, $-VL$. The voltage waveform then returns to the voltage $V_1$ during phase C 7806. Phase-B is timed so that the inductor current decreases to 0 when the next phase is initiated.

Figure 79:
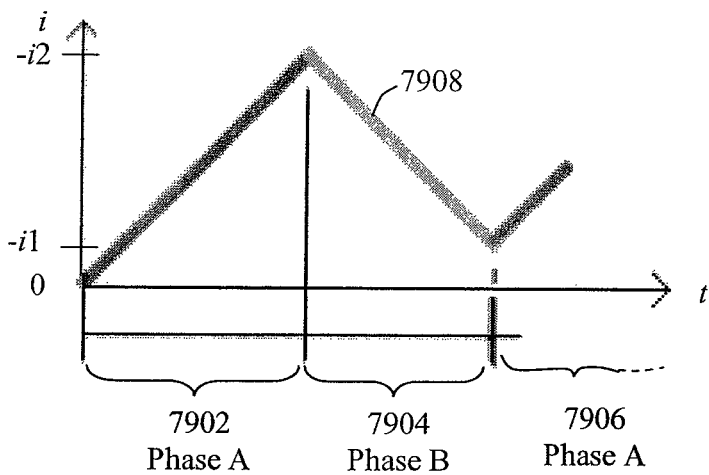
FIG. 79 is a plot of inductor current versus time of a uni-directional flying inductor DC to DC converter in continuous mode.

FIG. 79 is a graph 7900 of inductor current of a uni-directional flying inductor DC to DC converter 7100 in continuous mode. The continuous mode of operation is similar to the critical mode, except that the next phase is initiated before the current 7424 decays to zero so that there is still current in the inductor 7408. The new phase is started and more current is added to the inductor 7408, which is an addition to the current that is already flowing in the inductor. The continuous mode of operation is considered continuous because there is always current flowing in the inductor 7408. The amount of energy transferred is regulated by adjusting the pulse width modulation of the control signal, which is the ratio of the duty cycle of phase-A versus the sum of phase-A plus phase-B. The higher the average inductor current, the higher the amount of energy transferred. Referring again to FIG. 79, during phase-A 7902 inductor current increases to $I_2$, as illustrated by plot 7908. Phase-B 7904 is such that the current decreases to $I_1$ as shown by current plot 7908. Although Phase-B is shown as shorter, Phase-B could be longer, depending upon the ratio of the input and output voltage. Phase-A 7906 then begins again before the inductor current 7908 decreases to zero.

Figure 80:
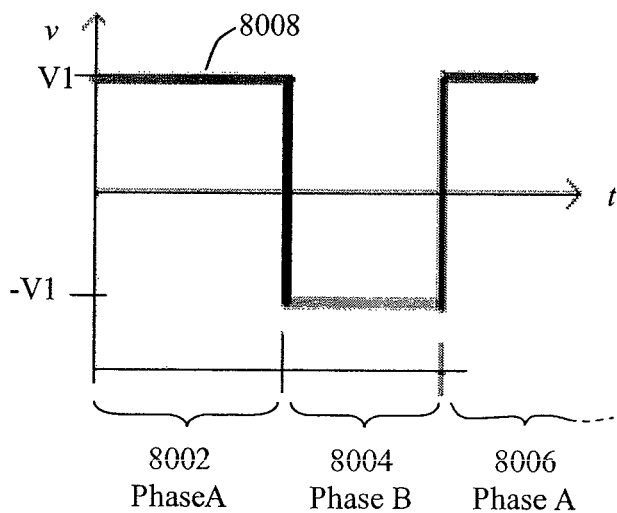
FIG. 80 is a plot of inductor voltage of a uni-directional flying inductor DC to DC converter versus time that is operating in a continuous mode.

FIG. 80 is a plot 8000 of conductor voltage of a uni-directional flying inductor DC to DC converter 7100 versus time that is operating in a continuous mode. As illustrated in FIG. 80, during phase-A 8002, the inductor voltage is at voltage level $V_1$. During phase-B 8004 the inductor voltage is the negative of the load voltage, V.

Figure 81A:
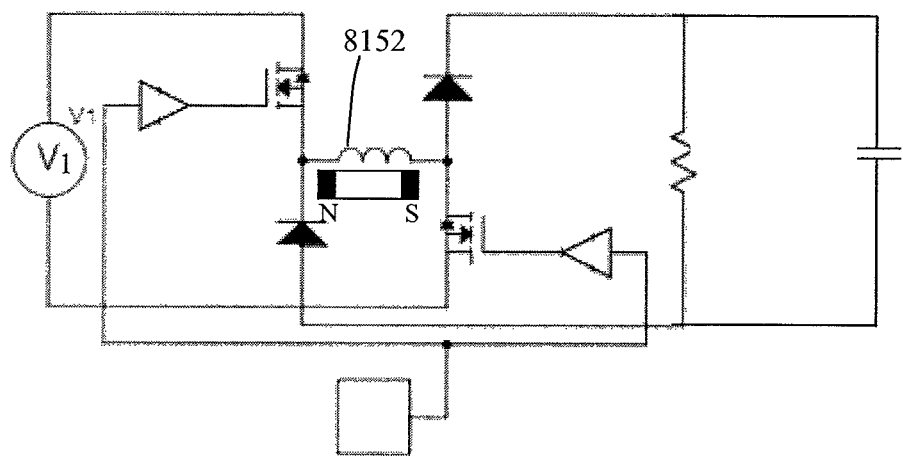
FIG. 81A is a schematic diagram of a uni-directional, flying inductor, DC to DC converter employing a biased inductor.

FIG. 81A is an illustration of another embodiment 8100 of a uni-directional flying inductor DC-DC converter, using a biased inductor. The current in inductor 7408 in FIG. 74 flows in only one direction, therefore using only one half of the available magnetization of inductor 7408. Use of a magnetically biased inductor 8102 allows use of the full range of the available magnetization of inductor 8102, and therefore allows the use of a physically smaller inductor for a given amount of power transferred.

Figure 81B:
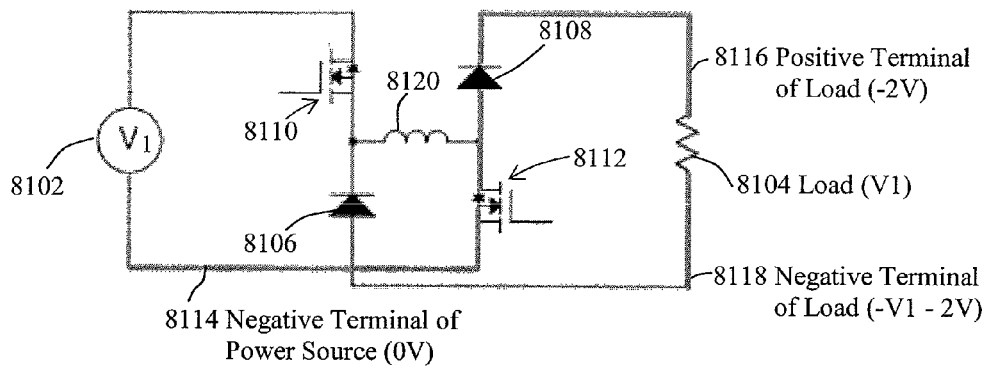
FIG. 81B is a schematic illustration of a uni-directional flying inductor DC to DC converter indicating the path of current that limits the input-output isolation when the voltage of the load is more negative than the voltage of the power source.

FIG. 81B is an illustration of the uni-directional flying inductor DC to DC converter 8100 illustrating an analysis of the isolation limits of the uni-directional flying inductor DC to DC converter 8100 with the load pulled as far negative as possible. Node 8114, on the negative terminal of voltage source 8102, is the reference, by definition at 0 Volt. Node 8116, on the positive terminal of load 8104, can be pulled in the negative direction until rectifier diode 8108 and the intrinsic diode in switch 8112 are forward biased. At that point, the voltage drop across rectifier diode 8108 is approximately 1 V, as is the voltage drop across the intrinsic diode in switch 8112. Therefore, the voltage of terminal 8116 is unable to go any more negative than 2 V below the reference node 8114. The voltage on node 8118, on the negative terminal of load 8104, is lower than the voltage on node 8116, on the positive terminal of load 8104, by an amount equal to the voltage across the load 8104. Therefore, the voltage on node 8118 is unable to go any more negative than the load voltage, VL, plus 2 V. In other words, the negative end of load 8104 is clamped to $-VL-2$ V. The voltage on node 8118 will not be clamped if the components 8108, 8112 are not allowed to be forward biased, that is if the voltage on node 8118 is not allowed to go below $-VL$, the negative of the voltage of the load 8104.

Figure 82:
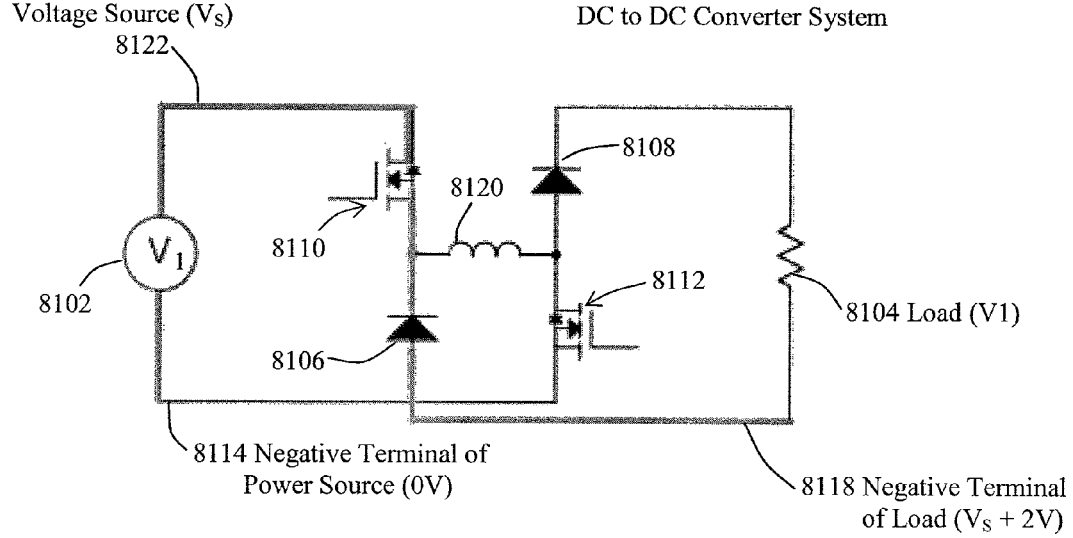
FIG. 82 is a schematic illustration of a uni-directional flying inductor DC to DC converter indicating the path of current that limits the input-output isolation when the voltage of the load is more positive than the voltage of the power source.

FIG. 82 is the illustration of the uni-directional, flying inductor DC to DC converter 8100 illustrating an analysis of the isolation limits of a uni-directional flying inductor DC to DC converter 8100 with the load pulled as far positive as possible. Node 8116, on the negative terminal of voltage source 8102, is the reference, by definition at 0 Volt. Node 8118, on the negative terminal of load 8104, can be pulled in the positive direction until rectifier diode 8106 and the intrinsic diode in switch 8110 are forward biased. At that point, the voltage drop across rectifier diode 8106 is approximately 1 V, as is the voltage drop across the intrinsic diode in switch 8110. Therefore, the voltage of terminal 8118 is unable to go any more positive than 2 V above the voltage of node 8122 on the positive terminal of voltage source 8102. The voltage on node 8122 is higher than the voltage on reference node 8114, on the negative terminal of voltage source 8102, by V1. Therefore, the voltage on node 8118 is unable to go any more positive than the voltage source voltage, V1, plus 2 V. In other words, the negative end of load 8104 is clamped to $V1-2$ V. The voltage on node 8118 will not be clamped if the components 8106, 8110 are not allowed to be forward biased, that is if the voltage on node 8118 is not allowed to go above V1, the voltage of the voltage source 8102.

The analysis of FIGS. 81A, 81B and 82 show that the voltage source 8102, and the load 8104, are essentially isolated from each other as long as the voltage on node 8118 remains within the range $-VL$ and V1, where VL is the voltage of the load 8104, and V1 is the voltage of the voltage source 8012. Outside of that range, the uni-directional, flying inductor DC-DC converter is not isolated.

Figure 83:
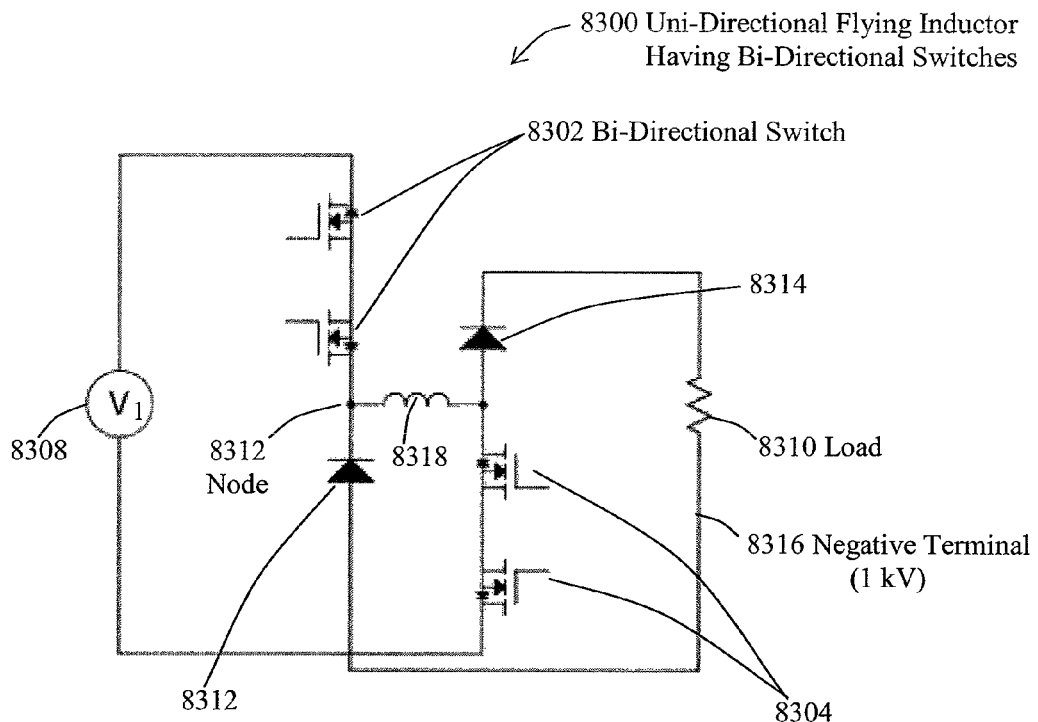
FIG. 83 is a schematic illustration of a uni-directional flying inductor DC to DC converter using bi-directional active switches, indicating the path of current that limits the input-output isolation when the voltage of the load is more negative than the voltage of the power source.

FIG. 83 is a schematic illustration of another embodiment 8300 of the uni-directional DC-DC converter that has a higher isolation voltage range than the circuit of FIGS. 81A, 81B and 82. The active switches 8110 and 8112 of FIGS. 81A, 81B and 82 are replaced by bidirectional active switches 8302 and 8304, respectively. When closed, bidirectional switches 8302 and 8304 are able to conduct current in either direction. When open, bidirectional switches 8302 and 8304 do not conduct current in any direction. A bidirectional switch may consist of two transistors in series though in the opposite direction, such as two MOSFETs, two IGBTs, two BJTs. A bidirectional switch may also consist of a transistor and a rectifier diode in series, with the transistor in the normal orientation, such as switches 8110 and 8112 in FIG. 82, and the rectifier diode in the direction that is the opposite of the intrinsic diode across the transistor. The use of bidirectional switches removes the limitation of the circuit in FIG. 82, because there is no longer a series of diodes that can be forward biased when the load is pulled negatively or positively.

Figure 84A:
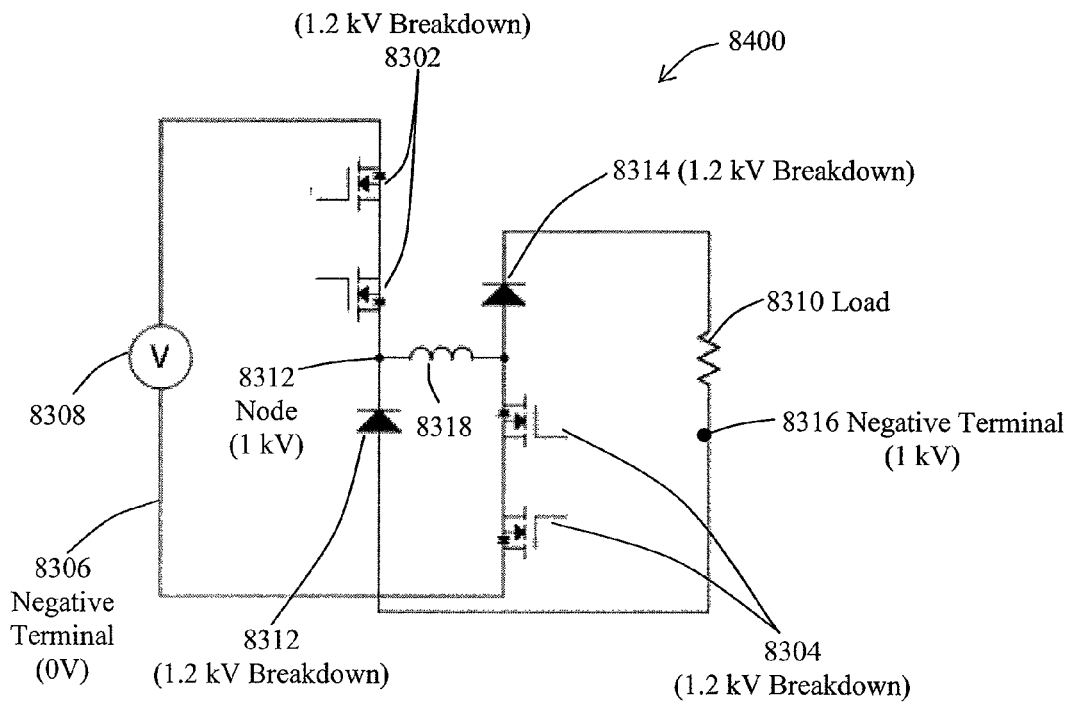
FIG. 84A is a schematic illustration of a uni-directional flying inductor DC to DC converter using bi-directional active switches, indicating the path of current that limits the input-output isolation when the voltage of the load is more positive than the voltage of the power source.

FIG. 84A is the illustration of a uni-directional, flying inductor, DC to DC converter 8400 that provides an analysis of the isolation limits of the uni-directional flying inductor DC to DC converter 8400, as the load is pulled in the positive direction. Rectifier diodes 8312, 8314 may have a reverse breakdown voltage of 1.2 kV, that is, they are able to withstand a voltage across them of 1200 V without conducting or damage. Bidirectional switches 8302, 8304 may have a breakdown voltage of 1.2 kV, that is, they are able to withstand a voltage across them in either direction of 1200 V without conducting or damage. Node 8306, on the negative terminal of the voltage source 8308 is defined as a reference. The voltage on node 8306 is, by definition, 0 V. The voltage on node 8316, on the negative terminal of the load 8316, is pulled up to positive 1 kV above the reference node 8306. Rectifier diode 8312 is forward biased, allowing the positive 1 KV voltage to be applied to inductor 8318. The intrinsic diode in the bottom component in bidirectional switch 8302 is also forward biased, allowing the positive 1 KV voltage to be applied to the mid-point voltage inside switch 8302. However, the top component in bidirectional switch 8302 is oriented in the opposite direction, and is therefore reverse biased. As the breakdown voltage of bidirectional switch 8302 is 1.2 kV, it can withstand that reverse voltage, preventing the positive 1 KV voltage to be applied to node 8307, on the positive terminal of voltage source 8308. Therefore, in the unidirectional, flying inductor DC-DC converter, the voltage source 8308 is isolated from the load 8310 as long as the voltage on the load 8310 is no more positive than 1 kV.

Figure 84B:
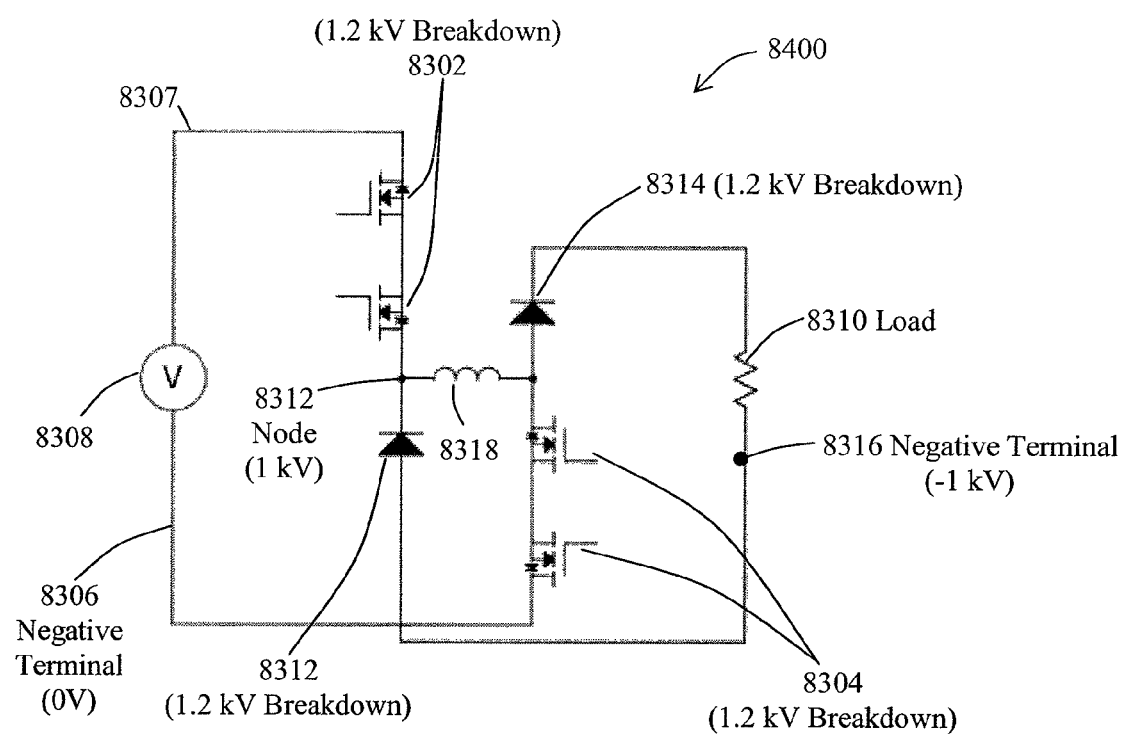
FIG. 84B is a schematic illustration of a uni-directional flying inductor DC to DC converter using bi-directional active switches, indicating the path of current that limits the input-output isolation when the voltage of the load is more negative than the voltage of the power source.

FIG. 84B is an illustration of the uni-directional, flying inductor, DC to DC converter 8400 that provides an analysis of the isolation limits of a uni-directional flying inductor DC to DC converter 8400, as the load is pulled in the negative direction. Node 8306, on the negative terminal of the voltage source 8308 is defined as a reference, at 0 V by definition. The voltage on node 8316, on the negative terminal of the load 8316, is pulled down to negative 1 kV below the reference node 8306. Rectifier diode 8314 is forward biased, allowing the negative 1 kV voltage to be applied to inductor 8318. The intrinsic diode in the top component in bidirectional switch 8304 is also forward biased, allowing the negative 1 kV voltage to be applied to the mid-point voltage inside switch 8304. However, the bottom component in bidirectional switch 8304 is oriented in the opposite direction, and is therefore reverse biased. As the breakdown voltage of bidirectional switch 8304 is 1.2 kV, it can withstand that reverse voltage, preventing the negative 1 kV voltage to be applied to node 8306. Therefore, in the unidirectional, flying inductor DC-DC converter, the voltage source 8308 is isolated from the load 8310 as long as the voltage on the load 8310 is no more negative than 1 kV.

The analysis of FIGS. 84A and 84B shows that the voltage source 8102, and the load 8104, are essentially isolated from each other as long as the voltage on node 8316 remains within the range −Vbreakdown and +Vbreakdown, where Vbreakdown is the breakdown voltage of the components 8312, 8314, 8302, 8304. Outside of that range, the unidirectional, flying inductor DC-DC converter with bidirectional switches is not isolated.

Figure 85:
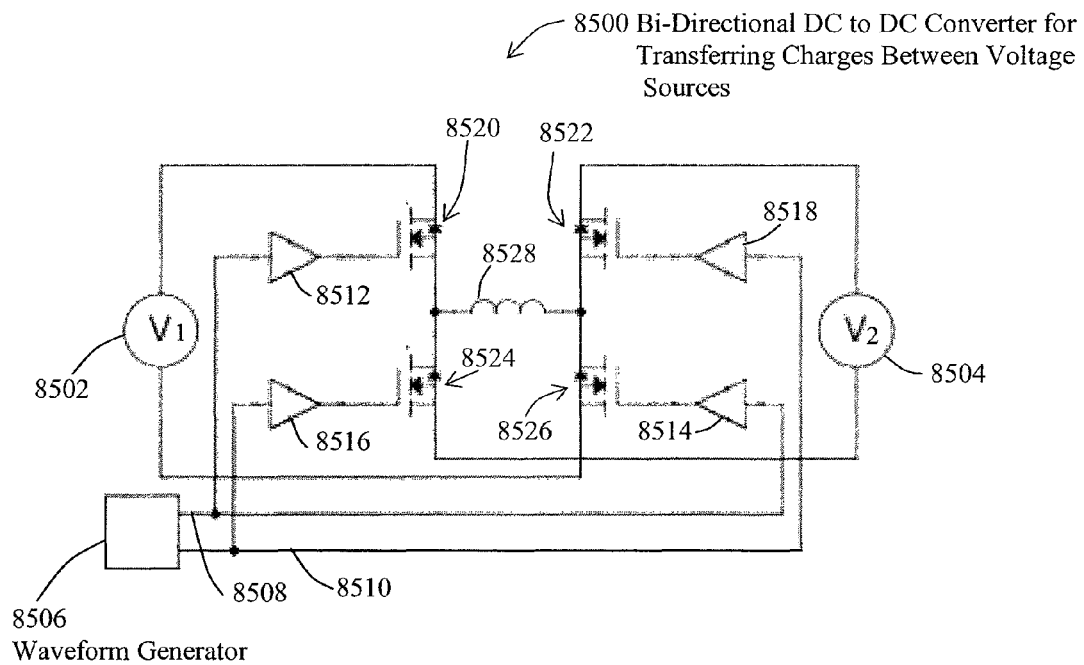
FIG. 85 is a schematic illustration of a bi-directional DC to DC converter for transferring charges between voltage sources.

FIG. 85 is a schematic illustration of a bi-directional DC to DC converter 8500 for transferring charges between voltage sources. As illustrated in FIG. 85, two voltage sources 8502, 8504 are connected to the bi-directional DC to DC converter 8500. Waveform generator 8506 generates a waveform on output 8508 and waveform on output 8510. At any given time, waveform 8508 can be low, or waveform 8510 can be low, of both can be low. At no time can waveform 8508 and 0810 be both high. These waveforms are typically variable duty cycle, square wave waveforms. Buffers 8512, 8514 are driven by output 8508 and close switches 8520, 8526 on the high portion of the waveform at output 8508 of waveform generator 8506. Buffers 8516, 8518 are driven by output 8510 and close switches 8520, 8526 on the high portion of the waveform at output 8510. As such, switches 8520, 8526 are closed only during a first phase, phase-A and are opened otherwise. Switches 8522, 8524 are closed only during a second phase, phase-B and are opened otherwise. All switches 8520, 8524, 8522, 8526 are opened during a dead time phase. Hence, current flows through inductor 8528 in accordance with the timing of the voltage that is alternatively applied to inductor 8528, resulting in flow of power from either voltage source 8502 to voltage source 8504, or in the reverse direction.

Figure 86:
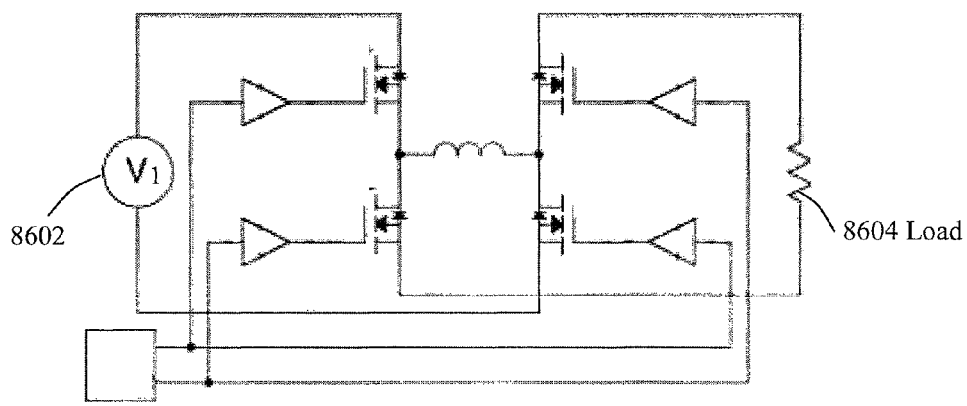
FIG. 86 is a schematic illustration of a bi-directional DC to DC converter for transferring a charge from a voltage source to a load.

FIG. 86 is a schematic illustration of a bi-directional flying inductor DC to DC converter 8600 for transferring a charge from a voltage source 8602 to a load 8604. As illustrated in FIG. 86, the bi-directional DC to DC converter 8600 operates in the same manner as the bi-directional DC to DC converter 8500, illustrated in FIG. 85, with the exception that the pulse width of the waveform that is applied by the waveform generator 8606 controls the amount of energy that is transferred from the voltage source 8602 to the load 8604.

The topology of the circuits illustrated in FIGS. 85 and 86 differs from the uni-directional topology 7100 that is disclosed in FIG. 71, in that the two rectifier diodes are replaced by active switches, making the topology of the bi-directional DC to DC converter 8600 fully symmetrical. The bi-directional DC to DC converter 8600, illustrated in FIG. 86, has better efficiency than the uni-directional DC to DC converter 7600, illustrated in FIG. 76, since the active switches in the bi-directional DC to DC converter 8600 can be designed to have a lower voltage drop than the forward voltage drop of rectifier diodes 7414, 7416. Therefore, the bidirectional converter is preferable to the unidirectional converter even in unidirectional applications, due to its higher efficiency, though at a slightly higher parts cost.

The bi-directional DC to DC converter, such as illustrated in FIGS. 85 and 86, can operate in the discontinuous mode, critical mode and continuous mode, and in either two or three phases, such as phase-A, phase-B or an optional dead time phase. In the bi-directional DC to DC converter, either phase-A or phase-B can occur first depending upon the direction in which power is to be transferred. For example, if phase-A occurs first, energy is transferred from a first power source to a second power source, or if phase-B occurs first, energy is transferred from a second power source to a first power source, as disclosed in more detail below.

With respect to FIGS. 87-102, current flowing through an inductor, such as inductor 8726 or 9106, from left to right is considered to be in a positive direction and current flowing through inductor 8726 or 9106 from right to left is considered to be in a negative direction. Similarly, voltage with a voltage more positive on the right end of the inductor, such as inductor 8726 or 9106, is considered to be a positive voltage, while a voltage more negative on the right end of the inductor, such as inductor 8726 or 9106, is considered to be a negative voltage.

FIGS. 87-90 disclose the manner in which energy is transferred from a first voltage source 8702 to a second voltage source 8728 by first initiating the operation of the bi-directional inductor DC to DC converter in phase-A.

Figure 87:
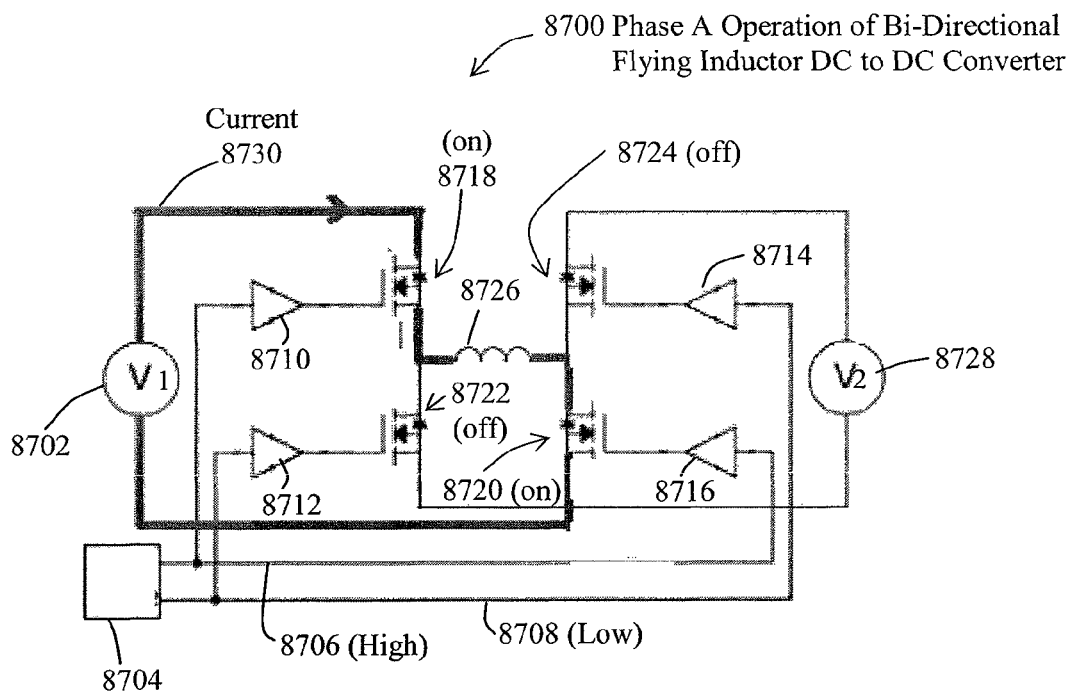
FIG. 87 is a schematic illustration of a bi-directional flying inductor DC-DC converter transferring power from V1 to V2, in phase-A.

FIG. 87 illustrates phase-A operation 8700 of the bidirectional floating inductor DC-DC converter transferring energy in the forward direction. The waveform generator 8704 generates the first output 8706 in a high condition. As such, buffer 8710 closes switch 8718 and buffer 8716 closes switch 8720. In this manner, the current 8730 flows from voltage source 8702 through switch 8718, through inductor 8726 through switch 8720 and returns to the voltage generator 8702, transferring energy from voltage source 8702 to inductor 8726. The waveform generator 8704 generates signal 8708 in a low condition. As such, buffers 8712, 8714 open switches 8722, 8724, respectively, isolating inductor 8726 from the second voltage source 8728.

Figure 88:
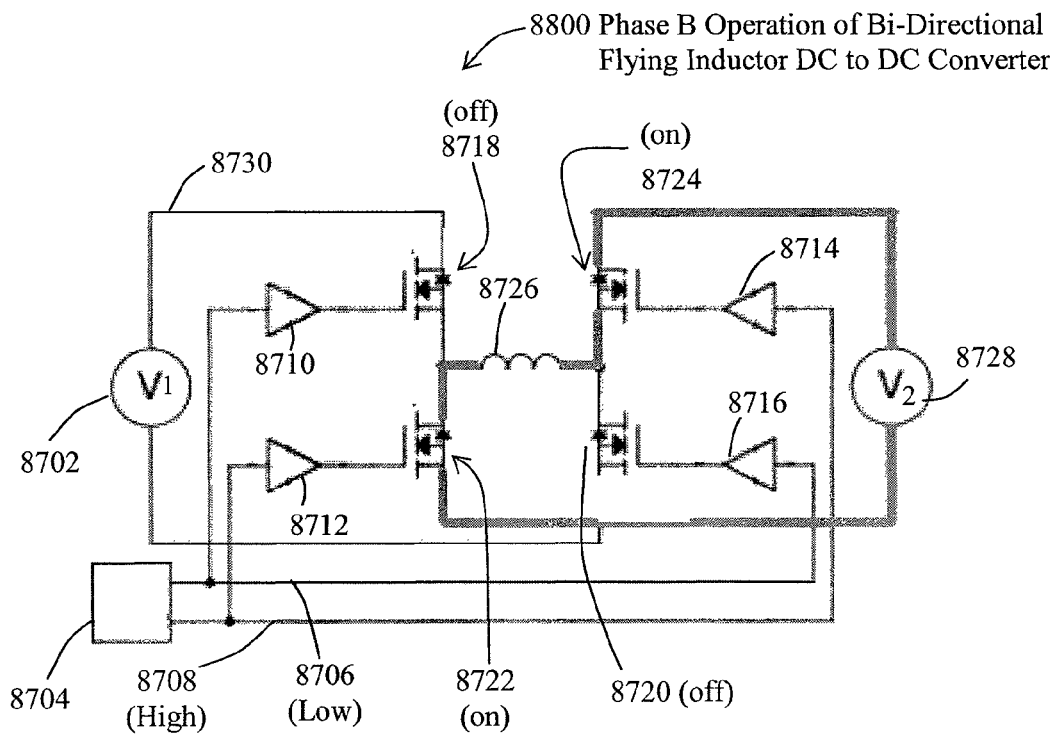
FIG. 88 is a schematic illustration of a bi-directional flying inductor DC-DC converter transferring power from V1 to V2, in phase-B.

FIG. 88 illustrates the phase-B operation 8800 of the bi-directional flying inductor DC to DC converter, that is illustrated in FIG. 87, transferring energy in the forward direction. As shown in FIG. 88, the waveform generator 8704 generates a low signal on output 8706. As such, buffers 8710, 8716 open switches 8718, 8720, respectively, isolating inductor 8726 from the first voltage source 8702. The waveform generator 8704 generates a high signal on output 8708. As such, buffer 8712 closes switch 8722 and buffer 8714 closes switch 8724. The voltage $V_2$ from voltage source 8728 is asserted across inductor 8726 in the manner illustrated in FIG. 88. In other words, the voltage ($V_1$) that is asserted across the inductor 8726 in phase-A (in a positive direction), as illustrated in FIG. 87, is the opposite of the voltage ($V_2$) that is asserted across the inductor 8726 during phase-B (in a negative direction), as illustrated in FIG. 88. In this manner, the current in inductor 8726 is discharged onto second voltage source 8728, transferring the energy stored in inductor 8726 onto second voltage source 8728. As such, the flying inductor DC-DC converter succeeded in transferring energy in the forward directions, from the first voltage source 8702 to the second voltage source 8728.

Figure 89:
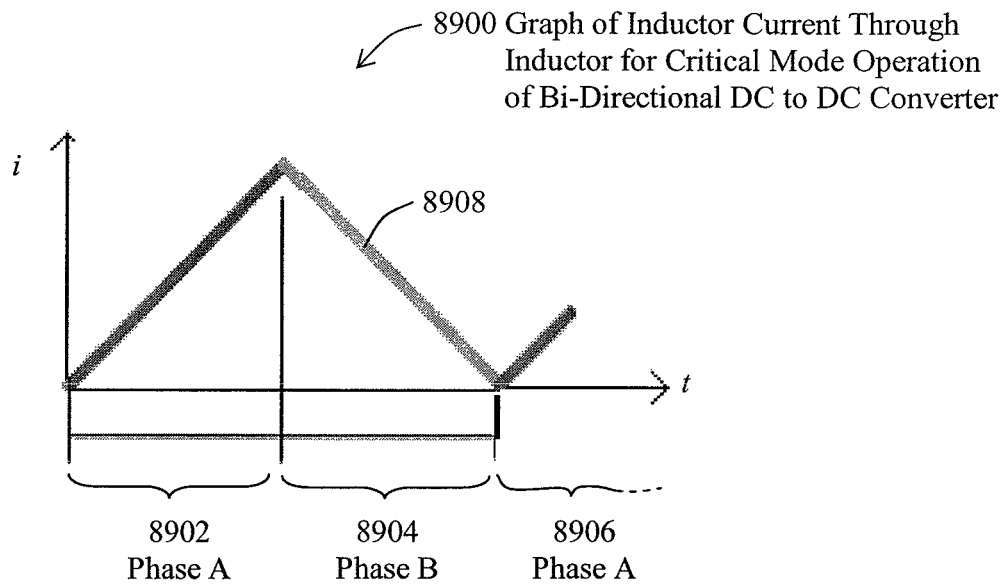
FIG. 89 is a plot of current through the inductor versus time for critical mode operation of the bi-directional DC to DC converter of FIGS. 87 and 88 as the power transfer direction is from V1 to V2.

FIG. 89 illustrates a plot 8900 of current through the inductor for critical mode operation of the bi-directional DC to DC converter transferring energy in the forward direction illustrated in FIGS. 87-88. As illustrated in FIG. 89, the inductor current increases linearly from 0 during phase-A 8902, as illustrated by the highlighted path 8730 of FIG. 87, as a result of the voltage $V_1$ applied across the inductor 8726 in a positive direction. During phase-B 8904, the current decreases linearly to zero because of the voltage $V_2$ that is asserted across the inductor 8726 in an opposite direction from $V_1$, as illustrated in FIG. 87, which decreases the flow of current from left to right in inductor 8726. FIG. 89 shows the inductor current in plot 8908, which is reduced to zero at the end of phase-B 8904. At the end of phase-B 8904, the voltage of the waveform 8910 (FIG. 90) transitions to a positive voltage, which causes the inductor current 8908 to increase again during phase-A 8906.

Figure 90:
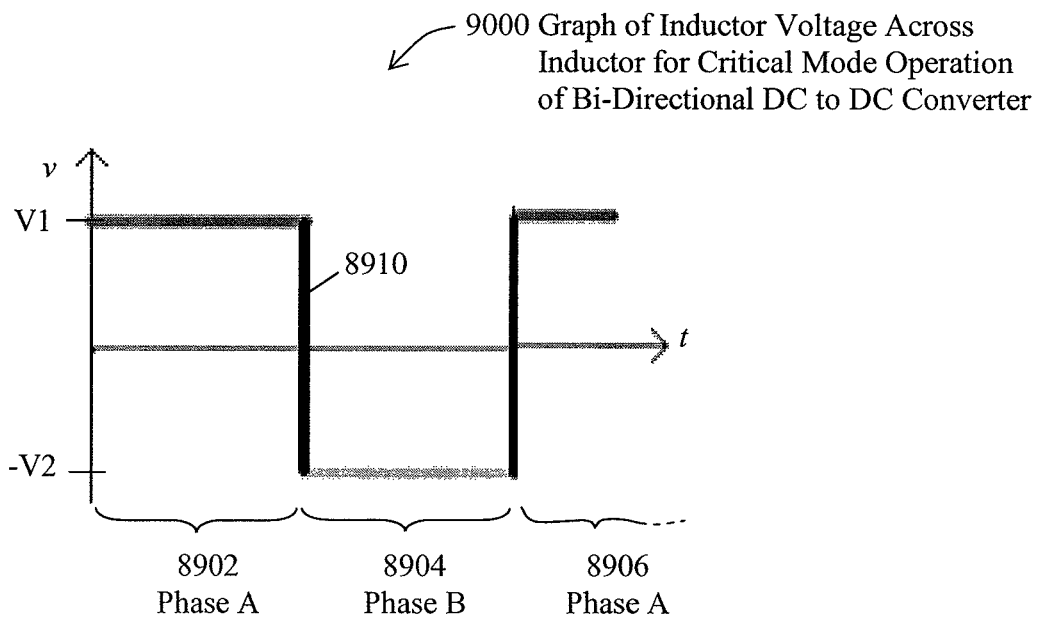
FIG. 90 is a plot of the voltage across the inductor versus time for critical mode operation of the bi-directional DC to DC converter, regardless of the direction of power transfer.

FIG. 90 is a plot 9000 of the voltage across the inductor 8726 for critical mode operation of the bi-directional DC to DC converter 8700 transferring energy in the forward direction. As illustrated in FIG. 90, the voltage 8910 is initiated at a level V1 during phase-A 8902. During phase-B 8904, the voltage waveform 8910 transitions to a minus V2. Phase-A 8906 is then initiated again, so that the voltage waveform 8910 transitions to a voltage of V1. The voltage waveform 8910 is timed so that the inductor current 8908 reaches a maximum during phase-A. During phase-B 8904, the voltage waveform 8910 has a pulse width so that the current 8908 decays to zero volts, so that critical mode operation is established.

Figure 91:
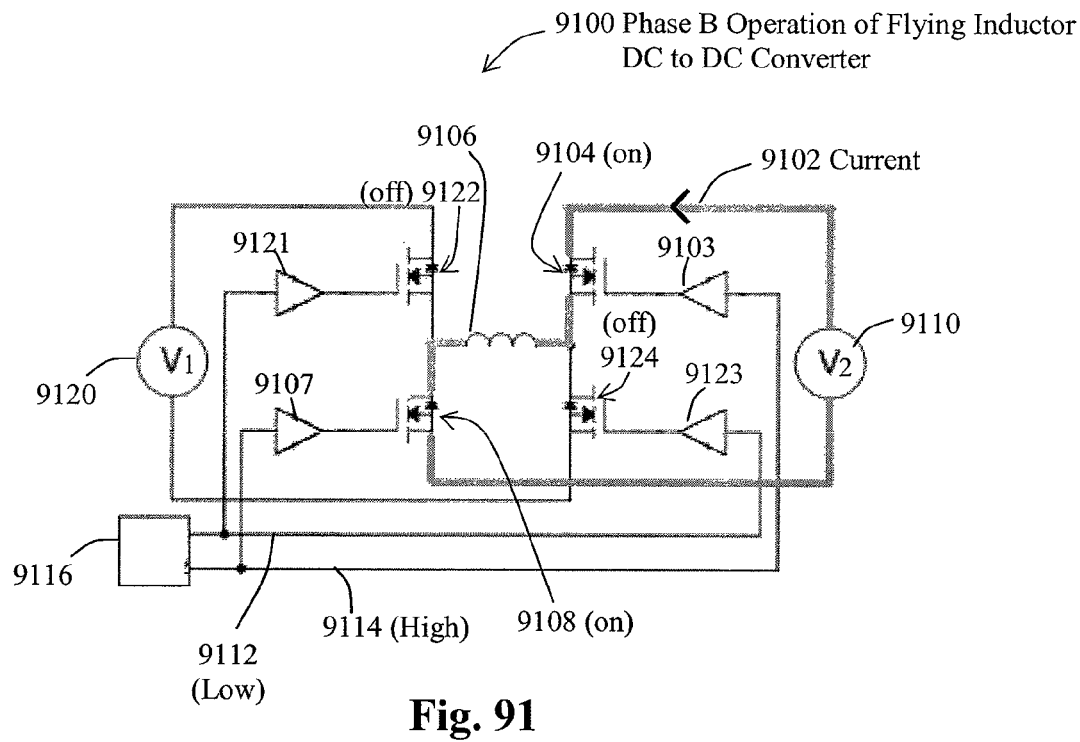
FIG. 91 is an illustration of a bi-directional flying inductor DC to DC converter illustrating the power transfer direction from V2 to V1 that is initiated, in a phase-B operation.
Figure 92:
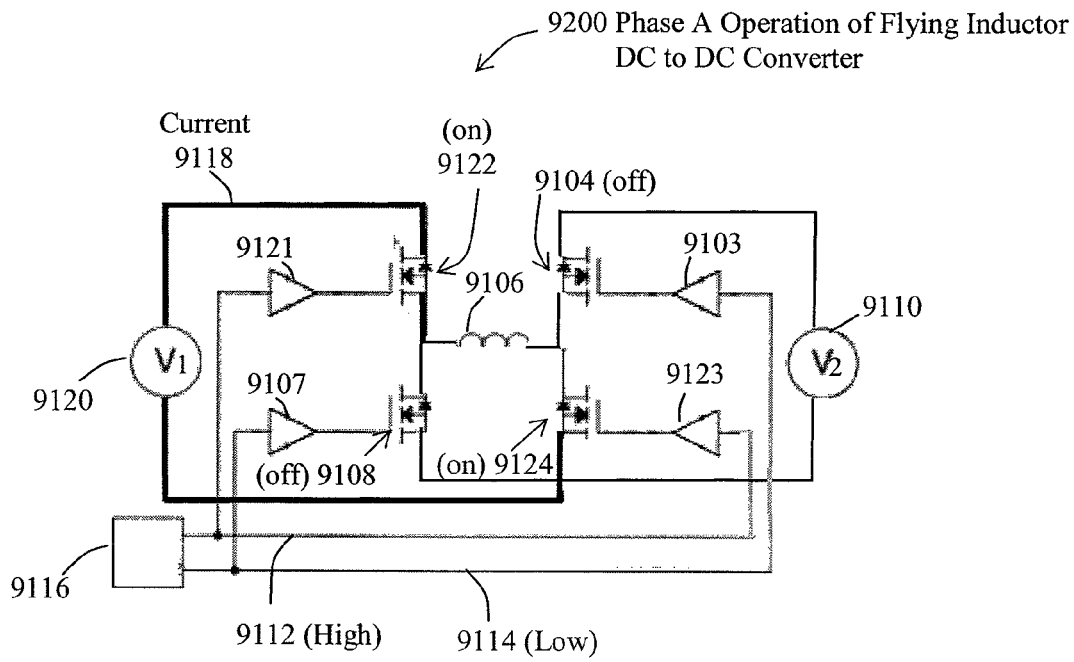
FIG. 92 illustrates the phase-A operation of the flying inductor DC to DC converter of FIG. 91 showing the power transfer direction from V2 to V1, in a phase-A.

FIGS. 91 and 92 are illustrations of a bi-directional flying inductor DC to DC converter 9100 that transfers energy in the reverse direction.

As illustrated in FIG. 91, the processes initiated in phase-B by the waveform generator 9116, which initially generates a low condition on control line 9112, and a high condition on control line 9114. The high condition in control line 9114 causes buffers 9107, 9103 to close switches 9108, 9104, respectively. The voltage ($V_2$) is applied to across inductor 9106 with a negative polarity. Buffers 9120, 9122 are off, which causes switches 9124, 9126 to be open. Consequently, current flows from second voltage source 910 to inductor 9106, transferring energy from second voltage source 910 to inductor 9106. Current 9102 flows in inductor 9106 from right to left, in the opposite direction from the direction illustrated in FIG. 87. The low condition in control line 9112 causes buffers 9121, 9123 to open switches 9122, 9123, respectively, isolating inductor 9106 from first voltage source 9120.

FIG. 92 illustrates phase-A operation 9200 of the flying inductor DC to DC converter that transfers energy in the reverse direction. As shown in FIG. 92, the waveform generator 9116 generates a low condition on control line 9114. As such, buffers 9103, 9107 open switches 9104, 9108 respectively, isolating the inductor 9106 from second voltage source 9110. The waveform generator 9116 generates a high condition on control line 9112. As such, buffers 9121, 9123 close switches 9122, 9124 respectively. This causes voltage $V_1$ to be applied across the inductor 9106 in a positive direction, which is the opposite of the direction in which $V_2$ was applied to inductor 9106 during phase B of FIG. 91. Consequently, current 9118 flows from the inductor 9106 to first voltage source 9120, transferring the energy stored in the inductor 9106 to first voltage source 9120. As such, the flying inductor DC-DC converter succeeded in transferring energy in the reverse directions, from the second voltage source 9110 to first voltage source 9120.

Figure 93:
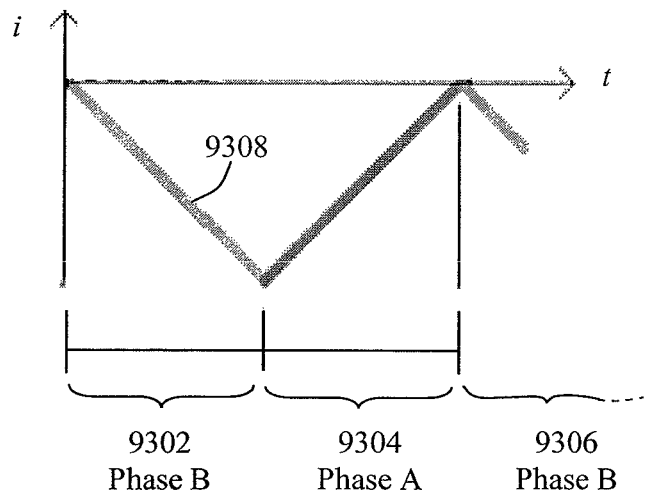
FIG. 93 is a plot of the current through the inductor versus time for critical mode operation of the bi-directional DC to DC converter, showing the direction of power transfer is from V2 to V1, as illustrated in FIGS. 91 and 92.
Figure 94:
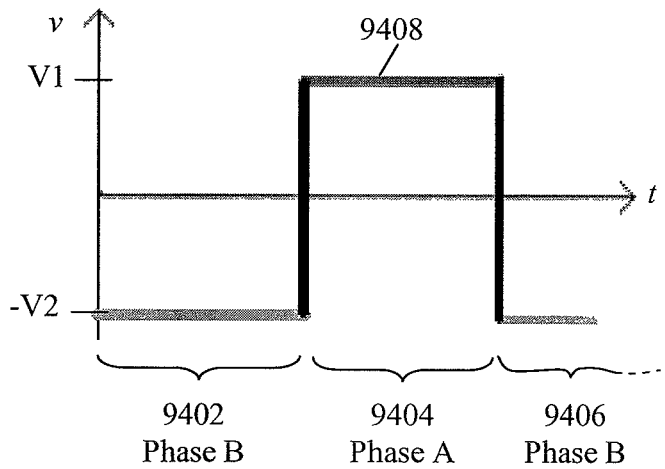
FIG. 94 is a plot of inductor current versus time for critical mode operation of the bi-directional DC to DC converter, showing the direction of power transfer from V2 to V1.

FIG. 93 is a plot 9300 of the current through the inductor 9106 for critical mode operation of the bi-directional DC to DC converter transferring power in the reverse direction, illustrated in FIGS. 91-92. As illustrated in FIG. 93, during phase-B 9302 the inductor current, as shown by plot 9308, starts from 0, then linearly increases in the negative direction since the current is flowing from right to left through the inductor 9106, as illustrated in FIG. 91. At the end of phase-B 9302, as illustrated in FIG. 94, the voltage $V_1$ from voltage generator 9120 is applied across the inductor 9106 in a positive direction during phase-A 9404 that is opposite to the voltage $V_2$ that is applied to inductor 9106 during phase-B 9402. This causes the current to decrease linearly during phase-A to zero current. As shown in FIG. 94, at the end of phase-A 9404, the voltage waveform 9308 transitions to a negative pulse, which initiates phase-B 9406. Since the initiation of phase-B 9406 is at the same time that the current 9308 reaches zero, this is considered to be the critical mode of operation of the bi-directional DC to DC converter.

FIG. 95 is a plot 9500 of inductor current versus time for discontinuous mode of operation transferring power in the forward direction. Compared to critical mode, discontinuous mode adds a dead time, which allows fixing the period of a complete cycle, and therefore to set the overall switching frequency. As illustrated in FIG. 95, during phase-A 9502, the current builds from zero to $i_1$. Phase-B 9504 has a period that depends on the ratio of V1 over V2. The inductor current 9510 decreases to zero during phase-B. During dead time 9506, the current 9510 is not flowing through the inductor

9106. Phase-A 9508 then starts and the current 9510 starts increasing for the period of phase-A 9508.

FIG. 96 is a plot 9600 of the voltage across the inductor 9106 versus time for a discontinuous mode of operation transferring energy in the forward direction. As illustrated in FIG. 96, the voltage waveform 9512 is at a voltage level equal to $V_1$ during phase-A 9502. During phase-B 9504, the voltage 9512 transitions to minus $V_2$. At the end of phase-B 9504, the voltage transitions to zero during dead time 9506. Phase-A then begins again at 9508 where the voltage transitions to voltage $V_1$.

FIG. 97 is a graph 9700 of the inductor current versus time for a discontinuous mode of operation while transferring energy in the reverse direction. As illustrated in FIG. 97, the current 9710 starts at 0 and increases in the negative direction during phase-B 9702, which occurs first. Phase-A 9704 is then initiated and the voltage $_{v1}$ is applied across the inductor, which causes the magnitude of the current 9710 to decrease until the current reaches zero. During dead time 9706, no current is flowing in the inductor since all the switches are off. Phase-B 9708 is then initiated and the current 9710 begins to increase negatively.

FIG. 98 is a plot 9800 of inductor voltage 9710 versus time for a discontinuous mode of operation while transferring energy in the reverse direction. As illustrated in FIG. 98, the voltage waveform 9712 across the inductor 9106 is initiated at phase-B 9702 with a voltage of minus $V_2$ since the voltage source of $V_2$ is applied across the inductor, such as inductor 9106 in FIG. 91, as a negative voltage. Phase-A 9704 is then initiated and the voltage 9712 transitions to a positive voltage $V_1$ since the voltage across the inductor 9106, as illustrated in FIG. 92, is applied in a positive direction. At the end of phase-A 9704, there is a dead time 9706 in which no voltage is applied across the inductor 9106. At the end of the dead time 9706, phase-B 9708 is initiated as a negative pulse.

Figure 99:
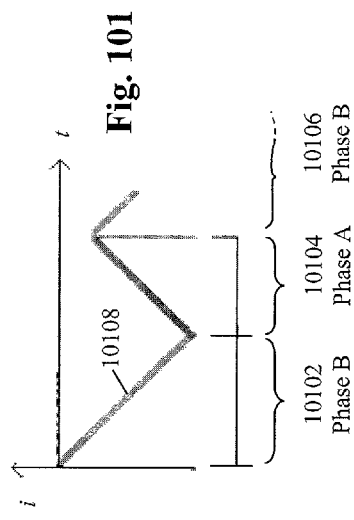
FIG. 99 is a plot of inductor current versus time for a continuous mode of operation as the direction of power transfer is from V1 to V2.

FIG. 99 is a plot 9900 of inductor current 9808 versus time for a continuous mode of operation while transferring energy in the forward direction. Compared to critical mode, in continuous mode the inductor current never decays to 0. This allows the total period of a cycle to be constant, and therefore the switching frequency to be fixed. As illustrated in FIG. 99, the inductor current 9908 starts at zero and increases during phase-A 9902. During phase-B 9904, a voltage equal to minus $V_2$ is applied across the inductor in a negative direction, which causes the current 9908 to linearly decrease to a level $i_1$. Phase-A 9906 is initiated prior to the time that the current 9908 reaches zero, which causes the DC to DC converter 8500 to operate in a continuous mode.

Figure 100:
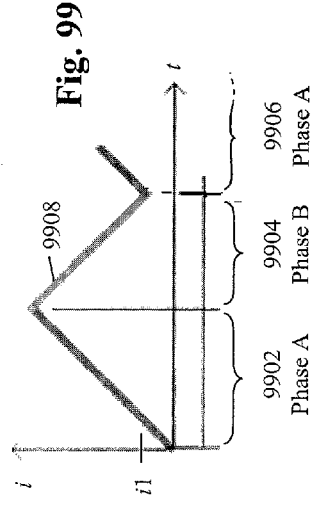
FIG. 100 is a plot of inductor voltage versus time for a continuous mode of operation as the direction of power transfer is from V1 to V2.

FIG. 100 is a plot of the voltage of the inductor for a continuous mode of operation while transferring energy in the forward direction. During phase-A 10002, a positive voltage $V_1$ is applied across the inductor. During phase-B 10004, a negative voltage minus $V_2$ is applied across the inductor as illustrated by voltage waveform 10008. Phase-B 1004 is a period that is less than it would be for critical mode of FIG. 90 so that the current 9908 does not reach zero at the end of phase-B 10004. Phase-A 10006 is initiated prior to the current 9908 reaching zero so that the flying inductor DC to DC converter is operating in a continuous mode.

Figure 101:
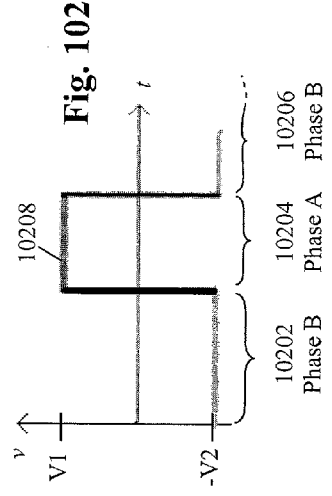
FIG. 101 is a plot of inductor current versus time for a continuous mode of operation as the direction of power transfer is from V2 to V1.

FIG. 101 is a plot 10100 of inductor current 10108 versus time for a continuous mode of operation while transferring energy in the reverse direction. As illustrated in FIG. 101, during phase-B 10102 the current 10108 starts at 0 and increases linearly in the negative direction. At the end of phase-B, phase-A 10104 is initiated, which causes the negative current to steadily decrease. Prior to the time that the current 10108 reaches zero, phase-B 10106 is initiated so that the flying bridge DC to DC converter 8500 is operating in a continuous mode.

Figure 102:
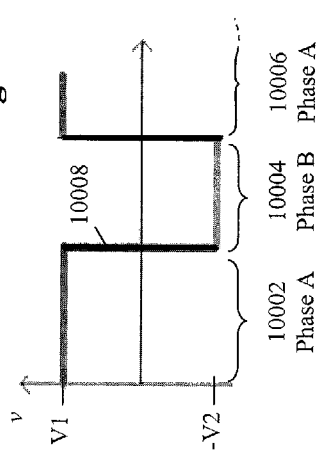
FIG. 102 is a plot of inductor voltage versus time for a continuous mode of operation was the direction of power transfer is from V2 to V1.

FIG. 102 is a plot 10200 of inductor voltage 10208 versus time for a continuous mode of operation while transferring energy in the reverse direction. As illustrated in FIG. 102, the process initiated in phase-B 10202 with a negative voltage minus $V_2$ that is applied to the inductor. Phase-A 10204 is then initiated, which causes the voltage waveform 10208 to transition to a voltage of positive $V_1$. Phase-B 10206 is then initiated at the end of phase-A 10204. As illustrated in FIG. 102, the pulse width of phase-A 10204 is less than the pulse width of phase-B 9406 of FIG. 94 for critical mode so that the current 10108 does not reach zero prior to the time that phase-B 10106 is initiated.

Figure 103:
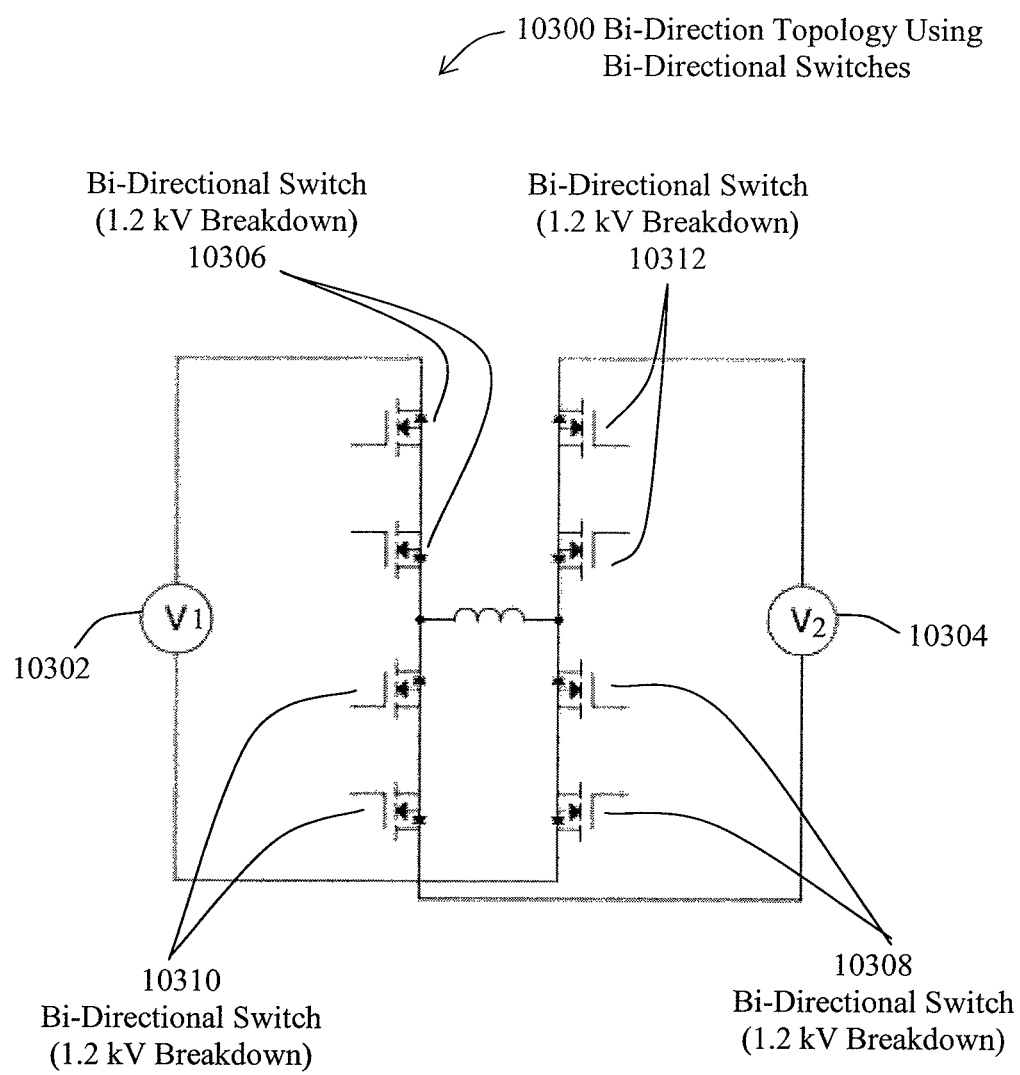
FIG. 103 is a schematic diagram of a bi-directional, flying bridge DC to DC converter using bi-directional switches.
Figure 104:
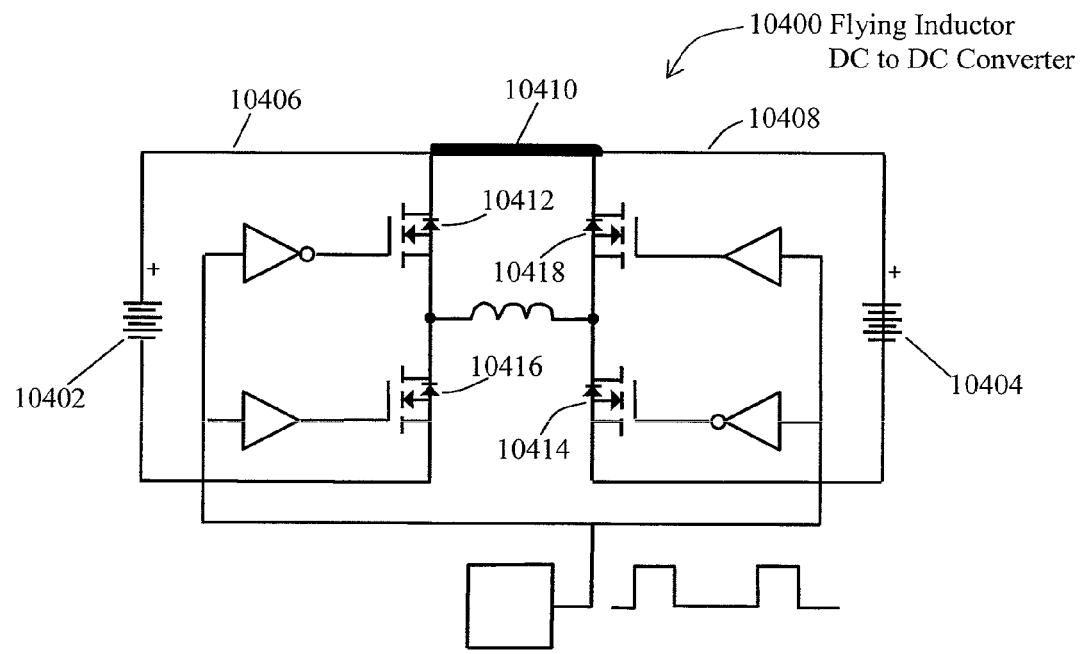
FIG. 104 is a schematic diagram of a flying inductor DC to DC converter system converted to a three terminal device by connecting the positive terminals together.
Figure 105:
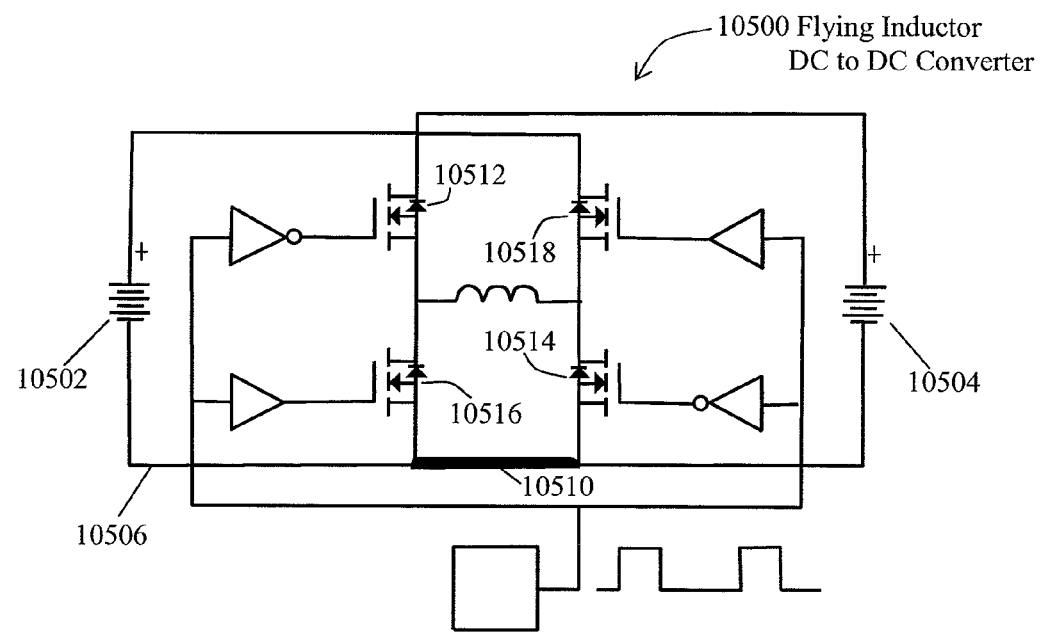
FIG. 105 is a schematic diagram of a flying inductor DC to DC converter converted to a three terminal device by connecting the negative terminals together.

FIG. 103 is an analysis of the schematic diagram of a bi-directional, flying inductor DC to DC converter 10300 using bi-directional switches. As shown in FIG. 103, voltage source 10302 has a voltage $V_1$. Voltage source 10304 has a voltage $V_2$. The circuit illustrated in FIG. 103 operates in the same manner as described above with regard to the flying inductor converter 8500. However, each switch is replaced with a bi-directional switch such as bi-directional switches 10306, 10308, 10310, 10312. The bi-directional switches 10306-10312 can comprise TRIACs or transistors/thyristors in series. In bi-directional flying inductor DC to DC converter circuits, such as illustrated in FIGS. 85-86, the circuit is limited to a certain differential voltage. For example, the differential voltage between negative terminal of the first power source, such as power source 8502 illustrated in FIG. 85, and the negative terminal of the second power source 8504, may only vary between minus $V_1$ and plus $V_2$, where $V_1$ is the voltage of the first power source 8502 and $V_2$ is the voltage of the second power source 8504. However, the bi-directional switches 10306-10312 eliminate these restrictions as there is no intrinsic diode across the active switch that can be forward biased. However, the input/output voltage differential is limited by the breakdown voltage of the component used. For example, as illustrated in FIG. 103, switches 10306-10312 have a breakdown voltage of 1.2 kilovolts. As such, the circuit illustrated in FIG. 103 would be able to operate within input to output differential voltage of plus or minus 1 kilovolt FIGS. 104, 105, illustrate other embodiments of the bi-directional, flying inductor DC-DC converter, reduced from a 4 terminal device to three terminal devices, by connecting one an input terminal to an output terminal. Such embodiments no longer provide isolation between the input and the output. Since in the 4-terminal embodiment of the lying inductor DC-DC converter the input and output are isolated, connecting one an input terminal to an output terminal is possible without affecting the operation of the flying inductor DC-DC converter.

FIG. 104 illustrates another embodiment of the four-terminal, bi-directional flying inductor DC to DC converter system 10400, reduced to a three-terminal device with negative input and output. As shown in FIG. 104, the positive terminal of batteries 10402, 10404 are connected together by conductor 10410. Similarly, the positive terminal of battery 10404 is connected to conductor 10408. Since the switches are alternately opened and closed, conductors 10406, 10408 can be connected at node 10410 without changing the operation of the circuit.

FIG. 105 is another embodiment of the four-terminal, bi-directional flying inductor DC to DC converter 10500, reduced to a three-terminal device with positive input and output. As shown in FIG. 105, the flying inductor DC to DC converter 10500 includes batteries 10502, 10504 that have their negative terminals that are connected to each other through conductor 10510. Since the switches 10512, 10514, 10516, 10518 are alternately opened and closed, conductor 10506, 10508 can be connected at node 10510 without changing the operation of the flying inductor DC to DC converter 10500.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An isolated, bi-directional DC to DC converter comprising:
    an inductor;
    two isolated circuits alternatively sharing the inductor, the first circuit having;
        a first DC voltage source; and
        a first pair of switches disposed on opposite ends of the inductor and operable to connect the first DC voltage source to the inductor in a first polarity direction during a first phase of operation;
    the second circuit having;
        a second DC voltage source; and
        a second pair of switches disposed on opposite ends of the inductor and operable to connect the second DC voltage source to the inductor in a second polarity direction during a second phase of operation, the second polarity direction being opposite to the first polarity direction;
    wherein the first pair of switches and the second pair of switches provide isolation between the first DC voltage source and the second DC Voltage source by alternating connection to the inductor between the first phase and the second phase.

2. The isolated, bi-directional DC to DC converter of claim 1 further comprising:
    a waveform generator that controls operation of said first pair of switches and said second pair of switches so that said first pair of switches and said second pair of switches are alternately closed.

3. The DC to DC converter of claim 1 further comprising:
    a waveform generator that generates a waveform having a first pulse that is initially closes said first pair of switches and causes said second pair of switches to remain open, and subsequently generates a second pulse that substantially simultaneously opens said first pair of switches and closes said second pair of switches so that energy is transferred from said first DC voltage source to said second DC power source.

4. The isolated, bi-directional DC to DC converter of claim 3 wherein said waveform generator generates a waveform that causes said converter to operate in continuous mode.

5. The isolated, bi-directional DC to DC converter of claim 2 wherein said waveform generator generates a waveform that causes said converter to operate in discontinuous mode.

6. The isolated, bi-directional DC to DC converter of claim 3 wherein said waveform generator generates a waveform that causes said converter to operate in critical mode.

7. The isolated, bi-directional DC to DC converter of claim 1 wherein said first pair of switches and said second pair of switches are bi-directional switches.

8. An isolated, uni-directional DC to DC converter comprising:
    an inductor;
    two isolated circuits, the first circuit having;
        a first DC voltage source; and
        a first pair of switches disposed on opposite ends of the inductor and operable to connect the first DC voltage source to the inductor in a first polarity direction during a first phase of operation and permit a current to flow from the first DC voltage source into the inductor;
    the second circuit having;
        a load; and
        a pair of diodes disposed on opposite ends of the inductor and structured and arranged to allow the current to flow from the inductor to the load in a second phase of operation when the first pair of switches are opened, the diodes reversed biased with respect to the load in the first phase, the first DC voltage source thereby isolated from the load.

9. The isolated, uni-directional DC to DC converter of claim 8 wherein the first pair of switches comprise bi-directional switches.

10. The isolated, uni-directional DC to DC converter of claim 8 further comprising:
    a waveform generator that generates a waveform that substantially simultaneously opens and closes the first switches.

11. An isolated, uni-directional DC to DC converter comprising:
    an inductor;
    two isolated circuits alternatively sharing the inductor, the first circuit having;
        a first DC voltage source; and
        a first pair of switches disposed on opposite ends of the inductor and operable to connect the first DC voltage source to the inductor in a first polarity direction during a first phase of operation and permit a current to flow from the first DC voltage source into the inductor;
    the second circuit having;
        a load; and
        a second pair of switches disposed on opposite ends of the inductor and operable to connect the load to the inductor to allow the current to flow from the inductor to the load in a second phase of operation when the first pair of switches are opened, the respective opening and closing of the first pair of switches and the second pair of switches occurring substantially simultaneously, the first DC voltage source thereby isolated from the load.

12. The isolated, uni-directional DC to DC converter of claim 11, wherein said first pair of switches and said second pair of switches comprise bi-directional switches.

13. The isolated, uni-directional DC to DC converter of claim 11, further comprising:

a waveform generator that generates a waveform that substantially simultaneously alternately opens and closes said first pair of switches and said second pair of switches.

14. A method of transferring power from a first DC voltage to a second DC voltage using an isolated, bi-directional DC to DC converter with two isolated circuits comprising:
providing a bi-directional DC to DC converter having;
an inductor;
two isolated circuits alternatively sharing the inductor, the first circuit having;
a first DC voltage source; and
a first pair of switches disposed on opposite ends of the inductor and operable to connect the first DC voltage source to the inductor in a first polarity direction during a first phase of operation;
the second circuit having;
a second DC voltage source; and
a second pair of switches disposed on opposite ends of the inductor and operable to connect the second DC voltage source to the inductor in a second polarity direction during a second phase of operation, the second polarity direction being opposite to the first polarity direction;
commencing Phase A by closing the first pair of switches to connect the first DC voltage source to the inductor and generate a first rate of change of current within the Inductor;
commencing Phase B by alternating the state of the switches by opening the first pair of switches and closing the second pair of switches, thereby severing the first circuit while establishing the second circuit, to connect the second DC voltage source to the inductor, reversing the polarity of the DC voltage on the inductor, and thereby initiating a second rate of change of current wherein the polarity of the second rate of change is opposite the polarity of the first rate of change of current;
wherein when an average of the first rate of change of current and the second rate of change of current are positive, the inductor transfers power from the first DC voltage source to the second DC voltage source.

15. The method of claim 14 further comprising:
switching said first pair of switches and said second pair of switches with a waveform generated by a waveform generator.

16. The method of claim 15 wherein said waveform generator generates a waveform that initially closes said first pair of switches and causes said second pair of switches to remain open, and subsequently substantially simultaneously opens said first pair of switches and closes said second pair of switches to that energy is transferred from said first DC voltage source to said second DC voltage source.

17. The method of claim 16 wherein said waveform generator generates a waveform that causes said isolated, bi-directional DC to DC converter to operate in continuous mode.

18. The method of claim 15 wherein said waveform generator generates a waveform that causes said isolated, bi-directional DC to DC converter to operate in discontinuous mode.

19. The method of claim 16 wherein said waveform generator generates a waveform that causes said isolated, bi-directional DC to DC converter to operate in critical mode.

20. The method of claim 15 wherein said waveform generator generates a waveform that initially closes said second pair of switches and causes said first pair of switches to remain open during a first phase of operation and subsequently substantially simultaneously opens said second pair of switches and closes said first pair of switches during a second phase of operation so that energy is transferred from said second DC voltage source to said first voltage source.

21. The method of claim 14 wherein said process of using said first pair of switches comprises using first bi-direction switches.

22. The method of claim 21 wherein said process of using said second set of switches comprises using second bi-directional switches.

23. A method of converting a first DC voltage to a second DC voltage using an isolated, uni-directional DC to DC converter with two isolated circuits comprising:
generating a first DC voltage in a first circuit having;
a first DC voltage source; and
a first pair of switches disposed on opposite ends of an inductor and operable to connect the first DC voltage source to the inductor in a first polarity direction during a first phase of operation;
closing the first pair of switches to connect the first DC voltage source to the inductor and permit a current to flow from the first DC voltage source into the inductor;
opening the first pair of disposed on opposite ends of the inductor and switches and substantially simultaneously closing a second pair of switches operable to connect a load to the inductor in a second circuit to allow the current to flow from the inductor to the load in a second phase of operation to generate the second DC voltage across the load, the first DC voltage source thereby isolated from the load and the second DC voltage.

24. The method of claim 23 wherein said first pair of switches and said second pair of switches are bi-directional switches.

25. A method of converting a first DC voltage to a second DC voltage using an isolated, uni-directional DC to DC converter comprising:
providing a uni-directional DC to DC converter including:
an inductor;
two isolated circuits, the first circuit having;
a first DC voltage source; and
a first pair of switches disposed on opposite ends of the inductor and operable to connect the first DC voltage source to the inductor in a first polarity direction during a first phase of operation and permit a current to flow from the first DC voltage source into the inductor;
the second circuit having;
a load; and
a pair of diodes disposed on opposite ends of the inductor and structured and arranged to allow the current to flow from the inductor to the load in a second phase of operation when the first pair of switches are opened, the diodes reversed biased with respect to the load in the first phase, the first DC voltage source thereby isolated from the load;
closing the first pair of switches to connect the first DC voltage source to the inductor and permit a current to flow from the first DC voltage source into the inductor, the pair of diodes being reversed biased with respect to the load;
opening the first pair of switches, the current flowing from the inductor through a pair of diodes structured and arranged to allow the current to flow from the inductor to the load in a second phase of operation when the first pair of switches are opened, the first DC voltage source thereby isolated from the load.

26. The isolated, bi-directional DC to DC converter of claim 1, wherein the alternating connections of the first pair of switches and the second pair of switches ensure that the first DC voltage source and the second DC voltage source are disconnected from each other at all times.

27. The isolated, bi-directional DC to DC converter of claim 1, wherein the bi-directional DC to DC converter does not include a transformer.

28. The isolated, bi-directional DC to DC converter of claim 2, wherein the waveform generator does not provide a conduction path between the first circuit and the second circuit.

29. The isolated, bi-directional DC to DC converter of claim 2, wherein the waveform generator is connected to the first and second pairs of switches through sets of isolators structured and arranged to maintain the isolation between the first circuit and the second circuit.

30. The isolated, bi-directional DC to DC converter of claim 29, wherein the isolators are appropriately paired inverting buffers and non-inverting buffers.

31. The isolated, urn-directional DC to DC converter of claim 8, wherein the uni-directional DC to DC converter does not include a transformer.

32. The isolated, bi-directional DC to DC converter of claim 10, further including a waveform generator that generates a waveform controlling the opening and closing of the first pair of switches.

33. The isolated, urn-directional DC to DC converter of claim 11, wherein the alternating connections of the first pair of switches and the second pair of switches ensure that the first DC voltage source and the load are disconnected from each other at all times.

34. The isolated, urn-directional DC to DC converter of claim 11, wherein the uni-directional DC to DC converter does not include a transformer.

35. The isolated, urn-directional DC to DC converter of claim 13, wherein the waveform generator does not provide a conduction path between the first circuit and the second circuit.

36. The isolated, urn-directional DC to DC converter of claim 13, wherein the waveform generator is connected to the first and second pairs of switches through sets of isolators structured and arranged to maintain the isolation between the first circuit and the second circuit.

37. The isolated, urn-directional DC to DC converter of claim 36, wherein the isolators are appropriately paired inverting buffers and non-inverting buffers.

38. The method of claim 14, wherein the bi-directional DC to DC converter does not include a transformer.

39. The method of claim 14, wherein the alternating connections of the first pair of switches and the second pair of switches ensures that the first DC voltage source and the second DC voltage source are disconnected from each other at all times.

40. The method of claim 14, wherein the method is reversed to transfer power from the second DC voltage source to the first DC voltage source.

41. The method of claim 14, wherein Phase B is terminated before the current in the inductor has decreased to zero, and alternating the state of the switches to initiate a new Phase A.

42. The method of claim 14, wherein Phase B is terminated when the current in the inductor is zero, and alternating the state of the switches to initiate a new Phase A.

43. The method of claim 14, wherein Phase B is terminated after the current has reduced to zero and reversed direction, and alternating the state of the switches to initiate a new Phase A.

44. The method of claim 15, wherein the waveform generator does not provide a conduction path between the first circuit and the second circuit.

45. The method of claim 15, wherein the waveform generator is connected to the first and second pairs of switches through sets of isolators structured and arranged to maintain the isolation between the first circuit and the second circuit.

46. The method of claim 45, wherein the isolators are appropriately paired inverting buffers and non-inverting buffers.

47. The method of claim 23, wherein the uni-directional DC to DC converter does not include a transformer.

48. The method of claim 23, wherein the alternating connections of the first pair of switches and the second pair of switches ensures that the first DC voltage source and the second DC voltage source are electrically disconnected from each other at all times.

49. The method of claim 23, further including a waveform generator that generates a waveform that substantially simultaneously alternately opens and closes the first pair of switches and the second pair of switches.

50. The method of claim 23, wherein the waveform generator does not provide a conduction path between the first circuit and the second circuit.

51. The method of claim 23, wherein the waveform generator is connected to the first and second pairs of switches through sets of isolators structured and arranged to maintain the isolation between the first circuit and the second circuit.

52. The method of claim 51, wherein the isolators are appropriately paired inverting buffers and non-inverting buffers.

53. The method of claim 25, wherein the uni-directional DC to DC converter does not include a transformer.

54. The method of claim 25, further including a waveform generator that generates a waveform controlling the opening and closing of the first pair of switches.

* * * * *